(12) United States Patent
Miyabayashi

(10) Patent No.: US 8,524,803 B2
(45) Date of Patent: *Sep. 3, 2013

(54) ENCAPSULATION PRODUCT, PROCESS FOR PRODUCING THE SAME, AND INK COMPOSITION

(75) Inventor: Toshiyuki Miyabayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 472 days.

This patent is subject to a terminal disclaimer.

(21) Appl. No.: 11/665,777

(22) PCT Filed: Oct. 18, 2005

(86) PCT No.: PCT/JP2005/019148
§ 371 (c)(1),
(2), (4) Date: Apr. 18, 2007

(87) PCT Pub. No.: WO2006/043571
PCT Pub. Date: Apr. 27, 2006

(65) Prior Publication Data
US 2009/0062462 A1    Mar. 5, 2009

(30) Foreign Application Priority Data

Oct. 18, 2004  (JP) ................. 2004-303093
Oct. 27, 2004  (JP) ................. 2004-313163
Mar. 10, 2005  (JP) ................. 2005-068168

(51) Int. Cl.
*C08K 9/00* (2006.01)
*B01J 13/02* (2006.01)

(52) U.S. Cl.
USPC ........... 523/200; 523/160; 524/556; 524/849; 428/407; 427/213.34

(58) Field of Classification Search
USPC ......... 523/160, 200; 524/556, 849; 428/407; 427/213.34
See application file for complete search history.

(56) References Cited

U.S. PATENT DOCUMENTS

| | | | |
|---|---|---|---|
| 4,268,456 | A | 5/1981 | Keim et al. |
| 5,415,964 | A | 5/1995 | Hayashi et al. |
| 5,863,696 | A | 1/1999 | Koyama et al. |
| 6,346,358 | B1 | 2/2002 | Cheng |
| 6,538,047 | B1 | 3/2003 | Miyabayashi |
| 6,576,051 | B2 | 6/2003 | Bardman et al. |
| 6,767,090 | B2 | 7/2004 | Yatake et al. |
| 7,307,109 | B2 | 12/2007 | Yatake et al. |
| 2002/0077385 | A1* | 6/2002 | Miyabayashi ............ 523/160 |
| 2003/0029355 | A1 | 2/2003 | Miyabayashi |
| 2003/0195274 | A1 | 10/2003 | Nakamura et al. |
| 2004/0229974 | A1 | 11/2004 | Miyabayashi |
| 2005/0075416 | A1 | 4/2005 | Miyabayashi |
| 2005/0176877 | A1* | 8/2005 | Miyabayashi ............ 524/556 |
| 2006/0222851 | A1* | 10/2006 | Miyabayashi et al. ........ 428/408 |
| 2006/0256423 | A1 | 11/2006 | Yamamoto et al. |
| 2007/0157848 | A1 | 7/2007 | Miyabayashi |
| 2008/0146713 | A1 | 6/2008 | Yatake et al. |

FOREIGN PATENT DOCUMENTS

| | | |
|---|---|---|
| EP | 1 077 238 A1 | 2/2001 |
| EP | 1 088 865 A1 | 4/2001 |
| EP | 1 153 991 A1 | 11/2001 |
| JP | 46-34898 | 10/1971 |
| JP | 49-46291 | 12/1974 |
| JP | 51-30284 | 3/1976 |
| JP | 55-011525 A | 1/1980 |
| JP | 62-034947 A | 2/1987 |
| JP | 62-061633 | 3/1987 |
| JP | 62-104802 A | 5/1987 |
| JP | 62-221431 A | 9/1987 |
| JP | 03-157464 | 7/1991 |
| JP | 05-320276 | 12/1993 |
| JP | 05-339516 | 12/1993 |
| JP | 06-239907 | 8/1994 |
| JP | 07-031869 | 2/1995 |
| JP | 07-094634 | 10/1995 |
| JP | 07-252430 | 10/1995 |
| JP | 08-059715 | 3/1996 |
| JP | 08-081647 | 3/1996 |
| JP | 08-183920 | 7/1996 |
| JP | 08-218015 | 8/1996 |
| JP | 08-295837 | 11/1996 |
| JP | 08-302227 | 11/1996 |
| JP | 08-302228 | 11/1996 |
| JP | 09-003376 | 1/1997 |
| JP | 09-031360 | 2/1997 |
| JP | 09-100303 | 4/1997 |

(Continued)

OTHER PUBLICATIONS

Patent Abstracts of Japan computer English translation and abstract of JP 11-140303 dated May 25, 1999.
Patent Abstracts of Japan computer English translation and abstract of JP 09-100303 dated Apr. 15, 1997.
Patent Abstracts of Japan computer English translation and abstract of JP 07-031869 dated Feb. 3, 1995.
Patent Abstracts of Japan English abstract of JP 62-061633 dated Mar. 18, 1987.
Patent Abstracts of Japan English abstract of JP 03-157464 dated Jul. 5, 1991.
Patent Abstracts of Japan computer English translation and abstract of JP 10-110129 dated Apr. 28, 1998.

(Continued)

*Primary Examiner* — James J Seidleck
*Assistant Examiner* — Deve E Valdez

(57) ABSTRACT

An encapsulated product comprising a core substance encapsulated with a wall material mainly comprising a polymer, wherein the polymer contacts the core substance through an ionic surfactant a and comprises at least (1) a repeating structural unit derived from an ionic polymerizable surfactant B and/or ionic monomer and (2) a repeating structural unit derived from an ionic polymerizable surfactant C having an electric charge the same as or opposite the electric charge of the ionic surfactant; or an encapsulated product comprising a core substance with a wall material mainly comprising a polymer, wherein the polymer comprises a repeating structural unit comprising a hydrophobic monomer and is present between (1) an ionic surfactant b and (2) an ionic surfactant c.

29 Claims, 11 Drawing Sheets

(56) References Cited

FOREIGN PATENT DOCUMENTS

| | | |
|---|---|---|
| JP | 09-104834 | 4/1997 |
| JP | 09-151342 | 6/1997 |
| JP | 09-217019 | 8/1997 |
| JP | 09-286939 | 11/1997 |
| JP | 09-316353 | 12/1997 |
| JP | 10-046075 | 2/1998 |
| JP | 10-110129 | 4/1998 |
| JP | 10-140065 | 5/1998 |
| JP | 10-292143 | 11/1998 |
| JP | 10-316909 A | 12/1998 |
| JP | 11-049974 | 2/1999 |
| JP | 11-080633 | 3/1999 |
| JP | 1-24142 | 5/1999 |
| JP | 11-140303 | 5/1999 |
| JP | 11-152424 | 6/1999 |
| JP | 11-166145 | 6/1999 |
| JP | 11-199783 | 7/1999 |
| JP | 11-209672 | 8/1999 |
| JP | 11-349870 | 12/1999 |
| JP | 2000-007961 | 1/2000 |
| JP | 2000-044852 | 2/2000 |
| JP | 2000-053897 | 2/2000 |
| JP | 2000-053898 | 2/2000 |
| JP | 2000-053899 | 2/2000 |
| JP | 2000-053900 | 2/2000 |
| JP | 2000-053916 | 2/2000 |
| JP | 2000-319542 | 11/2000 |
| JP | 2001-081357 | 3/2001 |
| JP | 2002-526564 | 8/2002 |
| JP | 2003-030661 A | 1/2003 |
| JP | 2003-113327 A | 4/2003 |
| JP | 2003-519565 A | 6/2003 |
| JP | 2003-306508 | 10/2003 |
| JP | 2003-306611 | 10/2003 |
| JP | 2005-097476 A | 4/2005 |
| JP | 2005-097517 A | 4/2005 |
| JP | 2005-097518 A | 4/2005 |
| JP | 2005133012 A | 5/2005 |
| JP | 2006-057087 A | 3/2006 |
| JP | 2006-124676 | 5/2006 |
| JP | 2006-320891 | 11/2006 |
| WO | 00/20221 | 4/2000 |
| WO | 01/51196 A1 | 7/2001 |
| WO | 01/94482 A1 | 12/2001 |
| WO | 01/96483 A1 | 12/2001 |

OTHER PUBLICATIONS

Patent Abstracts of Japan computer English translation and abstract of JP 11-049974 dated Feb. 23, 1999.
JPO computer English translation of JP 07-094634 dated Oct. 11, 1995.
Patent Abstracts of Japan computer English translation and abstract of JP 08-059715 dated Mar. 4, 1996.
Patent Abstracts of Japan computer English translation and abstract of JP 05-339516 dated Dec. 21, 1993.
Patent Abstracts of Japan computer English translation and abstract of JP 08-302227 dated Nov. 19, 1996.
Patent Abstracts of Japan computer English translation and abstract of JP 08-302228 dated Nov. 19, 1996.
Patent Abstracts of Japan computer English translation and abstract of JP 08-081647 dated Mar. 26, 1996.
Patent Abstracts of Japan computer English translation and abstract of JP 05-320276 dated Dec. 3, 1993.
Patent Abstracts of Japan computer English translation and abstract of JP 08-218015 dated Aug. 27, 1996.
Patent Abstracts of Japan computer English translation and abstract of JP 08-295837 dated Nov. 12, 1996.
Patent Abstracts of Japan computer English translation and abstract of JP 09-003376 dated Jan. 7, 1997.
Patent Abstracts of Japan computer English translation and abstract of JP 08-183920 dated Jul. 16, 1996.
Patent Abstracts of Japan computer English translation and abstract of JP 10-046075 dated Feb. 17, 1998.
Patent Abstracts of Japan computer English translation and abstract of JP 10-292143 dated Nov. 4, 1998.
Patent Abstracts of Japan computer English translation and abstract of JP 11-080633 dated Mar. 26, 1999.
Patent Abstracts of Japan computer English translation and abstract of JP 11-349870 dated Dec. 21, 1999.
Patent Abstracts of Japan computer English translation and abstract of JP 2000-007961 dated Jan. 11, 2000.
Patent Abstracts of Japan computer English translation and abstract of JP 09-031360 dated Feb. 4, 1997.
Patent Abstracts of Japan computer English translation and abstract of JP 09-217019 dated Aug. 19, 1997.
Patent Abstracts of Japan computer English translation and abstract of JP 09-316353 dated Dec. 9, 1997.
Patent Abstracts of Japan computer English translation and abstract of JP 09-104834 dated Apr. 22, 1997.
Patent Abstracts of Japan computer English translation and abstract of JP 09-151342 dated Jun. 10, 1997.
Patent Abstracts of Japan computer English translation and abstract of JP 10-140065 dated May 26, 1998.
Patent Abstracts of Japan computer English translation and abstract of JP 11-152424 dated Jun. 8, 1999.
Patent Abstracts of Japan computer English translation and abstract of JP 11-166145 dated Jun. 22, 1999.
Patent Abstracts of Japan computer English translation and abstract of JP 11-199783 dated Jul. 27, 1999.
Patent Abstracts of Japan computer English translation and abstract of JP 11-209672 dated Aug. 3, 1999.
Patent Abstracts of Japan computer English translation and abstract of JP 09-286939 dated Nov. 4, 1997.
Patent Abstracts of Japan computer English translation and abstract of JP 2000-044852 dated Feb. 15, 2000.
Patent Abstracts of Japan computer English translation and abstract of JP 2000-053897 dated Feb. 22, 2000.
Patent Abstracts of Japan computer English translation and abstract of JP 2000-053898 dated Feb. 22, 2000.
Patent Abstracts of Japan computer English translation and abstract of JP 2000-053899 dated Feb. 22, 2000.
Patent Abstracts of Japan computer English translation and abstract of JP 2000-053900 dated Feb. 22, 2000.
Patent Abstracts of Japan computer English translation and abstract of JP 2000-053916 dated Feb. 22, 2000.
Patent Abstracts of Japan computer English translation and abstract of JP 2001-081357 dated Mar. 27, 2001.
Patent Abstracts of Japan computer English translation and abstract of JP 2000-319542 dated Nov. 21, 2000.
IUPAC Gold Book; Critical Micelle Concentration, pp. 1-2, 1997.
Rosen, et al., Industrial Utilization of Surfactants Principles and Practice, 2000, AOCS Press, pp. 57-58.
European Extended Search Report, EP Application No. 05 79 5833, dated Nov. 3, 2011.
Database WPI, Week 200542, Thomson Scientific, London, GB, AN 2005-409715, XP002661746, corresponds to JP 2005-133012 May 26, 2005.
Database WPI, Week 19907, Thomson Scientific, London, GB, AN 1999-076652, XP002661745, corresponds to JP 10-316909, Mitsubishi Chem Corp., Dec. 2, 1998.
Database WPI, Week 200532, Thomson Scientific, London, GB, AN 2005-310301, XP002661747, corresponds to JP 2005-097518, Seiko Epson Corporation, Apr. 14, 2005.

* cited by examiner

ENCAPSULATION PRODUCT, PROCESS FOR PRODUCING THE SAME, AND INK COMPOSITION

TECHNICAL FIELD

The present invention relates to an encapsulated product, a production method thereof and an ink composition.

BACKGROUND ART

Conventionally, encapsulation of various substances has been performed in many industrial and technical fields. In the industry of printing, coating material and ink, a large number of techniques for encapsulating a pigment, a coloring matter or the like have been practiced. Also, in the medical or agricultural field, many attempts to encapsulate a drug have been made for the purpose of increasing the efficacy, decreasing the toxicity, imparting the stability, sustaining the effect, or the like. As for the encapsulation method, a phase separation method (coacervation method), a submerged drying method (inter-facial precipitation method), a spray drying method, a pan coating method, a submerged curing coating method, an interfacial polymerization method, an interfacial inorganic reaction method, an in-situ polymerization method and the like are known. However, these methods have a problem, for example, the core substance is limited, the thickness of the shell layer (encapsulating layer of the core substance) is hard to freely design, the encapsulation of one core substance is difficult, the functional group on the capsule surface is hard to freely design, a particle having a uniform surface state cannot be easily produced, encapsulation on the nano-order is not easy, application to a relatively unstable compound is difficult, a solvent used at the production of a preparation is readily mixed into the product, or the property of the obtained capsule is not satisfied. Also, the resulting encapsulated product itself has a problem depending on the usage.

In an inkjet recording method of jetting out an ink droplet from a fine nozzle head and recording a letter or a figure on the surface of a recording medium such as paper, an aqueous pigment ink obtained by dispersing a pigment in water has recently come to be used because of its excellent water resistance or light fastness. As for such an aqueous pigment ink, those obtained by dispersing a pigment in an aqueous dispersion medium with use of a dispersant such as surfactant or polymer dispersant are generally used in many cases. However, when a dispersant is used for the dispersion of pigment particles, the ink composition has many points to be adjusted for ensuring preferred properties as an ink, for example, there is a problem that when high printing density, fixing property or scratch resistance is intended to obtain, the viscosity tends to be high.

Furthermore, in such an aqueous pigment ink, the dispersant is merely adsorbing to the pigment particle surface and in the inkjet recording method where a strong shear force is applied to the pigment particle, the dispersant adsorbing to the pigment particle surface is sometimes desorbed, as a result, the dispersibility of the pigment ink may be decreased to deteriorate the ejection stability (property that the ink is stably jetted out in a constant direction from a recording head). Also, in a pigment ink using a pigment dispersed by using a dispersant such as surfactant or polymer dispersant, desorption and absorption of the dispersant readily occurs and when the ink is stored for a long time, the dispersion is liable to become unstable.

On the other hand, for the purpose of enhancing the fixing property of the pigment contained in a pigment-type inkjet ink on a recording medium, a technique of using an encapsulated pigment where the colorant particle is encapsulated with a polymer, is known.

Those prepared by encapsulating a pigment particle (see, for example, Patent Documents 1, 2 and 3) or those prepared by graft-polymerizing a polymer to the surface of a pigment particle (see, for example, Patent Documents 4 to 7) have been proposed. Also, a method of encapsulating a hydrophobic powder by using an amphipatic graft polymer has been proposed (see, for example, Patent Document 8), but this method has a problem that when a previously polymerized polymer is used for the encapsulation, the particle size after encapsulation becomes excessively large.

Other than these proposals, there has been proposed an ink using a pigment on which a resin capable of forming a film at room temperature is encapsulated by a phase inversion emulsification method (see, for example, Patent Documents 9 to 17), or an ink using a pigment on which an anionic group-containing organic polymer compound is encapsulated by an acid dipping method (see, for example, Patent Documents 18 to 27).

In addition, an ink using a polymer emulsion in which a fine polymer particle and a coloring material are impregnated by a phase inversion emulsification method has been proposed (see, for example, Patent Documents 28 to 33). However, even in a colorant obtained by a phase inversion emulsification method or an acid dipping method, the polymer adsorbed to the pigment particle may desorb and dissolve in the ink depending on the kind of an organic solvent such as penetrant, and the dispersion stability or ejection stability of ink, the image quality and the like are sometimes unsatisfied.

Patent Document 1: JP-B-7-94634 (the term "JP-B" as used herein means an "examined Japanese patent publication")
Patent Document 2: JP-A-8-59715 (the term "JP-A" as used herein means an "unexamined published Japanese patent application")
Patent Document 3: JP-A-2003-306661
Patent Document 4: JP-A-5-339516
Patent Document 5: JP-A-8-302227
Patent Document 6: JP-A-8-302228
Patent Document 7: JP-A-8-81647
Patent Document 8: JP-A-5-320276
Patent Document 9: JP-A-8-218015
Patent Document 10: JP-A-8-295837
Patent Document 11: JP-A-9-3376
Patent Document 12: JP-A-8-183920
Patent Document 13: JP-A-10-46075
Patent Document 14: JP-A-10-292143
Patent Document 15: JP-A-11-80633
Patent Document 16: JP-A-11-349870
Patent Document 17: JP-A-2000-7961
Patent Document 18: JP-A-9-31360
Patent Document 19: JP-A-9-217019
Patent Document 20: JP-A-9-316353
Patent Document 21: JP-A-9-104834
Patent Document 22: JP-A-9-151342
Patent Document 23: JP-A-10-140065
Patent Document 24: JP-A-11-152424
Patent Document 25: JP-A-11-166145
Patent Document 26: JP-A-11-199783
Patent Document 27: JP-A-11-209672
Patent Document 28: JP-A-9-286939
Patent Document 29: JP-A-2000-44852
Patent Document 30: JP-A-2000-53897
Patent Document 31: JP-A-2000-53898
Patent Document 32: JP-A-2000-53899
Patent Document 33: JP-A-2000-53900

DISCLOSURE OF THE INVENTION

Problems to be Solved by the Invention

The present invention has been made by taking account of those problems and an object of the present invention is to provide an encapsulated product capable of highly exerting various functions in various industrial and technical fields, and a production method thereof.

More specifically, the object of the present invention is to provide an encapsulated product satisfying all of the following (1) to (9): (1) the core substance is not limited; (2) the thickness of the shell layer (encapsulating layer of the core substance) can be freely designed; (3) one core substance can be encapsulated; (4) the functions of the core substance and the shell substance can be separated therebetween; (5) a particle having a uniform surface state can be produced; (6) encapsulation on the nano-order is facilitated; (7) a particle having a uniform particle diameter can be produced; (8) environment-friendly; and (9) a core substance having toxicity or the like can be rendered low-toxic or harmless by the encapsulation.

Another object of the present invention is to provide an encapsulated product satisfying all of the following (i) to (v):

(i) when used as a coloring material for inks, the dispersion stability in an aqueous liquid dispersion is excellent;

(ii) when formed into an ink, a recorded material with excellent image fastness can be obtained;

(iii) when formed into an ink, a recorded material having excellent scratch resistance of the image can be obtained;

(iv) when formed into an ink for inkjet recording, the ejection stability from a recording head is excellent; and (v) when formed into an ink for inkjet recording, the image quality is excellent.

Still another object of the present invention is to provide an encapsulated product not only satisfying all of (1) to (9) and (i) to (v) above but also capable of highly exerting various other functions, and a production method of the capsulated product.

Yet still another object of the present invention is to provide an aqueous liquid dispersion, an ink and an ink for inkjet recording each comprising the above-described encapsulated product.

Means to Solve the Problems

As a result of intensive investigations, the present inventors have found the following technical constitutions and accomplished the present invention.

(1) An encapsulated product comprising a core substance encapsulated with a wall material mainly comprising a polymer, wherein the polymer contacts the core substance through an ionic surfactant a containing an ionic group and a hydrophobic group and comprises at least (I) a repeating structural unit derived from an ionic polymerizable surfactant B and/or ionic monomer having an electric charge opposite the electric charge of the ionic surfactant a, and (II) a repeating structural unit derived from an ionic polymerizable surfactant C having an electric charge the same as or opposite the electric charge of the ionic surfactant a and containing an ionic group, a hydrophobic group and a polymerizable group.

(2) An encapsulated product comprising a core substance encapsulated with a wall material mainly comprising a polymer, wherein the polymer comprises a repeating structural unit comprising a hydrophobic monomer and is present between (I) an ionic surfactant a containing an ionic group and a hydrophobic group and an ionic surfactant b having an electric charge opposite the electric charge of the ionic surfactant a and (II) an ionic surfactant c having an electric charge the same as or opposite the electric charge of the ionic surfactant a.

(3) The encapsulated product as described in (1), wherein the polymer further comprises a repeating structural unit derived from a hydrophobic monomer and is present between (I) and (II).

(4) The encapsulated product as described in (1), wherein the polymer comprises, together with the repeating structural unit derived from an ionic polymerizable surfactant C, a repeating structural unit derived from an ionic monomer having the same electric charge as the electric charge of the ionic polymerizable surfactant C.

(5) The encapsulated product as described in any one of (1) to (4), wherein the ionic surfactant a is an ionic polymerizable surfactant A further containing a polymerizable group.

(6) The encapsulated product as described in any one of (1) to (5), wherein the polymer further comprises a repeating structure derived from a nonionic polymerizable surfactant D containing a nonionic group, a hydrophobic group and a polymerizable group.

(7) The encapsulated product as described in any one of (1) to (6), wherein the polymer contacts the core substance through an ionic surfactant a and a nonionic surfactant e.

(8) The encapsulated product as described in (7), wherein the nonionic surfactant e is a nonionic polymerizable surfactant E further containing a polymerizable group.

(9) The encapsulated product as described in any one of (1) to (8), wherein the "ionic group" of the ionic surfactant a and/or the ionic polymerizable surfactant A faces the "ionic group" of the ionic surfactant b and/or the ionic polymerizable surfactant B, the "hydrophobic group" of the ionic surfactant b and/or the ionic polymerizable surfactant B faces the "hydrophobic group" of the ionic surfactant c and/or the ionic polymerizable surfactant C, and the "ionic group" of the ionic surfactant c and/or the ionic polymerizable surfactant C is present in the outermost layer of the encapsulated product.

(10) The encapsulated product as described in (9), wherein the nonionic group of the nonionic polymerizable surfactant D is further present in the outermost layer of the encapsulated product.

(11) The encapsulated product as described in any one of (1) to (10), wherein the core substance is a coloring material particle.

(12) The encapsulated product as described in (11), wherein the coloring material particle is a pigment.

(13) A method for producing an encapsulated product, comprising at least (a) a step of adsorbing an ionic surfactant a containing an ionic group and a hydrophobic group and/or an ionic polymerizable surfactant A containing an ionic group, a hydrophobic group and a polymerizable group to the surface of a core substance, (b) a step of mixing and adsorbing an ionic polymerizable surfactant B and/or ionic monomer having an electric charge opposite the electric charge of the ionic surfactant a and/or the ionic polymerizable surfactant A, (d) a step of adding and mixing an ionic polymerizable surfactant C having an electric charge the same as or opposite the electric charge of the ionic surfactant a and/or the ionic polymerizable surfactant A, and (e) a step of performing polymerization by adding a polymerization initiator thereto.

(14) The method for producing an encapsulated product as described in (13), comprising at least (a) a step of adsorbing an ionic surfactant a containing an ionic group and a hydrophobic group and/or an ionic polymerizable surfactant A containing an ionic group, a hydrophobic group and a polymerizable group to the surface of a core substance, (b) a step of mixing and adsorbing an ionic polymerizable surfactant B and/or ionic monomer having an electric charge opposite the electric charge of the ionic surfactant a and/or the ionic polymerizable surfactant A, (c) a step of adding and mixing a hydrophobic monomer, (d) a step of adding and mixing an ionic polymerizable surfactant C having an electric charge the same as or opposite the electric charge of the ionic surfactant a and/or the ionic polymerizable surfactant A, and (e) a step of performing polymerization by adding a polymerization initiator thereto.

(15) The method for producing an encapsulated product as described in (13), comprising at least (a) a step of adsorbing an ionic surfactant a containing an ionic group and a hydrophobic group and/or an ionic polymerizable surfactant A containing an ionic group, a hydrophobic group and a polymerizable group to the surface of a core substance, (b) a step of mixing and adsorbing an ionic polymerizable surfactant B and/or ionic monomer having an electric charge opposite the electric charge of the ionic surfactant a and/or the ionic polymerizable surfactant A, (d) a step of adding and mixing an ionic polymerizable surfactant C having an electric charge the same as or opposite the electric charge of the ionic surfactant a and/or the ionic polymerizable surfactant A, (c) a step of adding and mixing a hydrophobic monomer, and (e) a step of performing polymerization by adding a polymerization initiator thereto.

(16) A method for producing an encapsulated product, comprising at least (a) a step of adsorbing an ionic surfactant a containing an ionic group and a hydrophobic group to the surface of a core substance, (b) a step of mixing and adsorbing an ionic surfactant b having an electric charge opposite the electric charge of the ionic surfactant a, (c) a step of adding and mixing a hydrophobic monomer, (d) a step of adding and mixing an ionic surfactant c having an electric charge the same as or opposite the electric charge of the ionic surfactant a and/or the ionic polymerizable surfactant A, and (e) a step of performing polymerization by adding a polymerization initiator thereto.

(17) A method for producing an encapsulated product, comprising at least (a) a step of adsorbing an ionic surfactant a containing an ionic group and a hydrophobic group to the surface of a core substance, (b) a step of mixing and adsorbing an ionic surfactant b having an electric charge opposite the electric charge of the ionic surfactant a, (d) a step of adding and mixing an ionic surfactant c having an electric charge the same as or opposite the electric charge of the ionic surfactant a and/or the ionic polymerizable surfactant A, (c) a step of adding and mixing a hydrophobic monomer, and (e) a step of performing polymerization by adding a polymerization initiator thereto.

(18) The method for producing an encapsulated product as described in any one of (13) to (17), wherein the step (b) comprises a step of performing a treatment of irradiating an ultrasonic wave after the mixing.

(19) An ink composition comprising the encapsulated product described in any one of (1) to (12) or an encapsulated product obtained by the production method described in any one of (13) to (18).

(20) The ink composition as described in (19), which comprises a 1,2-alkyldiol.

(21) The ink composition as described in (19) or (20), which comprises an acetylene glycol-based and/or acetylene alcohol-based surfactant.

(22) The ink composition as described in any one of (19) to (21), which comprises an alkyl ether of a polyhydric alcohol.

(23) The ink composition as described in any one of (19) to (22), which comprises a compound represented by the following formula (1):

[Chem. 1]

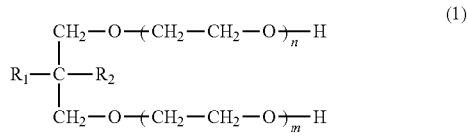

(wherein $R_1$ and $R_2$ each independently represents an alkyl group having a carbon number of 1 to 10, m and n each represents a number of repeating units, and m+n is from 0 to 10 on average).

Effects of the Invention

According to the encapsulated product of the present invention, either an inorganic material or an organic material can be used as the core substance. More specifically, an inorganic particle, an organic particle, a polymer particle and the like are usable, and the core substance is not limited. Also, a core substance having toxicity or the like can be rendered low-toxic or harmless by the encapsulation.

According to the encapsulated product of the present invention, the thickness of the shell layer (encapsulating (polymer) layer of the core substance) can be freely designed and at the same time, the functions of the core substance and the shell substance can be separated therebetween. Moreover, a particle having a uniform surface state can be produced.

According to the encapsulated product of the present invention, one core substance can be encapsulated, and encapsulation on the nano-order is facilitated.

According to the encapsulated product of the present invention, a particle (powder) having a uniform particle diameter can be produced.

Also, the encapsulated product of the present invention can be produced by a reaction in an aqueous system using no solvent and therefore, is free from adverse effect on the environment.

When an encapsulated product produced by using the production method of the present invention is used as a coloring material for inks, an ink having excellent dispersion stability in an aqueous liquid dispersion can be obtained. Using this ink, a recorded material excellent in the fastness and scratch resistance can be obtained. Furthermore, when an encapsulated product produced by using the production method of the present invention is used as an ink for inkjet recording, excellent ejection stability from a recording head is ensured and a recorded material having an excellent image quality can be obtained.

According to the production method of an encapsulated product of the present invention, the polymer constituting the encapsulating layer for the core substance can be freely designed according to the desired function, and an encapsulated product having an intended property can be easily obtained by selecting the functional group in the outermost shell.

BEST MODE FOR CARRYING OUT THE INVENTION

The encapsulated product of the present invention and the production method thereof are described in detail below.

The encapsulated product of the present invention is an encapsulated product where a core substance having adsorbed thereto at least an ionic surfactant is encapsulated with an encapsulating layer mainly comprising a polymer, and characterized in that the polymer contacts the core substance through the ionic surfactant adsorbed to the core substance and comprises a repeating structural unit derived from an ionic polymerizable surfactant and/or ionic monomer having an electric charge opposite the electric charge of the ionic surfactant adsorbed to the core substance, and a repeating structural unit derived from an ionic polymerizable surfactant having an electric charge the same as or opposite the electric charge of the ionic surfactant adsorbed to the core substance.

Such an encapsulated product can be suitably produced by preparing an aqueous liquid dispersion of a core substance having adsorbed thereto at least an ionic surfactant, adding and mixing an ionic polymerizable surfactant and/or ionic monomer having an electric charge opposite the electric charge of the ionic surfactant adsorbed to the core substance, adding an ionic polymerizable surfactant having an electric charge the same as or opposite the electric charge of the ionic surfactant adsorbed to the core substance and after emulsification, adding a polymerization initiator to perform polymerization in water, thereby forming a polymer encapsulating layer.

The present inventors have found that by using a production method comprising a step of adsorbing an ionic surfactant a containing an ionic group and a hydrophobic group to the surface of a core substance, a step of mixing and adsorbing an ionic polymerizable surfactant B and/or ionic monomer having an electric charge opposite the electric charge of the ionic surfactant a, a step of adding and mixing an ionic polymerizable surfactant C having an electric charge the same as or opposite the electric charge of the ionic surfactant a, and a step of performing polymerization by adding a polymerization initiator thereto, a polymer comprising at least a repeating structural unit derived from the ionic polymerizable surfactant B and/or ionic monomer having an electric charge opposite the electric charge of the ionic surfactant a and a repeating structural unit derived from the ionic polymerizable surfactant C having an electric charge the same as or opposite the electric charge of the ionic surfactant a can be made to contact with the core substance through the ionic surfactant a and encapsulate the core substance.

Also, the present inventors have found that by using a production method comprising a step of adsorbing an ionic surfactant a containing an ionic group and a hydrophobic group to the surface of a core substance, a step of mixing and adsorbing an ionic polymerizable surfactant B and/or ionic monomer having an electric charge opposite the electric charge of the ionic surfactant a, a step of adding and mixing a hydrophobic monomer, a step of adding and mixing an ionic polymerizable surfactant C having an electric charge the same as or opposite the electric charge of the ionic surfactant a, and a step of performing polymerization by adding a polymerization initiator thereto, or a production method comprising a step of adsorbing an ionic surfactant a containing an ionic group and a hydrophobic group to the surface of a core substance, a step of mixing and adsorbing an ionic polymerizable surfactant B and/or ionic monomer having an electric charge opposite the electric charge of the ionic surfactant a, a step of adding and mixing an ionic polymerizable surfactant C having an electric charge the same as or opposite the electric charge of the ionic surfactant a, a step of adding and mixing a hydrophobic monomer, and a step of performing polymerization by adding a polymerization initiator thereto, a polymer comprising at least a repeating structural unit derived from the ionic polymerizable surfactant B and/or ionic monomer having an electric charge opposite the electric charge of the ionic surfactant a, a repeating structural unit derived from the ionic polymerizable surfactant C having an electric charge the same as or opposite the electric charge of the ionic surfactant a, and a repeating structural unit derived from the hydrophobic monomer can be made to contact with the core substance through the ionic surfactant a and encapsulate the core substance.

Also, the present inventors have found that by using a production method comprising a step of adsorbing an ionic surfactant a containing an ionic group and a hydrophobic group to the surface of a core substance, a step of mixing and adsorbing an ionic surfactant b having an electric charge opposite the electric charge of the ionic surfactant a, a step of adding and mixing a hydrophobic monomer, a step of adding and mixing an ionic surfactant c having an electric charge the same as or opposite the electric charge of the ionic surfactant a, and a step of polymerizing the hydrophobic monomer by adding a polymerization initiator thereto, or a production method comprising a step of adsorbing an ionic surfactant a containing an ionic group and a hydrophobic group to the surface of a core substance, a step of mixing and adsorbing an ionic surfactant b having an electric charge opposite the electric charge of the ionic surfactant a, a step of adding and mixing an ionic surfactant c having an electric charge the same as or opposite the electric charge of the ionic surfactant a, a step of adding and mixing a hydrophobic monomer, and a step of polymerizing the hydrophobic monomer by adding a polymerization initiator thereto, the core substance can be encapsulated with a polymer contacting the core substance through the ionic surfactant a and being present between the ionic surfactant b having an electric charge opposite the electric charge of the ionic surfactant a and the ionic surfactant c having an electric charge the same as or opposite the electric charge of the ionic surfactant a.

Furthermore, the present inventors have found that an encapsulated coloring material obtained by using a coloring material particle such as pigment for the core substance exhibits excellent dispersion stability in an aqueous medium and excellent ejection stability from a recording head and when an ink composition containing this encapsulated coloring material is used, an image excellent in the gloss and clarity and also excellent in the scratch resistance and fastness can be formed with high coloration on a recording medium such as plain paper and inkjet special media. The present inventors have accomplished the present invention based on these findings.

By using the above-described polymerization process, the ionic group of the ionic surfactant adsorbed to the core substance is ionically boded to the ionic polymerizable surfactant and/or ionic monomer having an opposite electric charge, the hydrophobic group of the ionically bonded ionic polymerizable surfactant and/or ionic monomer faces the hydrophobic group of the ionic polymerizable surfactant having an electric charge the same as or opposite the electric charge of the ionic surfactant adsorbed to the core substance, a structure with the ionic group of this ionic polymerizable surfactant being oriented facing toward the aqueous phase side is formed, and through a polymerization reaction in this formed state as it is, a polymer layer is formed on the core substance.

That is, the configuration form of the ionic surfactant, ionic polymerizable surfactant, ionic monomer and the like present in the periphery of the core substance is very highly controlled before the polymerization reaction, and a state of the ionic group being oriented toward the aqueous phase is formed in the outermost shell. Thereafter, by the polymerization reaction, the ionic polymerizable surfactant, ionic monomer and the like are converted into a polymer while keeping the highly controlled form, and a polymer layer is formed on the core substance, whereby the encapsulated product of the present invention comes to have a highly precisely controlled structure.

The state of this encapsulated product of the present invention before encapsulation and the state after encapsulation are described below by referring to the drawings.

FIG. 1 is a view showing an outline of the encapsulated coloring material of the present invention and the production method thereof.

FIG. 2 is a view showing a state where an anionic surfactant 2' (ionic surfactant a) containing a negatively charged anionic group 21 and a hydrophobic group 22 and being adsorbed to the surface of a core substance 1, a cationic polymerizable surfactant 3 (ionic polymerizable surfactant B) containing a positively charged cationic group 31, a hydrophobic group 32 and a polymerizable group 33 (although not shown, a cationic monomer containing at least a positively charged cationic group and a polymerizable group may be used in place of B above), an anionic polymerizable surfactant 4 (ionic polymerizable surfactant C) containing a negatively charged anionic group 41, a hydrophobic group 42 and a polymerizable group 43, and a hydrophobic monomer 5 are present together. The cationic polymerizable surfactant 3 is arranged so that the cationic group 31 thereof can face the anionic group 21 of the anionic surfactant 2' adsorbing to the core substance 1, and adsorbed by a strong ionic bond. With the hydrophobic group 32 and the polymerizable group 33 of this cationic polymerizable surfactant 3, the hydrophobic group 42 and the polymerizable group 43 of the anionic polymerizable surfactant 4 are facing by a hydrophobic interaction. The anionic group 41 of the anionic polymerizable surfactant 4 is present in the direction where an aqueous solvent is present, that is, in the direction remotest from the core substance 1. The hydrophobic monomer 5 is present in a hydrophobic phase formed resulting from the hydrophobic group 32 and the polymerizable group 33 of the cationic polymerizable surfactant 3 facing the hydrophobic group 42 and the polymerizable group 43 of the anionic polymerizable surfactant 4.

FIG. 3 is a view showing a state where an anionic surfactant 2' (ionic surfactant a) containing a negatively charged anionic group 21 and a hydrophobic group 22 and being adsorbed to the surface of a core substance 1, a cationic surfactant 3' (ionic surfactant b) containing a positively charged cationic group 31 and a hydrophobic group 32, an anionic surfactant 4' (ionic surfactant c) containing a negatively charged anionic group 41 and a hydrophobic group 42, and a hydrophobic monomer 5 are present together. The cationic surfactant 31 is arranged so that the cationic group 31 thereof can face the anionic group 21 of the anionic surfactant 2' adsorbing to the core substance 1, and adsorbed by a strong ionic bond. With the hydrophobic group 32 of this cationic surfactant 3', the hydrophobic group 42 of the anionic surfactant 4' is facing by a hydrophobic interaction. The anionic group 41 of the anionic surfactant 4' is present in the direction where an aqueous solvent is present, that is, in the direction remotest from the core substance 1. The hydrophobic monomer 5 is present in a hydrophobic phase formed resulting from the hydrophobic group 32 of the cationic surfactant 3' facing the hydrophobic group 42 of the anionic polymerizable surfactant 4'.

FIG. 4 is a view showing a state where an anionic polymerizable surfactant 2 (ionic polymerizable surfactant A) containing a negatively charged anionic group 21, a hydrophobic group 22 and a polymerizable group 23 and being adsorbed to the surface of a core substance 1, a cationic polymerizable surfactant (ionic polymerizable surfactant B) containing a positively charged cationic group 31, a hydrophobic group 32 and a polymerizable group 33 (although not shown, a cationic monomer containing at least a positively charged cationic group and a polymerizable group may be used in place of B above), an anionic polymerizable surfactant 4 (ionic polymerizable surfactant C) containing a negatively charged anionic group 41, a hydrophobic group 42 and a polymerizable group 43, and a hydrophobic monomer 5 are present together. The cationic polymerizable surfactant 3 is arranged so that the cationic group 31 thereof can face the anionic group 21 of the anionic polymerizable surfactant 2 adsorbing to the core substance 1, and adsorbed by a strong ionic bond. With the polymerizable group 33 of this cationic polymerizable surfactant 3, the hydrophobic group 42 and the polymerizable group 43 of the anionic polymerizable surfactant 4 are facing by a hydrophobic interaction. The anionic group 41 of the anionic polymerizable surfactant 4 is present in the direction where an aqueous solvent is present, that is, in the direction remotest from the core substance 1. The hydrophobic monomer 5 is present in a hydrophobic phase formed resulting from the hydrophobic group 32 and the polymerizable group 33 of the cationic polymerizable surfactant 3 facing the hydrophobic group 42 and the polymerizable group 43 of the anionic polymerizable surfactant 4.

FIG. 5 is a view showing a state where an anionic polymerizable surfactant 2 (ionic polymerizable surfactant A) containing a negatively charged anionic group 21, a hydrophobic group 22 and a polymerizable group 23 and being adsorbed to the surface of a core substance 1, a cationic polymerizable surfactant 3 (ionic polymerizable surfactant B) containing a positively charged cationic group 31, a hydrophobic group 32 and a polymerizable group 33 (although not shown, a cationic monomer containing at least a positively charged cationic group and a polymerizable group may be used in place of B above), an anionic polymerizable surfactant 4 (ionic polymerizable surfactant C) containing a negatively charged anionic group 41, a hydrophobic group 42 and a polymerizable group 43, a nonionic polymerizable surfactant 8 (nonionic polymerizable surfactant D) containing a nonionic group 81, a hydrophobic group 82 and a polymerizable group 83, and a hydrophobic monomer 5 are present together. The cationic polymerizable surfactant 3 is arranged so that the cationic group 31 thereof can face the anionic group 21 of the anionic polymerizable surfactant 2 adsorbing to the core substance 1, and adsorbed by a strong ionic bond. With the hydrophobic group 32 and the polymerizable group 33 of this cationic polymerizable surfactant 3, the hydrophobic group 42 and the polymerizable group 43 of the anionic polymerizable surfactant 4 and the hydrophobic group 82 and the polymerizable group 83 of the nonionic polymerizable surfactant 8 are facing by a hydrophobic interaction. The anionic group 41 of the anionic polymerizable surfactant 4 and the nonionic group 81 of the nonionic polymerizable surfactant 8 are present in the direction where an aqueous solvent is present, that is, in the direction remotest from the core substance 1. The hydrophobic monomer 5 is present in a hydrophobic phase formed resulting from the hydrophobic group 32 and the polymerizable group 33 of the cationic polymerizable surfactant 3 facing the hydrophobic group 42 and the polymerizable group 43 of the anionic polymerizable surfactant 4 and the hydrophobic group 82 and the polymerizable group 83 of the nonionic polymerizable surfactant 8.

FIG. 6 is a view showing a state where an anionic surfactant 2' (ionic surfactant a) containing a negatively charged anionic group 21 and a hydrophobic group 22 and/or an anionic polymerizable surfactant 2 (ionic polymerizable surfactant A) containing a negatively charged anionic group 21, a hydrophobic group 22 and a polymerizable group 23, and a nonionic surfactant 9' (nonionic polymerizable surfactant e) containing a nonionic group 91 and a hydrophobic group 92 and/or a nonionic polymerizable surfactant 9 (nonionic polymerizable surfactant E) containing a nonionic group 91, a hydrophobic group 92 and a polymerizable group 93, both are adsorbing to (contacting) the surface of a core substance, and a cationic polymerizable surfactant 3 (ionic polymerizable surfactant B) containing a positively charged cationic group 31, a hydrophobic group 32 and a polymerizable group 33 (although not shown, a cationic monomer containing at least a positively charged cationic group and a polymerizable group may be used in place of B above), an anionic polymerizable surfactant 4 (ionic polymerizable surfactant C) containing a negatively charged anionic group 41, a hydrophobic group 42 and a polymerizable group 43, and a hydrophobic monomer 5 are present together. The cationic polymerizable surfactant 3 is arranged so that the cationic group 31 thereof can face the anionic group 21 of the anionic surfactant 2' adsorbing to the core substance 1 and/or the anionic group 21 of the anionic polymerizable surfactant 2, and adsorbed by a strong ionic bond. With the hydrophobic group 32 and the polymerizable group 33 of this cationic polymerizable surfactant 3, the hydrophobic group 42 and the polymerizable group 43 of the anionic polymerizable surfactant 4 are facing by a hydrophobic interaction. The anionic group 41 of the anionic polymerizable surfactant 4 is present in the direction where an aqueous solvent is present, that is, in the direction remotest from the core substance 1. The hydrophobic monomer 5 is present in a hydrophobic phase formed resulting from the hydrophobic group 32 and the polymerizable group 33 of the cationic polymerizable surfactant 3 facing the hydrophobic group 42 and the polymerizable group 43 of the anionic polymerizable surfactant 4.

As shown in FIG. 7, a polymerization initiator is added to the mixed solution of FIG. 2 to polymerize the cationic polymerizable surfactant 3 (although not shown, this may be a cationic monomer containing at least a positively charged cationic group and a polymerizable group) with the anionic polymerizable surfactant 4 and the hydrophobic monomer, whereby the core substance 1 is encapsulated with a polymer layer 60 and an encapsulated product 100 is produced. The anionic group 41 on the surface of the polymer layer 60 is regularly and densely present toward the aqueous phase side, and this enables very good dispersion of the encapsulated product 100 in an aqueous medium. Similarly, FIG. 8 shows a state when the polymerization is performed by adding a polymerization initiator to the mixed solution of FIG. 3, FIG. 9 shows a state when the polymerization is performed by adding a polymerization initiator to the mixed solution of FIG. 4, FIG. 10 shows a state when the polymerization is performed by adding a polymerization initiator to the mixed solution of FIG. 5, and FIG. 11 shows a state when the polymerization is performed by adding a polymerization initiator to the mixed solution of FIG. 6.

The encapsulated product of the present invention preferably has an aspect ratio (fineness ratio) of 1.0 to 1.3 and a Zingg index of 1.0 to 1.3 (more preferably from 1.0 to 1.2).

Assuming that the short diameter of a certain particle is b, the long diameter is 1 and the thickness is t ($l \geq b \geq t > 0$), the aspect ratio (fineness ratio) is l/b ($\geq 1$), the flatness is b/t ($\geq 1$), and the Zingg index is fineness ratio/flatness=$(l \cdot t)/b2$. In other words, the true sphere has an aspect ratio of 1 and a Zingg index of 1.

If the Zingg index exceeds 1.3, the shape of the encapsulated product becomes flatter and the isotropy decreases. The method for adjusting the aspect ratio and the Zingg index to those ranges is not particularly limited, but the encapsulated product obtained by the above-described production method of encapsulating a core substance having a cationic group on the surface with a polymer can easily satisfy these conditions.

Incidentally, in an encapsulated product produced by a method except for the emulsion polymerization method, such as acid precipitation and phase inversion emulsification, an aspect ratio and a Zingg index within the above-described ranges can be hardly obtained.

The encapsulated pigment of the present invention where the core substance is a pigment, has an aspect ratio and a Zingg index falling within those ranges and is shaped like a true sphere, whereby the flow property of an ink readily becomes Newtonian and excellent ejection stability is obtained. Also, by virtue of the true spherical shape, when the ink lands on a recording medium such as paper, the encapsulated pigment is arranged on the recording medium at a high density, and this enables to express the print density and color formation with high efficiency. Furthermore, by virtue of the true spherical shape, the pigment is also excellent in the dispersibility and dispersion stability.

The constituent components of the encapsulated product of the present invention are described in detail below.

[Core Substance]

The core substance of the encapsulated product of the present invention is not particularly limited but specifically includes a coloring material, an inorganic material, an organic material, an inorganic-organic composite particle, an inorganic colloid, a polymer particle and a metal oxide (e.g., silica, titania).

For example, when a dangerous drug or the like is intended as the organic material, the encapsulated product of the present invention provides an effect of improving the handleability of such a dangerous drug or the like.

An inorganic-organic composite particle can be used as a filler of a resin shaped article or the like, thereby enhancing the characteristics of the shaped article.

The inorganic colloid can be used for a hardcoat layer having high transparency.

In the case of using a coloring material particle as the core substance, the coloring material includes a pigment such as inorganic pigment or organic pigment capable of forming a desired color, and a dye insoluble or sparingly soluble in water, such as disperse dye and oil-soluble dye.

Also, in the case of encapsulating a coloring material by the method of the present invention, the encapsulated product can be used as a colorant for a paint, a pigment ink, a toner or the like.

In the encapsulated product of the present invention, one species of these core substances may be used or two or more species thereof may be used in combination.

The coloring material which can be used in the present invention is described in more detail below.

Examples of the inorganic pigment include carbon blacks (C.I. Pigment Black 7) such as furnace black, lamp black, acetylene black and channel black, and an iron oxide pigment. Examples of the organic pigment which can be used include an azo pigment (e.g., azo lake, insoluble azo pigment, condensed azo pigment, chelate azo pigment), a polycyclic pigment (e.g., phthalocyanine pigment, perylene pigment, perinone pigment, anthraquinone pigment, quinacridone pigment, dioxane pigment, thioindigo pigment, isoindolinone pigment, quinofuranone pigment), a dye chelate (e.g., basic dye-type chelate, acidic dye-type chelate), a nitro pigment, a nitroso pigment and aniline black.

The pigment which can be used in the present invention is described in detail below.

Examples of the inorganic pigment which can be used as a black ink include the following carbon black: No. 2300, No. 900, MCF88, No. 33, No. 40, No. 45, No. 52, MA 7, MA 8, MA 100 and No. 2200B (all trade names) produced by Mitsubishi Chemical Co. Ltd.; Raven 5750, Raven 5250, Raven 5000, Raven 3500, Raven 1255 and Raven 700 (all trade names) produced by Columbia; Regal 400R, Regal 330R, Regal 660R, Mogul L, Monarch 700, Monarch 800, Monarch 880, Monarch 900, Monarch 1000, Monarch 1100, Monarch 1300 and Monarch 1400 (all trade names) produced by Cabot; Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A and Special Black 4 (all trade names) produced by Degussa.

As for the organic pigment for black, a black organic pigment such as aniline black (C.I. Pigment Black 1) may be used.

Examples of the organic yellow pigment include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172 and C.I. Pigment Yellow 180.

Examples of the organic magenta pigment include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48 (Ca), C.I. Pigment Red 48 (Mn), C.I. Pigment Red 57 (Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43 and C.I. Pigment Violet 50.

Examples of the organic cyan pigment include C.I. Pigment Blue 1, C.I. Pigment Blue 2, C.I. Pigment Blue 3, C.I. Pigment Blue 15, C.I. Pigment Blue 15:1, C.I. Pigment Blue 15:2, C.I. Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4 and C.I. Vat Blue 60.

Examples of the organic pigment other than magenta, cyan and yellow include C.I. Pigment Green 7, C.I. Pigment Green 10, C.I. Pigment Brawn 3, C.I. Pigment Brawn 5, C.I. Pigment Brawn 25, C.I. Pigment Brawn 26, C.I. Pigment Orange 1, C.I. Pigment Orange 2, C.I. Pigment Orange 5, C.I. Pigment Orange 7, C.I. Pigment Orange 13, C.I. Pigment Orange 14, C.I. Pigment Orange 15, C.I. Pigment Orange 16, C.I. Pigment Orange 24, C.I. Pigment Orange 34, C.I. Pigment Orange 36, C.I. Pigment Orange 38, C.I. Pigment Orange 40, C.I. Pigment Orange 43 and C.I. Pigment Orange 63.

In the present invention, other than these organic pigments, a dye insoluble or sparingly soluble in water, such as disperse dye and oil-soluble, dye may also be suitably used.

[Ionic Surfactant]

The ionic surfactant for use in the present invention is not particularly limited as long as it contains an ionic group and a hydrophobic group. The ionic group may be either an anionic group or a cationic group, and this is appropriately selected according to the usage of the encapsulated product.

Out of the ionic surfactants for use in the present invention, those containing an anionic group are referred to as an anionic surfactant, and those containing a cationic group are referred to as a cationic surfactant.

The anionic group is suitably, for example, an anionic group selected from the group consisting of a sulfonic acid group, a sulfinic acid group, a carboxyl group, a phosphoric acid group, a sulfonic acid ester group, a sulfinic acid ester group, a phosphoric acid ester group, and a salt thereof. Examples of the salt include an Na salt, a K salt, a Ca salt and an organic amine salt.

The cationic group is preferably a cationic group selected from the group consisting of a primary ammonium cation, a secondary ammonium cation, a tertiary ammonium cation and a quaternary ammonium cation. Examples of the primary ammonium cation include a monoalkylammonium cation ($RNH_3^+$); examples of the secondary ammonium cation include a dialkylammonium cation ($R_2NH_2^+$); examples of the tertiary ammonium cation include a trialkylammonium cation ($R_3NH^+$); and examples of the quaternary ammonium cation include ($R_4N^+$). Here, R is a hydrophobic group, and examples thereof include those described below. Also, examples of the counter anion of the above-described cationic group include $Cl^-$, $Br^-$, $I^-$, $CH_3OSO_3^-$ and $C_2H_5OSO_3^-$.

The hydrophobic group is preferably one species or two or more species selected from the group consisting of an alkyl group having a carbon number of 8 to 16 and an aryl group such as phenyl group and phenylene group. Also, both an alkyl group and aryl group may be contained in the molecule.

Examples of the anionic surfactant include a fatty acid salt, an alkylbenzenesulfonate, an alkylnaphthalene-sulfonate, an alkylsulfonate, an α-olefinsulfonate, a dialkylsulfosuccinate, an α-sulfonated fatty acid salt, an N-methyl-N-oleyltaurine, an alkylsulfonate, a sulfated fat, a polyoxyethylene alkyl ether sulfate, a polyoxyethylene alkyl phenyl ether sulfate, a polyoxyethylenestyrenated phenyl ether sulfate, an alkylphosphate, a polyoxyethylene alkyl ether phosphate, a polyoxyethylene alkyl phenyl ether phosphate and a naphthalenesulfonate formaldehyde condensate.

Examples of the cationic surfactant include a primary fatty amine salt, a secondary fatty amine salt, a tertiary fatty amine salt, a tetraalkylammonium salt, a trialkylbenzylammonium salt, an alkylpyridinium salt, a 2-alkyl-1-alkyl-1-hydroxyethylimidazolinium salt, a polyethylenepolyamine fatty acid amide salt, a salt of polyethylenepolyamine fatty acid amide urea condensate, and a quaternary ammonium salt of polyethylenepolyamine fatty acid amide urea condensate.

[Ionic Polymerizable Surfactant]

The ionic polymerizable surfactant for use in the present invention is an ionic surfactant containing the above-described ionic group and hydrophobic group and further containing a polymerizable group. The polymerizable group is preferably a polymerizable group selected from the group consisting of a vinyl group, an allyl group, an acryloyl group, a methacryloyl group, a propenyl group, a vinylidene group and a vinylene group. Among these, an allyl group, a methacryloyl group and an acryloyl group are preferred.

The hydrophobic group is preferably one species or two or more species selected from the group consisting of an alkyl group having a carbon number of 8 to 16 and an aryl group such as phenyl group and phenylene group. Also, both an alkyl group and aryl group may be contained in the molecule.

The ionic group may be either an anionic group or a cationic group, and this is appropriately selected according to the usage of the encapsulated product.

The ionic polymerizable surfactant is referred to as an anionic polymerizable surfactant or a cationic polymerizable surfactant depending on whichever of an anionic group or a cationic group is contained as the ionic group.

[Anionic Polymerizable Surfactant]

The anionic polymerizable surfactant for use in the present invention is an anionic surfactant containing an anionic group and a hydrophobic group and further containing a polymerizable group.

The anionic group is suitably, for example, an anionic group selected from the group consisting of a sulfonic acid group, a sulfinic acid group, a carboxyl group, a phosphoric acid group, a sulfonic acid ester group, a sulfinic acid ester group, a phosphoric acid ester group, and a salt thereof. Examples of the salt include an Na salt, a K salt, a Ca salt and an organic amine salt.

The hydrophobic group is preferably one species or two or more species selected from the group consisting of an alkyl group having a carbon number of 8 to 16 and an aryl group such as phenyl group and phenylene group. Also, both an alkyl group and aryl group may be contained in the molecule.

The polymerizable group is preferably an unsaturated hydrocarbon group capable of radical polymerization. Specifically, the polymerizable group is preferably a group selected from the group consisting of a vinyl group, an allyl group, an acryloyl group, a methacryloyl group, a propenyl group, a vinylidene group and a vinylene group. Among these, an allyl group, a methacryloyl group and an acryloyl group are preferred.

Specific examples of the anionic polymerizable surfactant include anionic allyl derivatives described in JP-B-49-46291, JP-B-1-24142 and JP-A-62-104802; anionic propenyl derivatives described in JP-a-62-221431; anionic acrylic acid derivatives described in JP-A-62-34947 and JP-A-55-11525; and anionic itaconic acid derivatives described in JP-B-46-34898 and JP-A-51-30284.

The anionic polymerizable surfactant for use in the present invention is preferably, for example, a compound represented by the following formula (31):

[Chem. 2]

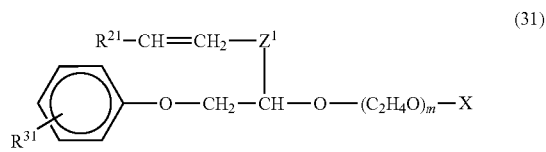

(31)

[wherein $R^{21}$ and $R^{31}$ each is independently a hydrogen atom or a hydrocarbon group having a carbon number of 1 to 12, $Z^1$ is a carbon-carbon single bond or a group represented by the formula: —$CH_2$—O—$CH_2$—, m is an integer of 2 to 20, X is a group represented by the formula: —$SO_3M^1$, and $M^1$ is an alkali metal, an ammonium salt or an alkanolamine], or a compound represented by the following formula (32):

[Chem. 3]

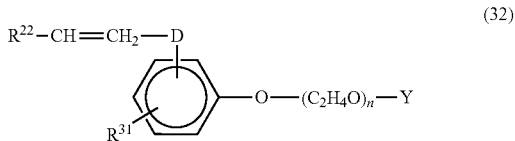

(32)

[wherein $R^{22}$ and $R^{32}$ each is independently a hydrogen atom or a hydrocarbon group having a carbon number of 1 to 12, D is a carbon-carbon single bond or a group represented by the formula: —$CH_2$—O—$CH_2$—, n is an integer of 2 to 20, Y is a group represented by the formula: —$SO_3M^2$, and $M^2$ is an alkali metal, an ammonium salt or an alkanolamine].

Examples of the anionic polymerizable surfactant represented by formula (31) include the compounds described in JP-A-5-320276 and JP-A-10-316909. The hydrophilicity on the surface of the encapsulated coloring material particle obtained by encapsulating a coloring material particle can be adjusted by appropriately selecting the number of m in formula (31). The polymerizable surfactant represented by formula (31) is preferably a compound represented by the following formula (310), and specific examples thereof include the compounds represented by the following formulae (31a) to (31d).

[Chem. 4]

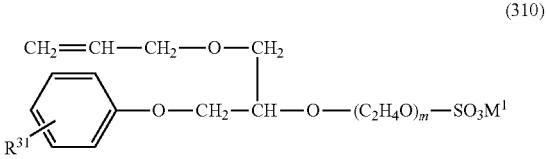

(310)

[wherein $R^{31}$, m and $M^1$ are the same as those in the compound represented by formula (31)].

[Chem. 5]

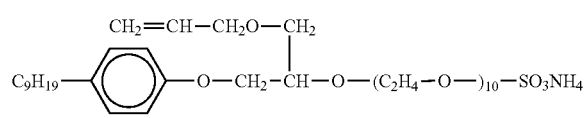
(31a)

[Chem. 6]

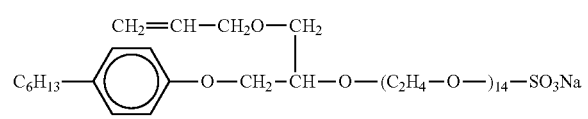
(31b)

[Chem. 7]

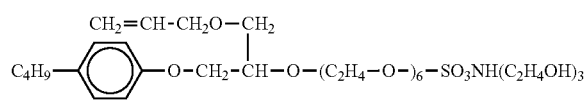
(31c)

[Chem. 8]

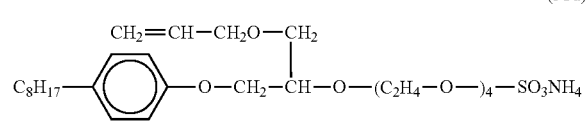
(31d)

As regards this anionic polymerizable surfactant, a commercially available product may also be used. ADEKA REARSOPE SE-10N produced by Asahi Denka Co., Ltd. is a compound where in the compound represented by formula (310), $M^1$ is $NH_4$, $R^{31}$ is $C_9H_{19}$ and m=10, and ADEKA REARSOPE SE-20N produced by Asahi Denka Co., Ltd. is a compound where in the compound represented by formula (310), $M^1$ is $NH_4$, $R^{31}$ is $C_9H_{19}$ and m=20.

Also, the anionic polymerizable surfactant for use in the present invention is preferably, for example, a compound represented by formula (33):

[Chem. 9]

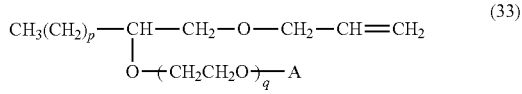
(33)

[wherein p is 9 or 11, q is an integer of 2 to 20, A is a group represented by $—SO_3M^3$, and $M^3$ is an alkali metal, an ammonium salt or an alkanolamine]. The anionic polymerizable surfactant represented by formula (33) is preferably a compound shown below.

[Chem. 10]

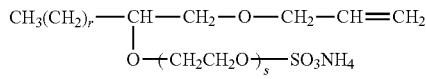

[wherein r is 9 or 11, and s is 5 or 10].

As regards this anionic polymerizable surfactant, a commercially available product may also be used. Examples of the commercially available product include AQUALON KH Series (AQUALON KH-5 and AQUALON KH-10) (all are trade names) produced by Dai-ichi Kogyo Seiyaku Co., Ltd. AQUALON KH-5 is a mixture of a compound where in the compound represented by formula (33), r is 9 and s is 5, and a compound where r is 11 and s is 5, and AQUALON KH-10 is a mixture of a compound where r is 9 and s is 10, and a compound where r is 11 and s is 10.

Furthermore, the anionic polymerizable surfactant for use in the present invention is preferably a compound represented by the following formula (34):

[Chem. 11]

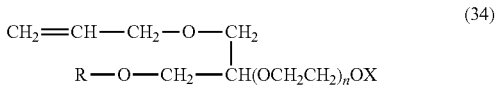
(34)

[wherein R is an alkyl group having a carbon number of 8 to 15, n is an integer of 2 to 20, X is a group represented by $—SO_3B$, and B is an alkali metal, an ammonium salt or an alkanolamine].

As regards this anionic polymerizable surfactant, a commercially available product may also be used. Examples of the commercially available product include ADEKA REARSOPE SR Series (ADEKA REARSOPE SR-10, SR-20 and SR-1025) (all trade names) produced by Asahi Denka Co., Ltd. ADEKA REARSOPE SR Series is a compound where in formula (34), B is $NH_4$. SR-10 is a compound where n=10, and SR-20 is a compound where n=20.

As for the anionic polymerizable surfactant for use in the present invention, a compound represented by the following formula (A) may also be used.

[Chem. 12]

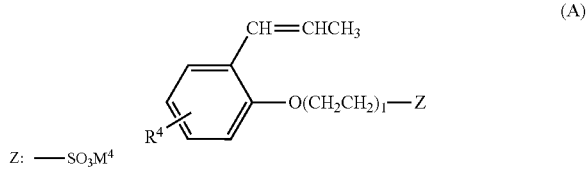
(A)

Z: $—SO_3M^4$

[wherein $R^4$ represents a hydrogen atom or a hydrocarbon group having a carbon number of 1 to 12, l represents a number of 2 to 20, and $M^4$ represents an alkali metal, an ammonium salt or an alkanolamine].

As regards this anionic polymerizable surfactant, a commercially available product may also be used. Examples of the commercially available product include AQUALON HS Series (AQUALON HS-10, HS-20 and HS-1025) (all are trade names) produced by Dai-ichi Kogyo Seiyaku Co., Ltd.

Also, the anionic polymerizable surfactant for use in the present invention includes, for example, a sodium alkylallylsulfosuccinate represented by formula (35).

[Chem. 13]

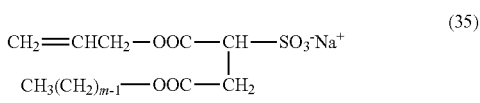
(35)

(m = 12 or 16)

As regards this anionic polymerizable surfactant, a commercially available product may also be used. Examples of the commercially available product include ELEMINOL JS-2 produced by Sanyo Chemical Industries, Ltd., and this is a compound where in formula (35), m=12.

Furthermore, the anionic polymerizable surfactant for use in the present invention includes, for example, a sodium methacryloyloxy polyoxyalkylene sulfate represented by formula (36). In the following formula, n is a number of 1 to 20.

[Chem. 14]

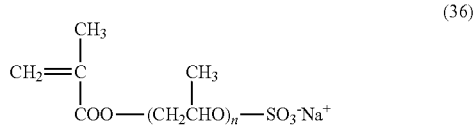
(36)

As regards this anionic polymerizable surfactant, a commercially available product may also be used. Examples of the commercially available product include ELEMINOL RS- produced by Sanyo Chemical Industries, Ltd., and this is a compound where in formula (36), n=9.

Also, as for the anionic polymerizable surfactant for use in the present invention, for example, a compound represented by formula (37) may be used.

[Chem. 15]

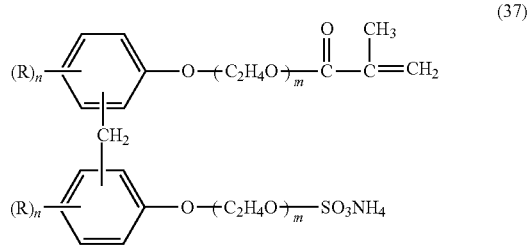
(37)

As regards this anionic polymerizable surfactant, a commercially available product may also be used, and Antox MS-60 produced by Nippon Nyukazai Co., Ltd. comes under this surfactant.

One of these anionic polymerizable surfactants may be used alone or two or more species thereof may be used as a mixture.

[Cationic Polymerizable Surfactant]

The cationic polymerizable surfactant for use in the present invention is a cationic surfactant containing a cationic group and a hydrophobic group and further containing a polymerizable group.

The cationic group is preferably a cationic group selected from the group consisting of a primary ammonium cation, a secondary ammonium cation, a tertiary ammonium cation and a quaternary ammonium cation. Examples of the primary ammonium cation include a monoalkylammonium cation ($RNH_3^+$); examples of the secondary ammonium cation include a dialkylammonium cation ($R_2NH_2^+$); examples of the tertiary ammonium cation include a trialkylammonium cation ($R_3NH^+$); and examples of the quaternary ammonium cation include ($R_4N^+$). Here, R is a hydrophobic group, and examples thereof include those described below.

The hydrophobic group is preferably one species or two or more species selected from the group consisting of an alkyl group having a carbon number of 8 to 16 and an aryl group such as phenyl group and phenylene group. Also, both an alkyl group and aryl group may be contained in the molecule.

Examples of the counter anion of the above-described cationic group include $Cl^-$, $Br^-$, $I^-$, $CH_3OSO_3^-$ and $C_2H_5OSO_3^-$.

The polymerizable group is preferably an unsaturated hydrocarbon group capable of radical polymerization. Specifically, the polymerizable group is preferably a group selected from the group consisting of a vinyl group, an allyl group, an acryloyl group, a methacryloyl group, a propenyl group, a vinylidene group and a vinylene group. Among these, an allyl group, a methacryloyl group and an acryloyl group are preferred.

The cationic polymerizable surfactant includes, for example, a compound represented by the formula: $R_{[4-(l+m+n)]}R^1{}_lR^2{}_mR^3{}_nN^+.X^-$ (wherein R is a polymerizable group, $R^1$, $R^2$ and $R^3$ each is an alkyl group having a carbon number of 8 to 16 or an aryl group such as phenyl group or phenylene group, $X^-$ is $Cl^-$, $Br^-$, $I^-$, $CH_3OSO_3^-$ or $C_2H_5OSO_3^-$, and l, m and n each is 1 or 0). Here, examples of the polymerizable group include those described above.

Specific examples of the cationic polymerizable surfactant include a dimethylaminoethylmethacrylate octyl chloride salt, a dimethylaminoethylmethacrylate cetyl chloride salt, a dimethylaminoethylmethacrylate decyl chloride salt, a dimethylaminoethylmethacrylate dodecyl chloride salt and a dimethylaminoethylmethacrylate tetradecyl chloride salt. One of these cationic polymerizable surfactants may be used alone, or two or more species thereof may be used as a mixture.

[Nonionic Polymerizable Surfactant]

The nonionic polymerizable surfactant for use in the present invention contains a nonionic group, a hydrophobic group and a polymerizable group.

Examples of the nonionic group include a hydroxyl group, a polyoxyethylene group and a polyglycerin group.

The hydrophobic group is preferably one species or two or more species selected from the group consisting of an alkyl group having a carbon number of 8 to 16 and an aryl group such as phenyl group and phenylene group. Also, both an alkyl group and aryl group may be contained in the molecule.

The polymerizable group is preferably an unsaturated hydrocarbon group capable of radical polymerization. Specifically, the polymerizable group is preferably a group selected from the group consisting of a vinyl group, an allyl group, an acryloyl group, a methacryloyl group, a propenyl group, a vinylidene group and a vinylene group. Among these, an allyl group, a methacryloyl group and an acryloyl group are preferred. The hydrophobic group and the polymerizable group include the same as those described above.

As for the nonionic polymerizable surfactant for use in the present invention, a compound represented by the following formula (100) may be used.

[Chem. 16]

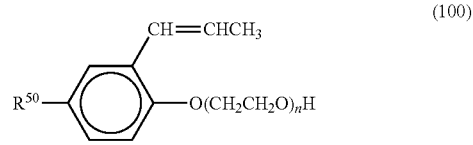
(100)

[wherein $R^{50}$ represents a hydrogen atom or a hydrocarbon group having a carbon number of 1 to 12, and n represents a number of 5 to 50].

As regards this nonionic polymerizable surfactant, a commercially available product may also be used. Examples of the commercially available product include AQUALON RN Series (AQUALON RN-10, RN-20, RN-30, RN-50 and RN-2025) (all are trade names) produced by Dai-ichi Kogyo Seiyaku Co., Ltd. The following formula (101) shows AQUALON RN-20.

[Chem. 17]

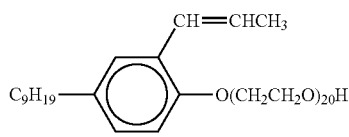
(101)

As for the nonionic polymerizable surfactant for use in the present invention, a compound represented by the following formula (103) may be used.

[Chem. 18]

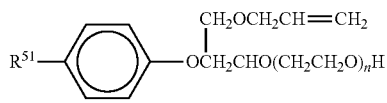
(103)

[wherein $R^{51}$ represents a hydrogen atom or a hydrocarbon group having a carbon number of 1 to 12, and n represents a number of 5 to 50].

As regards this nonionic polymerizable surfactant, a commercially available product may also be used. Examples of the commercially available product include NOIGEN Series (NOIGEN N-10, N-20, N-30 and N-50) (all are trade names) produced by Dai-ichi Kogyo Seiyaku Co., Ltd. The following formula (104) shows NOIGEN N-20.

[Chem. 19]

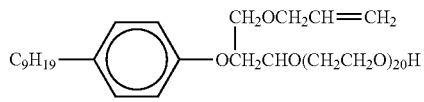
(104)

As for the nonionic polymerizable surfactant for use in the present invention, a compound represented by the following formula (105) may be used.

[Chem. 20]

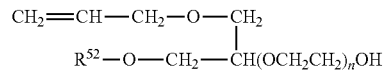
(105)

[wherein $R^{52}$ is an alkyl group having a carbon number of 8 to 15, and n is an integer of 5 to 50].

As regards this nonionic polymerizable surfactant, a commercially available product may also be used. Examples of the commercially available product include ADEKA REARSOPE ER Series (ADEKA REARSOPE ER-10, ER-20, ER-30 and ER-40) (all trade names) produced by Asahi Denka Co., Ltd. ER-10 is a compound where n=10, ER-20 is a compound where n=20, ER-30 is a compound where n=30, and ER-40 is a compound where n=40.

As for the nonionic polymerizable surfactant for use in the present invention, a compound represented by the following formula (106) may be used.

[Chem. 21]

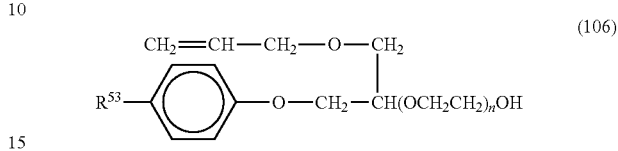
(106)

[wherein $R^{53}$ represents a hydrogen atom or a hydrocarbon group having a carbon number of 1 to 12, and n is a number of 5 to 50].

As regards this nonionic polymerizable surfactant, a commercially available product may also be used. Examples of the commercially available product include ADEKA REARSOPE NE Series (ADEKA REARSOPE NE-5, NE-10, NE-20, NE-30 and NE-40) (all trade names) produced by Asahi Denka Co., Ltd. NE-5 is a compound where n=5, NE-10 is a compound where n=10, NE-20 is a compound where n=20, NE-30 is a compound where n=30, and NE-40 is a compound where n=40.

The following formula (107) shows ADEKA REARSOPE NE-10.

[Chem. 22]

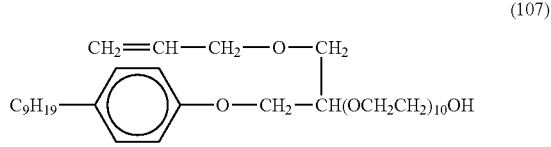
(107)

Examples of the nonionic polymerizable surfactant for use in the present invention include poly(ethylene glycol-propylene glycol) monomethacrylate (trade name: BLEMMER 50PEP-300 <produced by NOF Corp.>, formula (108)), polyethylene glycol polypropylene glycol monomethacrylate (trade name: BLEMMER 70PEP-350B <produced by NOF Corp.>, formula (109)), polyethylene glycol polypropylene glycol monoacrylate (trade name: BLEMMER AEP Series <produced by NOF Corp.>), poly(ethylene glycol-tetramethylene glycol) monoacrylate (trade name: BLEMMER AET Series <produced by NOF Corp.>), poly(propylene glycol-tetramethylene glycol) monoacrylate (trade name: BLEMMER APT Series <produced by NOF Corp.>), lauroxy polyethylene glycol monomethacrylate (trade name: BLEMMER PLE-200 <produced by NOF Corp.>, formula (110)), lauroxy polyethylene glycol monoacrylate (trade name: BLEMMER ALE-200 and ALE-800 <produced by NOF Corp.>, formula (111)), stearoxy polyethylene glycol monomethacrylate (trade name: BLEMMER PSE-200, PSE-400 and PSE-1300 <produced by NOF Corp.>, formula (112)), stearoxy polyethylene glycol-polypropylene glycol monoacrylate (trade name: BLEMMER ASEP Series <produced by NOF Corp.>, formula (113)), nonylphenoxy polyethylene glycol monoacrylate (trade name: BLEMMER ANE-300 and ANE-1300 <produced by NOF Corp.>, formula (114)), nonylphenoxy polyethylene glycol-polypropylene glycol monomethacrylate (trade name: BLEMMER PNEP Series <produced by NOF Corp.>, formula (115)), nonylphenoxy polypropylene glycol-polyethylene glycol monomethacrylate (trade name: BLEMMER PNPE Series <produced by NOF Corp.>, formula (116)), and nonylphenoxy poly(ethylene glycol-propylene glycol) monoacrylate (trade name: BLEMMER 43ANEP-500, 70ANEP-550 and 75ANEP-600 <produced by NOF Corp.>).

[Chem. 23]

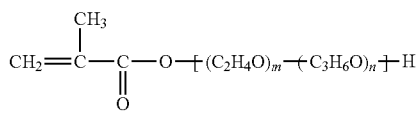

(108)

m: about 3.5
n: about 2.5

[Chem. 24]

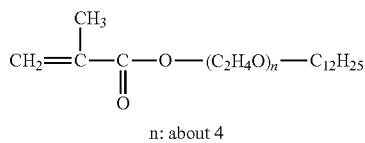

(110)

n: about 4

[Chem. 25]

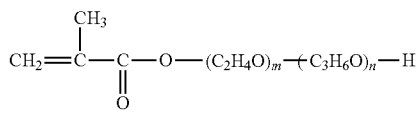

(109)

m: about 5
n: about 2

[Chem. 26]

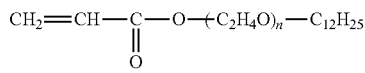

(111)

ALE-200 n: about 4
ALE-800 n: about 18

[Chem. 27]

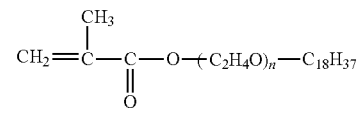

(112)

PSE-200 n: about 4
PSE-400 n: about 9
ALE-1300 n: about 30

[Chem. 28]

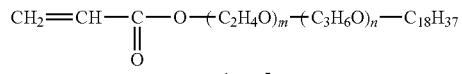

(113)

m: about 5
n: about 2

[Chem. 29]

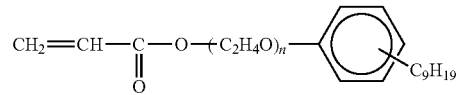

(114)

ANE-300 n: about 5
ANE=1300 n: about 30

[Chem. 30]

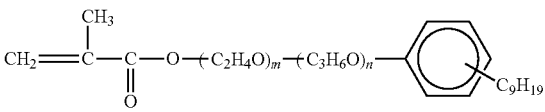

(115)

[Chem. 31]

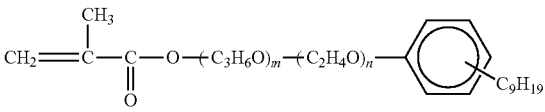

(116)

[Ionic Monomer]

The ionic monomer for use in the present invention is a compound containing an ionic group and a polymerizable group and is water-soluble.

The ionic group may be either an anionic group or a cationic group, and this is appropriately selected according to the usage of the encapsulated product.

The anionic group is suitably, for example, an anionic group selected from the group consisting of a sulfonic acid group, a sulfinic acid group, a carboxyl group, a phosphoric acid group, a sulfonic acid ester group, a sulfinic acid ester group, a phosphoric acid ester group, and a salt thereof. Examples of the salt include an Na salt, a K salt, a Ca salt and an organic amine salt.

The cationic group is preferably a cationic group selected from the group consisting of a primary ammonium cation, a secondary ammonium cation, a tertiary ammonium cation and a quaternary ammonium cation. Examples of the primary ammonium cation include a monoalkylammonium cation ($RNH_3^+$); examples of the secondary ammonium cation include a dialkylammonium cation ($R_2NH_2^+$); examples of the tertiary ammonium cation include a trialkylammonium cation ($R_3NH^+$); and examples of the quaternary ammonium cation include ($R_4N^+$). Here, R is a hydrophobic group, and examples thereof include those described below. Also, examples of the counter anion of the above-described cationic group include $Cl^-$, $Br^-$, $I^-$, $CH_3OSO_3^-$ and $C_2H_5OSO_3^-$.

The ionic monomer is referred to as an anionic water-soluble monomer or a cationic water-soluble monomer depending on whichever of an anionic group or a cationic group is contained as the ionic group.

Specific preferred examples of the cationic water-soluble monomer which can be used in the present invention include a dimethylaminoethylmethacrylate methyl chloride salt, a dimethylaminoethylmethacrylate benzyl chloride salt, a methacryloyloxyethyl trimethylammonium chloride salt, a diallyldimethylammonium chloride salt and a 2-hydroxy-3-methacryloxypropyl trimethylammonium chloride salt. As regards this cationic water-soluble monomer, a commercially available product may also be used. Examples thereof include ACRYESTER DMC (Mitsubishi Rayon Co., Ltd.), ACRYESTER DML60 (Mitsubishi Rayon Co., Ltd.) and C-1615 (Dai-ichi Kogyo Seiyaku Co., Ltd.). One of these cationic water-soluble monomers may be used alone, or two or more species thereof may be used as a mixture.

As for specific preferred examples of the anionic water-soluble monomer which can be used in the present invention, examples of the monomer having a carboxyl group include an acrylic acid, a methacrylic acid, a crotonic acid, a propylacrylic acid, an isopropylacrylic acid, a 2-acryloyloxyethylsuccinic acid, a 2-acryloyloxyethylphthalic acid, a 2-methacryloyloxyethylsuccinic acid, a 2-methacryloyloxyethylphthalic acid, an itaconic acid, a fumaric acid and a maleic acid. Among these, an acrylic acid and a methacrylic acid are preferred. Examples of the monomer having a sulfonic acid group include a 4-styrenesulfonic acid including a salt thereof, a vinylsulfonic acid including a salt thereof, a sulfoethyl acrylate including a salt thereof, a sulfoethyl methacrylate including a salt thereof, a sulfoalkyl acrylate including a salt thereof, a sulfoalkyl methacrylate including a salt thereof, a sulfopropyl acrylate including a salt thereof, a sulfopropyl methacrylate including a salt thereof, a sulfoaryl acrylate including a salt thereof, a sulfoaryl methacrylate including a salt thereof, a butylacrylamidesulfonic acid including a salt thereof, and a 2-acrylamido-2-methylpropanesulfonic acid including a salt thereof. Examples of the monomer having a phosphonic group include a phosphoric acid group-containing (meth)acrylate such as phosphoethyl methacrylate. One of these anionic water-soluble monomers may be used alone, or two or more species thereof may be used as a mixture.

[Ionic Surfactant a]

The ionic surfactant a for use in the present invention is used for the purpose of adsorbing it to a core substance, and the ionic group may be either anionic or cationic.

The ionic surfactant a for use in the present invention is the same as those described above in the item of Ionic Surfactant.

[Ionic Polymerizable Surfactant A]

The ionic polymerizable surfactant A for use in the present invention is used for the purpose of adsorbing it to a core substance, and the ionic group may be either anionic or cationic.

The ionic polymerizable surfactant A for use in the present invention is the same as those described above in the items of Ionic Polymerizable Surfactant, Anionic Polymerizable Surfactant and Cationic Polymerizable Surfactant.

[Ionic Polymerizable Surfactant B]

The ionic polymerizable surfactant B for use in the present invention has an electric charge opposite the electric charge of the ionic surfactant a and/or the ionic polymerizable surfactant A.

The anionic polymerizable surfactant and cationic polymerizable surfactant used as the ionic polymerizable surfactant B for use in the present invention are the same as those described above in the items of Ionic Polymerizable Surfactant, Anionic Polymerizable Surfactant and Cationic Polymerizable Surfactant.

[Ionic Polymerizable Surfactant C]

The ionic polymerizable surfactant C for use in the present invention has an electric charge the same as or opposite the electric charge of the ionic surfactant a and/or the ionic polymerizable surfactant A.

The anionic polymerizable surfactant and cationic polymerizable surfactant used as the ionic polymerizable surfactant C for use in the present invention are the same as those described above in the items of Ionic Polymerizable Surfactant, Anionic Polymerizable Surfactant and Cationic Polymerizable Surfactant.

[Nonionic Polymerizable Surfactant D]

The nonionic polymerizable surfactant D for use in the present invention is the same as those described above in the item of Nonionic Polymerizable Surfactant. In the encapsulated product of the present invention, the nonionic group of the nonionic polymerizable surfactant D is present in the outermost layer of the encapsulated product.

[Nonionic Surfactant e]

In the present invention, at the time of adsorbing the ionic surfactant a and/or the ionic polymerizable surfactant A to the surface of a core substance, a nonionic surfactant e may be used in combination and allowed to adsorb to the core substance surface together with the ionic surfactant a and/or the ionic polymerizable surfactant A. This nonionic surfactant e contains a nonionic group and a hydrophobic group, and examples of the nonionic group include a hydroxyl group, a polyoxyethylene group and a polyglycerin group. Here, the hydrophobic group is preferably one species or two or more species selected from the group consisting of an alkyl group having a carbon number of 8 to 16 and an aryl group such as phenyl group and phenylene group. Also, both an alkyl group and aryl group may be contained in the molecule. Specific examples of such a nonionic surfactant e include a polyethylene glycol alkyl ether such as polyethylene glycol lauryl ether, polyethylene glycol tridecyl ether, polyethylene glycol cetyl ether, polyethylene glycol stearyl ether and polyethylene glycol oleyl ether, a polyethylene glycol nonylphenyl ether, a polyethylene glycol octylphenyl ether, a polyethylene glycol monolaurate, a polyethylene glycol monostearate, a polyethylene glycol monooleate, a sorbitan monolaurate, a sorbitan monomyristate, a sorbitan monopalmitate, a sorbitan monostearate, a sorbitan monooleate, a sorbitan trioleate, a polyethylene glycol sorbitan monolaurate, a polyethylene glycol sorbitan monostearate, a polyethylene glycol sorbitan monooleate, a glycerin fatty acid monoester, a glycerol monostearate, a polyglycerin oleic acid ester, a polyglycerin lauric acid ester, a polyglycerin stearic acid ester, a lauric acid diethanolamide, an oleic acid diethanolamide, a hydroxyethyl laurylamine, a polyethylene glycol laurylamine, a polyethylene glycol stearylamine, and a polyethylene glycol dioleylamine. A commercially available product such as SOLSPERSE 27000 (produced by I.C.I. Japan) may also be used.

[Nonionic Polymerizable Surfactant E]

In the present invention, at the time of adsorbing the ionic surfactant a and/or the ionic polymerizable surfactant A to the surface of a core substance, a nonionic surfactant E may be used in combination and allowed to adsorb to the core substance surface together with the ionic surfactant a and/or the ionic polymerizable surfactant A. The nonionic polymerizable surfactant E for use in the present invention is the same as those described in the item of Nonionic Polymerizable Surfactant.

[Hydrophobic Monomer]

The hydrophobic monomer as used in the present invention means a polymerizable monomer containing at least a hydrophobic group and a polymerizable group in its structure, and examples thereof include those containing a hydrophobic group selected from the group consisting of an aliphatic hydrocarbon group, an alicyclic hydrocarbon group and an aromatic hydrocarbon group.

Examples of the aliphatic hydrocarbon group include a methyl group, an ethyl group and a propyl group; examples of the alicyclic hydrocarbon group include a cyclohexyl group, a dicyclopentenyl group, a dicyclopentanyl group and an isobornyl group; and examples of the aromatic hydrocarbon group include a benzyl group, a phenyl group and a naphthyl group.

The usable polymerizable group of the hydrophobic monomer is the same as those described above in the item of Ionic Polymerizable Surfactant.

Specific examples of the hydrophobic monomer include styrene derivatives such as styrene, methylstyrene, vinyltoluene, dimethylstyrene, chlorostyrene, dichlorostyrene, tert-butylstyrene, bromostyrene and p-chloromethylstyrene; monofunctional acrylic esters such as methyl acrylate, ethyl acrylate, isopropyl acrylate, n-butyl acrylate, butoxyethyl acrylate, isobutyl acrylate, n-amyl acrylate, isoamyl acrylate, n-hexyl acrylate, octyl acrylate, decyl acrylate, dodecyl acrylate, octadecyl acrylate, benzyl acrylate, phenyl acrylate, phenoxyethyl acrylate, cyclohexyl acrylate, dicyclopentanyl acrylate, dicyclopentenyl acrylate, dicyclopentenyloxyethyl acrylate, tetrahydrofurfuryl acrylate, isobornyl acrylate, isoamyl acrylate, lauryl acrylate, stearyl acrylate, behenyl acrylate, ethoxydiethylene glycol acrylate, methoxytriethylene glycol acrylate, methoxydipropylene glycol acrylate, phenoxypolyethylene glycol acrylate, nonylphenol EO adduct acrylate, isooctyl acrylate, isomyristyl acrylate, isostearyl acrylate, 2-ethylhexyl diglycol acrylate and octoxypolyethylene glycol polypropylene glycol monoacrylate; monofunctional methacrylic esters such as methyl methacrylate, ethyl methacrylate, isopropyl methacrylate, n-butyl methacrylate, i-butyl methacrylate, tert-butyl methacrylate, n-amyl methacrylate, isoamyl methacrylate, n-hexyl methacrylate, 2-ethylhexyl methacrylate, lauryl methacrylate, tridecyl methacrylate, stearyl methacrylate, isodecyl methacrylate, octyl methacrylate, decyl methacrylate, dodecyl methacrylate, octadecyl methacrylate, methoxydiethylene glycol methacrylate, polypropylene glycol monomethacrylate, benzyl methacrylate, phenyl methacrylate, phenoxyethyl methacrylate, cyclohexyl methacrylate, tetrahydrofurfuryl methacrylate, tert-butylcyclohexyl methacrylate, behenyl methacrylate, dicyclopentanyl methacrylate, dicyclopentenyl methacrylate, dicyclopentenyloxyethyl methacrylate, butoxymethyl methacrylate, isobornyl methacrylate and octoxypolyethylene glycol polypropylene glycol monomethacrylate; allyl compounds such as allylbenzene, allyl-3-cyclohexane propionate, 1-allyl-3,4-dimethoxybenzene, allyl phenoxyacetate, allyl phenylacetate, allylcyclohexane and allyl polyvalent carboxylate; unsaturated esters of fumaric acid, maleic acid, itaconic acid or the like; and radical polymerizable group-containing monomers such as N-substituted maleimide and cyclic olefin.

The film-forming property of the encapsulated product of the present invention and the strength, chemical resistance, water resistance, light fastness, weather resistance, optical property, physical property and chemical property of the encapsulating film are determined by the structure of hydrophobic monomer, the structure of copolymer comprising a hydrophobic monomer, and the like. Accordingly, the hydrophobic monomer may be selected according to the performance required of the encapsulated product. For example, when the encapsulated product of the present invention using a coloring material for the core substance is used as a recording material, the recorded matter can be made to have the required fixing property or scratch resistance by controlling the glass transition point (Tg) of the copolymer with which the coloring material particle is encapsulated. In general, when the temperature of a polymer solid, particularly, an amorphous polymer solid, is elevated from a low temperature to a high temperature, there occurs a phenomenon that a state (vitreous state) where a very large force is required for slight deformation abruptly changes into a state where large deformation is caused with a small force. The temperature at which this phenomenon occurs is called a glass transition point (or a glass transition temperature). In a differential thermal curve obtained by measuring the temperature rise by means of a differential scanning calorimeter, the temperature at an intersection of a tangential line drawn from a bottom of a heat absorption peak to an initiation point of heat absorption and a base line is generally taken as the glass transition point. Furthermore, it is known that other physical properties such as elastic modulus, specific heat and refractive index also abruptly change at the glass transition point, and it is known that the glass transition point is also determined by measuring these physical properties. Other than these, the glass transition point can be calculated according to the Fox formula from the weight fraction of a monomer used for the synthesis of a copolymer and the glass transition point of a homopolymer obtained by homopolymerizing the monomer.

[Math. 1]

$$\frac{1}{Tg_{[p]}} = \sum_i \left( \frac{x_i}{Tg_{[hp]i}} \right) \quad \text{(Fox formula)}$$

(wherein $Tg_{[p]}$ is a glass transition temperature of the obtained polymer, i is a number affixed every different kinds of monomers, $Tg_{[hp]i}$ is a glass transition temperature of the homopolymer of the monomer i used for the polymerization, and x is the weight fraction of the monomer based on the total weight of the monomers polymerized).

In other words, when the temperature in the environment where the encapsulated product of the present invention is placed is higher than the glass transition point of the copolymer with which the core substance of the encapsulated product of the present invention is encapsulated, the copolymer enters a state where large deformation is caused with a small force, and when the temperature further reaches the melting point, the copolymer melts. At this time, when other encapsulated products are present in the vicinity, the encapsulated products are fuse-bonded with each other to form a film. Even when the temperature in the environment does not reach the melting point, if the condition allowing the copolymer molecules covering respective encapsulated products to intertwine with each other is satisfied as in the case where the encapsulated products are put into contact with one another by a strong force, the copolymers are sometimes fuse-bonded with each other.

In the case where the encapsulated product of the present invention using a coloring material for the core substance is used as an ink for inkjet recording, when this ink is printed on a recording medium such as plain paper or special recording medium for inkjet recording, an aqueous medium comprising water and/or a water-soluble organic solvent present in the periphery of the encapsulated particle of the present invention penetrates into the plain paper or special recording medium for inkjet recording and disappears from the vicinity of the encapsulated particle, as a result, the encapsulated particles come near each other. At this time, when the glass transition point (Tg) of the copolymer covering the coloring material particle as the core substance of the encapsulated particle is not higher than room temperature, the copolymers covering the coloring particles are fuse-bonded by the effect of a capillary pressure generated in the gap between the encapsulated particles, thereby forming a film with the coloring material being embraced (included) inside. By virtue of such film formation, fixing property of the coloring material to the recording medium and scratch resistance can be obtained. In this case, the glass transition point of the copolymer covering the coloring material particle of the encapsulated product of the present invention is preferably 30° C. or less, more preferably 15° C. or less, still more preferably 10° C. or less. With a glass transition point in this range, the encapsulated product more successfully forms a film at room temperature. Accordingly, in the case where the encapsulated product of the present invention using a coloring material for the core substance is used as an ink for inkjet recording, the copolymer covering the coloring material particle of the encapsulated product is preferably designed to have a glass transition point of 30° C. or less, more preferably 15° C. or less, still more preferably 10° C. or less. However, if the glass transition point is less than −20° C., the solvent resistance tends to decrease and therefore, careful design is demanded. A hydrophobic monomer satisfying these required properties is appropriately selected, and the amount added thereof is arbitrarily determined.

In the case where the encapsulated product of the present invention using a coloring material for the core substance is used as a toner, when the glass transition point (Tg) of the copolymer covering the coloring material particle as the core substance of the encapsulated particle is set to be not higher than the fixing temperature, the copolymers covering the coloring particles are fuse-bonded, and a film with the coloring material being embraced (included) inside is formed on the plain paper which is a recording medium, so that fixing property of the colorant to the recording medium and scratch resistance can be obtained. In this case, the glass transition point of the copolymer covering the coloring material particle of the encapsulated product of the present invention is preferably not lower than a temperature having no adverse effect on the electrophotographic process except for the fixing process, particularly, on the development process, transfer process and the like. A hydrophobic monomer satisfying the properties required as the physical toner properties such as film-forming property, strength of encapsulating film, electrical property, chemical resistance, water resistance, light fastness, weather resistance and optical property, is appropriately selected, and the amount added thereof is arbitrarily determined.

As for the monomer used for synthesizing a polymer as the main component of the capsule wall material of the present invention, a monomer represented by the following formula (2) may be further used within the range of not impairing the effect of the present invention.

[Chem. 32]

Formula (2):

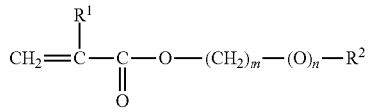

[wherein $R^1$ represents a hydrogen atom or a methyl group, $R^2$ represents a tert-butyl group, an alicyclic hydrocarbon group, an aromatic hydrocarbon group or a heterocyclic group, m represents an integer of 0 to 3, and n represents an integer of 0 to 1].

In formula (2), examples of the alicyclic hydrocarbon group represented by $R^2$ include a cycloalkyl group, a cycloalkenyl group, an isobornyl group, a dicyclopentanyl group, a dicyclopentenyl group and an adamantane group, and examples of the heterocyclic group include a tetrahydrofuran group.

Specific examples of the monomer represented by formula (2) are set forth below.

[Chem. 33]

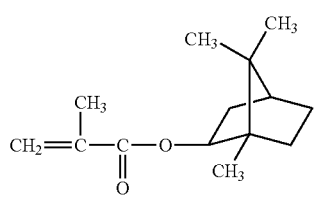

weather resistance
Homopolymer Tg: 155° C. (180°C)

Isobornyl methacrylate

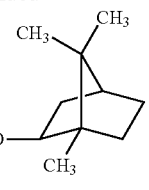

weather resistance
Homopolymer Tg: 94° C.

Isobornyl acrylate

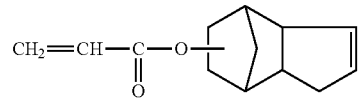

impartation of adhesision to acrylic resin
Homopolymer Tg: 120° C.

Dicyclopentenyl acrylate

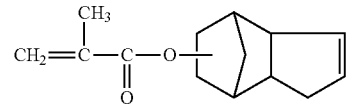

chemical resistance

Dicyclopentenyl methacrylate

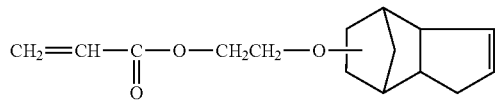

impartation of adhesion

Dicyclopentenyloxyethyl acrylate

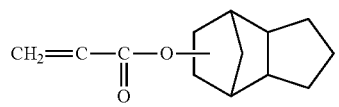

low hygroscopicity
weather resistance
Homopolymer Tg: 120° C.

Dicyclopentanyl acrylate

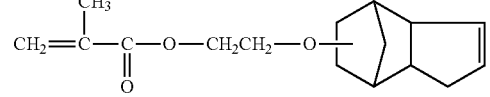

chemical resistance

Dicyclopentenyloxyethyl methacrylate

[Chem. 34]

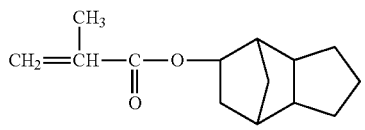

low hygroscopicity
weather resistance
Homopolymer Tg: 175° C.

Dicyclopentenyl methacrylate

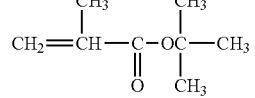

Homopolymer Tg: 107° C.

tert-Butyl methacrylate

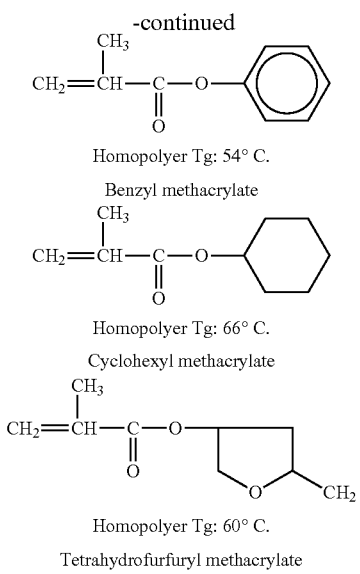

Homopolymer Tg: 54° C.

Benzyl methacrylate

Homopolyer Tg: 66° C.

Cyclohexyl methacrylate

Homopolyer Tg: 60° C.

Tetrahydrofurfuryl methacrylate

When the $R^2$ group which is a "bulky" group derived from the monomer represented by formula (2) is incorporated into the polymer of the capsule wall material, this enables to decrease the deflection of the polymer molecule, that is, decrease the mobility of the molecule and thereby enhance the mechanical strength and heat resistance of the polymer. Therefore, with use of an ink composition containing the encapsulated coloring material of the present invention using a coloring material particle for the core substance, a printed matter excellent in the weather resistance and durability can be obtained. Furthermore, by virtue of causing the $R^2$ group which is a "bulky" group to exist in the polymer constituting the capsule wall material, the organic solvent in the ink composition can be prevented from penetrating into the polymer and therefore, the encapsulated coloring material can have excellent solvent resistance. As a result, the dispersibility of the coloring material particle in the ink composition for inkjet recording where a water-soluble organic solvent is present together, as well as the storage stability of the ink composition and the ejection property of the ink composition from an inkjet head can be enhanced.

On the other hand, the polymer having a repeating structural unit derived from a monomer having a long-chain alkyl group out of the above-described monomers has flexibility. Accordingly, when the ratio of the repeating structural unit derived from a crosslinking monomer described later and/or the repeating structural unit derived from the monomer represented by formula (2) to the repeating structural unit derived from the monomer having a long-chain alkyl group is appropriately adjusted, a capsule wall material polymer having high mechanical strength and excellent solvent resistance in combination with preferred plasticity can be synthesized. The ink composition containing an encapsulated coloring material particle encapsulated with such a polymer is excellent in the dispersion stability, long-term storage stability and ejection stability from an inkjet head, even if a water-soluble organic solvent is contained therein. Also, when the ink composition containing such an encapsulated coloring material particle is used for printing, the image of the printed matter is assured of good fixing property to a recording medium such as paper or inkjet special media. Furthermore, this ink composition can provide an image excellent in the scratch resistance, durability and solvent resistance.

[Polymerization Component]

The encapsulated product of the present invention comprises a core substance encapsulated with a material mainly comprising a polymer and, in addition to the above-described various surfactants, polymerizable surfactants and hydrophobic monomers, other polymerizable monomer components may be used as the raw material within the range of not impairing the effect of the present invention. Examples of other polymerizable monomers usable in the present invention include a crosslinking monomer. When a crosslinking monomer is added to the polymerization components and copolymerized with the hydrophobic monomer, the mechanical strength and heat resistance of the polymer can be increased to enhance the shape retentivity of the capsule wall material. Also, the swelling of the polymer due to an organic solvent or the penetration of an organic solvent into the polymer can be prevented, and the solvent resistance of the capsule wall material can be elevated. As a result, for example, the dispersibility of the coloring material particle in the ink composition for inkjet recording where a water-soluble organic solvent is present together, as well as the storage stability of the ink composition and the ejection property of the ink composition from an inkjet head can be enhanced.

The crosslinking monomer for use in the present invention includes a compound having two or more unsaturated hydrocarbon groups of at least one species selected from a vinyl group, an allyl group, an acryloyl group, a methacryloyl group, a propenyl group, a vinylidene group and a vinylene group. Specific examples of the crosslinking monomer include ethylene glycol diacrylate, diethylene glycol diacrylate, triethylene glycol diacrylate, tetraethylene glycol diacrylate, polyethylene glycol diacrylate, allyl acrylate, bis(acryloxyethyl)hydroxyethyl isocyanurate, bis(acryloxyneopentyl glycol) adipate, 1,3-butylene glycol diacrylate, 1,6-hexanediol diacrylate, neopentyl glycol diacrylate, propylene glycol diacrylate, polypropylene glycol diacrylate, 2-hydroxy-1,3-diacryloxypropane, 2,2-bis[4-(acryloxy)phenyl]propane, 2,2-bis[4-(acryloxyethoxy)phenyl]propane, 2,2-bis[4-(acryloxyethoxy-diethoxy)phenyl]propane, 2,2-bis[4-(acryloxyethoxy-polyethoxy)phenyl]propane, hydroxypivalic acid neopentyl glycol diacrylate, 1,4-butanediol diacrylate, dicyclopentanyl diacrylate, dipentaerythritol hexaacrylate, dipentaerythritol monohydroxypentaacrylate, ditrimethylolpropane tetraacrylate, pentaerythritol triacrylate, tetrabromobisphenol A diacrylate, triglycerol diacrylate, trimethylolpropane triacrylate, tris(acryloxyethyl) isocyanurate, ethylene glycol dimethacrylate, diethylene glycol dimethacrylate, triethylene glycol dimethacrylate, tetraethylene glycol dimethacrylate, polyethylene glycol dimethacrylate, propylene glycol dimethacrylate, polypropylene glycol dimethacrylate, 1,3-butylene glycol dimethacrylate, 1,4-butanediol dimethacrylate, 1,6-hexanediol dimethacrylate, neopentyl glycol dimethacrylate, 2-hydroxy-1,3-dimethacryloxypropane, 2,2-bis[4-(methacryloxy)phenyl]propane, 2,2-bis[4-(methacryloxyethoxy)phenyl]propane, 2,2-bis[4-(methacryloxyethoxydiethoxy)phenyl]propane, 2,2-bis[4-(methacryloxyethoxypolyethoxy)phenyl]propane, tetrabromobisphenol A dimethacrylate, dicyclopentanyl dimethacrylate, dipentaerythritol hexamethacrylate, glycerol dimethacrylate, hydroxypivalic acid neopentyl glycol dimethacrylate, dipentaerythritol monohydroxypentamethacrylate, ditrimethylolpropane tetra-methacrylate, pentaerythritol trimethacrylate, pentaerythritol tetramethacrylate, triglycerol dimethacrylate, trimethylolpropane trimethacrylate, tris(methacryloxyethyl) isocyanurate, allyl methacrylate, divinylbenzene, diallyl phthalate, diallyl terephthalate, diallyl isophthalate and diethylene glycol bisallylcarbonate.

The polymer having a repeating structural unit derived from this crosslinking monomer or the polymer having a repeating structural unit derived from the monomer represented by formula (2) is advantageous in that the glass transition temperature (Tg) is high and the mechanical strength, heat resistance and solvent resistance are excellent.

However, when an encapsulated coloring material particle encapsulated with a polymer containing such a crosslinking monomer and/or the monomer represented by formula (2) in a large amount as the copolymerization component is used in the ink composition for inkjet recording, the adhesion to a recording medium such as paper or inkjet special media sometimes becomes difficult due to low plasticity of the capsule wall material polymer, and this gives rise to a problem that the fixing property of the encapsulated coloring material to a recording medium or the scratch resistance of the obtained image may deteriorate. Accordingly, the amount used of the crosslinking monomer and/or the monomer represented by formula (2) is preferably adjusted to an appropriate amount.

Furthermore, in the present invention, other known polymerizable monomers may be used in addition to the above-described various polymerizable monomers, within the range of not impairing the effect of the present invention.

[Polymerization Initiator]

The polymer constituting the capsule wall material of the encapsulated product of the present invention is obtained, as described above, by polymerizing an ionic polymerizable surfactant, an ionic monomer and a hydrophobic monomer. This polymerization reaction can be performed by using a known polymerization initiator. Particularly, use of a radical polymerization initiator is preferred. In the present invention, at the production of the encapsulated product, a polymerization initiator suitable for the polymerization method employed is preferably used. In the case of using an emulsion polymerization method and a mini-emulsion polymerization method, the polymerization initiator is preferably a water-soluble polymerization initiator, and examples thereof include persulfate (e.g., potassium persulfate, ammonium persulfate, sodium persulfate), hydrogen peroxide, 2,2-azobis(2-methylpropionamidine) dihydrochloride, and 4,4-azobis(4-cyanovaleric acid). Also, a redox-type initiator combining an oxidizing agent such as potassium persulfate, ammonium persulfate, sodium persulfate and hydrogen peroxide, with a reducing agent such as sodium sulfite, sodium hyposulfite, ferrous sulfate, ferrous nitrate and thiourea, may be used. Furthermore, in the case of using a suspension polymerization method and a mini-emulsion polymerization method, an oil-soluble azo compound-based initiator such as dimethyl-2,2'-azobis(2-methylpropionate), 2,2'-azobis(2,4-dimethylvaleronitrile) and 2,2'-azobis(2-methylbutyronitrile), or an oil-soluble polymerization initiator such as peroxide (e.g., dilauroyl peroxide, disuccinic acid peroxide, 1,1,3,3-tetramethylbutyl(peroxy-2-ethylhexanoate) and 2,5-dimethyl-2,5-di(2-ethylhexanoylperoxy)hexane, is preferably used.

[Other Components]

The encapsulated product of the present invention comprises a core member encapsulated with a material mainly comprising a polymer and, in addition to those described above as the raw material, other components such as ultraviolet absorbent, light stabilizer, antioxidant, flame retardant, plasticizer and wax, may be incorporated into the polymer within the range of not impairing the effect of the present invention.

[Polymerization Method of Encapsulated Product]

The production method of the encapsulated product of the present invention is described below.

The capsule wall material of the encapsulated product is synthesized by a polymerization reaction, and this polymerization reaction is preferably performed by using a reaction vessel equipped with an ultrasonic wave generator, a stirrer, a reflux condenser, a dropping funnel and a temperature regulator.

The production method of the encapsulated product of the present invention is described below.

The encapsulated product according to the embodiment of the present invention is suitably produced, specifically, by the following procedure.

(I) First, an ionic surfactant a containing an ionic group and a hydrophobic group is adsorbed to the surface of a core substance. More specifically, when the core substance is a solid matter, it is preferred to charge the core substance into an ion-exchanged water having dissolved therein the ionic surfactant a and after mixing, subject the mixed solution to a dispersion treatment in a general dispersing device such as ball mill, roll mill, Eiger mill or jet mill, thereby sufficiently adsorbing the ionic surfactant a to the core substance. Incidentally, as described above, the substance to be adsorbed to the core substance is sufficient if it contains at least an ionic group, and an ionic polymerizable surfactant further containing a polymerizable group may also be used as the ionic surfactant. Furthermore, by taking account of improvement or the like of the dispersibility of the core substance in a dispersion medium, a nonionic surfactant may be used in combination, and this nonionic surfactant may contain a polymerizable group.

The ionic surfactant a not adsorbed to the core substance is preferably removed by filtration or the like. If the unadsorbed ionic surfactant is remaining in a large amount, the amount of a polymer particle produced as a by-product increases and this gives rise to insufficient encapsulation of the core substance. However, if the unadsorbed ionic surfactant is excessively removed, the dispersion of the core substance sometimes becomes unstable. Therefore, an appropriate degree of ultrafiltration or the like is preferably determined by taking account of the dispersion stability and the condition of encapsulation.

(II) Next, an ionic polymerizable surfactant B and/or ionic monomer having an electric charge opposite the electric charge of the ionic surfactant a is added and mixed to the liquid dispersion of the core substance having adsorbed thereto the ionic surfactant a. At this time, an ultrasonic wave is preferably irradiated on the mixture so as to facilitate the ionic bonding of the ionic group of the ionic polymerizable surfactant B and/or ionic monomer to the ionic group of the ionic surfactant a.

The amount of the ionic polymerizable surfactant B and/or ionic monomer having an electric charge opposite the electric charge of the ionic surfactant a, added to the liquid dispersion of the core substance having adsorbed thereto the ionic surfactant a is preferably from 0.5 to 2 molar times, more preferably from 0.8 to 1.2 molar times, based on the total molar number of the ionic group of the ionic surfactant a (that is, the amount [mol/g] of the ionic group present on the surface of 1 g of the core substance used). By adding the ionic polymerizable surfactant B and/or ionic monomer having an opposite electric charge in an amount of 0.5 molar times or more based on the total molar amount of the ionic group of the ionic surfactant a adsorbed to the surface of the core substance, an encapsulated produce with good dispersibility can be obtained through the subsequent polymerization reaction.

This is considered to result because the ionic polymerizable surfactant B and/or ionic monomer can satisfactorily cover the core substance. On the other hand, when the amount of the ionic polymerizable surfactant B and/or ionic monomer added is 2 molar times or less, the generation of a polymer particle having no core substance (a particle comprising only a polymer) can be suppressed.

(III) Furthermore, a hydrophobic monomer is added, if desired. The timing of adding the hydrophobic monomer may be after (IV). Incidentally, as the polymerizable monomer, in addition to the hydrophobic monomer, a monomer selected from the group consisting of a crosslinking monomer, a compound represented by formula (2) and other known polymerizable monomers may be used in combination within the range of not impairing the effect of the present invention.

(IV) Subsequently, an ionic polymerizable surfactant C having an electric charge the same as or opposite the electric charge of the ionic surfactant a is added and mixed. Here, the amount of the ionic polymerizable surfactant C added is preferably from 0.5 to 10 molar times, more preferably from 0.5 to 5 molar times, based on the ionic polymerizable surfactant B and/or ionic monomer. When this amount added is 0.5 molar times or more, the aggregation of the encapsulated product can be suppressed and an encapsulated product liquid dispersion having excellent dispersion stability can be obtained. Also, when the amount added is 10 molar times or less, the amount of the ionic polymerizable surfactant C not contributing to the encapsulation of the core substance can be decreased and the generation of a polymer particle can be suppressed.

It is presumed that through these steps, the ionic polymerizable surfactant B and/or ionic monomer having an electric charge opposite the electric charge of the ionic surfactant a electrostatically adheres to the surface of the core substance having adsorbed thereto the ionic surfactant a, the hydrophobic monomer is localized on the outer side thereof depending on the case, and the ionic polymerizable surfactant C having an electric charge the same as or opposite the electric charge of the ionic group of the ionic surfactant a is oriented on the further outer side thereof, with the ionic group facing the aqueous phase side, whereby an admicell is formed.

Furthermore, together with the ionic polymerizable surfactant C, a nonionic polymerizable surfactant D may be used in combination, if desired. At this time, the amount of the nonionic polymerizable surfactant added is adjusted such that the total of this amount and the amount of the ionic polymerizable surfactant C added becomes from 0.5 to 10 molar times, preferably from 0.5 to 5 molar times, based on the ionic polymerizable surfactant B and/or ionic monomer. The ratio between the nonionic polymerizable surfactant D and the ionic polymerizable surfactant C is appropriately selected according to the property required of the encapsulated product obtained. In particular, when the encapsulated product using a coloring material such as pigment for the core substance is used as a colorant of an ink for inkjet recording, high color formation and high print density are obtained on plain paper and high gloss and high image clarity are obtained on the inkjet special media.

Incidentally, when an admicell can be formed even without performing irradiation of an ultrasonic wave in the above-described step, the ultrasonic irradiation is not necessarily required.

(V) Thereafter, a polymerization initiator is added to the mixed solution prepared as above to perform a polymerization reaction. The polymerization initiator may be added en bloc or in parts at a temperature high enough to activate the polymerization initiator or may be added continuously. Also, after the addition of the polymerization initiator, the mixed solution may be heated to a temperature high enough to active the polymerization initiator. In the present invention, in the case of emulsion polymerization and mini-emulsion polymerization, the reaction can be more suitably performed by dissolving a water-soluble polymerization initiator in ion-exchanged water and adding dropwise the obtained aqueous solution to an aqueous liquid dispersion in a reaction vessel at a predetermined dropping speed. Also, in the case of using an oil-soluble polymerization initiator in the mini-emulsion polymerization, the reaction can be suitably performed by adding the polymerization initiator as it is or after dissolving it in the hydrophobic monomer. The polymerization initiator may be suitably activated by elevating the temperature of the system to a temperature high enough to cause cleavage of the polymerization initiator and generation of an initiator radical. The polymerization initiator is cleaved to generate an initiator radical, and this radial attacks the polymerizable group of the ionic polymerizable surfactant or the polymerizable group of the ionic monomer and hydrophobic monomer, whereby a polymerization reaction takes place. The polymerization temperature and the polymerization reaction time vary depending on the kind of the polymerization initiator used and the kind of the above-described polymerizable compound, but it is easy to appropriately set preferred polymerization conditions. In general, the polymerization temperature is preferably from 40 to 90° C., and the polymerization time is preferably from 3 to 12 hours.

In the polymerization reaction, the ionic surfactant a and the ionic polymerizable surfactants B and C used, and the hydrophobic monomer, the crosslinking monomer, the compound represented by formula (2) and other known polymerizable monomers, which are used, if desired, each may be used as one species or in combination of two or more species. Also, since the polymerization reaction is performed by using an ionic polymerizable surfactant, the mixed solution has a good emulsified state in many cases even without using an emulsifier. Therefore, use of an emulsifier is not necessarily required, but, if desired, at least one member selected from the group consisting of known anionic, nonionic and cationic emulsifiers may be used.

After the completion of polymerization, the obtained aqueous liquid dispersion of the encapsulated product of the present invention is preferably adjusted to a pH of 7.0 to 9.0 and further filtered. The filtration is preferably ultrafiltration.

According to the above-described polymerization method, an ionic surfactant a containing an ionic group and a hydrophobic group is first adsorbed to the surface of a core substance. Then, an ionic polymerizable surfactant B having an electric charge opposite the electric charge of the ionic surfactant a and/or an ionic monomer having an electric charge opposite the electric charge of the ionic surfactant a is considered to be adsorbed. Subsequently, if desired, a polymerizable monomer including a hydrophobic monomer is added (as described above, the polymerizable monomer including a hydrophobic monomer may be added after an ionic polymerizable surfactant C is added), and an ionic polymerizable surfactant C having an electric charge the same as or opposite the electric charge of the ionic group of the ionic surfactant a is further added and mixed. By such a treatment, the configuration form of ionic polymerizable surfactants and polymerizable monomer molecules present in the periphery of the core substance is very highly controlled, and the ionic group (anionic group or cationic group) in the outermost layer is considered to form an oriented state toward the aqueous phase side. When polymerization is performed in this state, a polymer having at least a repeating structural unit derived from the ionic polymerizable surfactant B and a repeating structural unit derived from the ionic polymerizable surfactant C is considered to be formed around the core substance, whereby the encapsulated product of the present invention is obtained. In the case of adding a hydrophobic monomer, a polymer having a repeating structural unit derived from the ionic polymerizable surfactant B, a repeating structural unit derived from the ionic polymerizable surfactant C and a repeating structural unit comprising the hydrophobic monomer is formed around the core substance. Furthermore, according to the polymerization method of the present invention, the production of a water-soluble oligomer or polymer as a by-product is suppressed.

The aqueous liquid dispersion of the encapsulated product obtained by using the polymerization method of the present invention is low in the viscosity and assured of excellent dispersibility and excellent dispersion stability. This is considered to result because, as described above, the ionic group (anionic group or cationic group) in the outermost layer of the encapsulated product is forming a highly oriented state toward the aqueous phase side.

In particular, an ink composition for inkjet recording using the encapsulated product obtained by the polymerization method of the present invention with use of a coloring material particle as the core substance is excellent in the dispersion stability and ejection stability from a recording head and less blurred even on plain paper, so that a printed image with high color formation and high density can be obtained.

Furthermore, the encapsulated product obtained by using the polymerization method of the present invention allows for introduction of a functional group such as ionic group or nonionic group in a highly oriented state into the outermost layer, so that by utilizing such a functional group, a functional group having a peculiar function can be further introduced with ease. By virtue of such introduction, a composite functionality fine particle having several peculiar functions at the same time can be obtained.

The encapsulated product of the present invention may also be produced by using an ionic surfactant b and an ionic surfactant c in place of the ionic polymerizable surfactant B and ionic polymerizable surfactant C. In this case, a hydrophobic monomer must be added. When polymerization is performed by adding a polymerization initiator, a wall material mainly comprising a polymer is formed on a core substance through the ionic surfactant a. In the case of using an ionic surfactant b and an ionic surfactant c, the appropriate amounts added are the same as the appropriate amounts added of the ionic polymerizable surfactant B and ionic polymerizable surfactant C.

The encapsulated product of the present invention obtained in this way has high dispersion stability in an aqueous solvent, and this is considered attributable to the fact that the core substance is completely covered by a polymer layer (an uncovered portion is not present) and at the same time, the hydrophilic group in the polymer layer of the capsule wall material is regularly oriented toward an aqueous solvent.

The production method of the encapsulated product of the present invention is again described by specifically referring, as an example, to a case where a pigment as a coloring material particle is used as the core substance.

First, a pigment is charged into an ion-exchanged water having dissolved therein an anionic polymerizable surfactant and after mixing, the mixed solution is subject to a dispersion treatment in a general dispersing device such as ball mill, roll mill, Eiger mill or jet mill, thereby adsorbing the anionic polymerizable surfactant to the pigment particle surface. Thereafter, the anionic polymerizable surfactant not adsorbed to the pigment particle is removed by ultrafiltration. At this time, if the unadsorbed anionic polymerizable surfactant is excessively removed, the dispersion of the core substance sometimes becomes unstable. Therefore, the degree of ultrafiltration or the like is appropriately determined by taking account of the dispersion stability and the condition of encapsulation.

Next, a cationic polymerizable surfactant and/or a cationic water-soluble monomer is added and mixed to this liquid dispersion comprising the pigment having adsorbed thereto the anionic polymerizable surfactant. At this time, an ultrasonic wave is preferably irradiated on the mixture so as to facilitate the ionic bonding of the cationic group of the cationic polymerizable surfactant and/or the cationic water-soluble monomer to the anionic group of the anionic polymerizable surfactant.

The amount of the cationic polymerizable surfactant and/or the cationic water-soluble monomer added to the pigment liquid dispersion is preferably from 0.5 to 2 molar times, more preferably from 0.8 to 1.2 molar times, based on the total molar number of the ionic group of the anionic polymerizable surfactant adsorbed to the pigment (that is, the amount [mol/g] of the ionic group present on the pigment surface of 1 g of the pigment particle). By adding the cationic polymerizable surfactant and/or the cationic water-soluble monomer in an amount of 0.5 molar times or more based on the total molar amount of the anionic group of the anionic polymerizable surfactant adsorbed to the pigment particle surface, an encapsulated pigment with good dispersibility can be obtained through the subsequent polymerization reaction. On the other hand, when the amount of the cationic polymerizable surfactant and/or the cationic water-soluble monomer added is 2 molar times or less, the generation of a polymer particle (a particle comprising only a polymer) can be suppressed.

Subsequently, a hydrophobic monomer is added and mixed, if desired. At this time, as the polymerizable monomer, in addition to the hydrophobic monomer, a monomer selected from the group consisting of a crosslinking monomer, a compound represented by formula (2) and other known polymerizable monomers may be used in combination within the range of not impairing the effect of the present invention. The timing of adding such a hydrophobic monomer or the like may be after the addition of an anionic polymerizable surfactant described later.

Furthermore, an anionic polymerizable surfactant is added and mixed. Here, the amount of the anionic polymerizable surfactant added is preferably from 0.5 to 10 molar times, more preferably from 0.5 to 5 molar times, based on the cationic polymerizable surfactant and/or the cationic water-soluble monomer. When this amount added is 0.5 molar times or more, the aggregation of the encapsulated pigment particle can be suppressed and a pigment liquid dispersion having excellent dispersion stability can be obtained. In addition, the ink composition using the obtained pigment liquid dispersion exhibits excellent ejection stability from an inkjet recording head and enhanced adsorptivity to paper fiber and gives high print density and high color formation. Also, when the amount added is 10 molar times or less, the amount of the anionic polymerizable surfactant not contributing to the encapsulation of the pigment particle can be decreased and the generation of a polymer particle can be suppressed.

Thereafter, a polymerization initiator is added to the mixed solution prepared as above to perform a polymerization reaction. The polymerization initiator may be added en bloc or in parts to the mixed solution heated at a temperature high enough to activate the polymerization initiator or may be added continuously. Also, after the addition of the polymerization initiator, the mixed solution may be heated to a temperature high enough to active the polymerization initiator. As for the polymerization initiator, either a water-soluble polymerization initiator or an oil-soluble polymerization initiator may be used, but in the case of using a water-soluble polymerization initiator, the polymerization initiator is preferably dissolved in pure water and added dropwise to the mixed solution in a reaction vessel. Also, in the case of using an oil-soluble polymerization initiator, the reaction can be suitably performed by adding the polymerization initiator as it is or after dissolving it in the hydrophobic monomer. The polymerization temperature and the polymerization reaction time vary depending on the kind of the polymerization initiator used and the kind of the polymerizable monomer, but it is easy for one skilled in the art to appropriately set preferred polymerization conditions. In general, the polymerization temperature is preferably from 40 to 90° C., and the polymerization time is preferably from 3 to 12 hours.

After the completion of polymerization, the obtained aqueous liquid dispersion of the encapsulated pigment of the present invention is preferably adjusted to a pH of 7.0 to 9.0 and further filtered. The filtration is preferably ultrafiltration.

According to the above-described encapsulation method of the present invention, an ionic polymerizable surfactant and a polymerizable monomer molecule take a very high configuration form in the periphery of a pigment particle, and the outermost layer is in such a state that an anionic group is densely oriented toward the aqueous phase. After performing polymerization in this state, an encapsulated pigment where the periphery of a pigment particle is covered with a polymer in a highly controlled form can be obtained.

Furthermore, according to the encapsulation method of the present invention, the production of a water-soluble oligomer or polymer as a by-product is suppressed.

As a result, an encapsulated pigment liquid dispersion having a low viscosity is obtained and at the same time, the purification step such as ultrafiltration is facilitated.

The encapsulated pigment obtained in the present invention has a form such that a pigment particle is covered with a polymer which is a capsule wall material, and when an antioxidant, a plasticizer and the like are added, if desired, to the mixed solution before polymerization or during polymerization reaction, these additives may be incorporated into the polymer. As for the antioxidant, plasticizer and the like, known materials may be used.

In the case of using the encapsulated pigment of the present invention for an ink, particularly, an ink composition for inkjet recording, the encapsulated pigment is preferably purified before use by previously removing the unreacted material (for example, the polymerizable compound used such as ionic polymerizable surfactant and hydrophobic monomer). In this case, the amount of the unreacted material contained in the encapsulated pigment liquid dispersion is preferably 50,000 ppm or less, more preferably 10,000 ppm or less. As for the method of removing the unreacted material, a centrifugal separation method, an ultrafiltration method and the like may be used. The above-described amount of the unreacted material can be easily measured by using gas chromatography or liquid chromatography. By virtue of reducing the unreacted monomer concentration in the encapsulated pigment liquid dispersion, an image printed on plain paper can have excellent color saturation and high printing density (print density) and there is also obtained an effect that the generation of blurring of the image is suppressed. Furthermore, an image printed on special media for inkjet recording, particularly, on inkjet gloss media, can have higher gloss.

In the case of using the encapsulated pigment of the present invention for an ink, particularly, an ink composition for inkjet recording, the particle diameter of the encapsulated pigment is preferably 400 nm or less, more preferably 300 nm or less, still more preferably from 20 to 200 nm (the particle diameter of the encapsulated pigment can be measured, for example, by using a commercially available dynamic light-scattering particle size distribution analyzer or laser Doppler system particle size distribution analyzer).

In the case of using the encapsulated pigment of the present invention for an ink, particularly, an ink composition for inkjet recording, the glass transition temperature (Tg) of the polymer as a main component of the capsule wall material for the encapsulated pigment of the present invention is preferably 30° C. or less, more preferably 15° C. or less. A desired glass transition temperature can be obtained by selecting the monomer used and selecting the ratio of monomers used. The glass transition temperature of the polymer can be estimated, as described above, by using the Fox formula. When the glass transition temperature of the polymer as a main component of the capsule wall material is 30° C. or less, not only an image with excellent gloss, high color saturation and excellent sharpness is obtained but also adhesion of the encapsulated pigment to a recording medium is facilitated. Furthermore, when the Tg of the polymer as the main component of the capsule wall material is 30° C. or less, the encapsulated coloring materials are readily joined with each other on a recording medium, and this advantageously enables to more enhance the scratch resistance of the image and increase the adhesion to a recording medium. The Tg is still more preferably 10° C. or less.

The ink composition using the encapsulated pigment obtained by the above-described production method is low in the viscosity and assured of excellent dispersibility and excellent dispersion stability and particularly when used as an ink composition for inkjet recording, excellent ejection stability from a recording heat is ensured, so that a printed image with high color formation and high density can be obtained on plain paper and a printed image with high gloss and high clarity can be obtained on special media for inkjet recording.

[Ink Composition]

In the present invention, the encapsulated coloring material obtained when a coloring material is used as the core substance can be used for an ink composition and is preferably used particularly as a coloring material of an ink for inkjet recording. In particular, the coloring particle is preferably a pigment. The ink composition for inkjet recording using an encapsulated pigment where a pigment is used as the coloring material particle in the encapsulated coloring material obtained by the present invention, is described below.

[Ink for Inkjet Recording]

The ink composition for inkjet recording of the present invention is an aqueous ink composition where the above-described encapsulated pigment is contained in the dispersed state in an aqueous medium. The encapsulated pigment content in the ink composition is preferably from 1 to 20 wt %, more preferably from 3 to 15 wt %, based on the entire weight of the ink composition. For obtaining high print density and high color formation, this content is still more preferably from 5 to 15 wt %.

The solvent for use in the ink composition of the present invention preferably comprises water and a water-soluble organic solvent and may contain other components, if desired.

Also, in order to impart water retentivity and wettability to the ink composition for inkjet recording, a wetting agent comprising a high boiling point water-soluble organic solvent is preferably added to the ink composition of the present invention. The high boiling point water-soluble organic solvent is preferably a water-soluble organic solvent having a boiling point of 180° C. or more.

Specific examples of the water-soluble organic solvent having a boiling point of 180° C. or more, which can be used in the present invention, include ethylene glycol, propylene glycol, diethylene glycol, pentamethylene glycol, trimethylene glycol, 2-butene-1,4-diol, 2-ethyl-1,3-hexanediol, 2-methyl-2,4-pentanediol, tripropylene glycol, polyethylene glycol having a molecular weight of 2,000 or less, 1,3-propylene glycol, isopropylene glycol, isobutylene glycol, glycerin, mesoerythritol and pentaerythritol. The boiling point of the high boiling point water-soluble organic solvent for use in the present invention is more preferably 200° C. or more. In the ink composition of the present invention, one of these high boiling point water-soluble organic solvents may be used alone, or two or more species thereof may be used. By virtue of adding a high boiling point water-soluble organic solvent to the ink composition, an ink for inkjet recording capable of maintaining flowability and re-dispersibility for a long period of time even when allowed to stand in an open state (a state such that the ink composition is in contact with air at room temperature), can be obtained. Furthermore, such an ink composition scarcely causes clogging of an inkjet nozzle during printing in an inkjet printer or at the restarting after interruption of printing, so that an ink composition assured of high ejection stability from an inkjet nozzle can be obtained.

The total content of the water-soluble organic solvent including the high boiling point water-soluble organic solvent is preferably on the order of 10 to 50 wt %, more preferably from 10 to 30 wt %, based on the entire weight of the ink composition.

The ink composition of the present invention may further contain one or more polar solvent selected from the group consisting of 2-pyrrolidone, N-methylpyrrolidone, ε-caprolactam, dimethyl sulfoxide, sulfolane, morpholine, N-ethylmorpholine and 1,3-dimethyl-2-imidazolidinone. The addition of a polar solvent provides an effect that the dispersibility of the encapsulated pigment particle in the ink composition is enhanced, and good ejection stability of the ink is ensured.

The content of such a polar solvent is preferably from 0.1 to 20 wt %, more preferably from 1 to 10 wt %, based on the entire weight of the ink composition.

For the purpose of accelerating the penetration of the aqueous solvent into the recording medium, the ink composition of the present invention preferably further contains a penetrant. By virtue of prompt penetration of the aqueous solvent into the recording medium, a recorded matter having a less blurred image can be obtained. As for such a penetrant, an alkyl ether of a polyhydric alcohol (also called glycol ethers) and/or a 1,2-alkyldiol is preferably used. Examples of the alkyl ether of a polyhydric alcohol include ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, ethylene glycol mono-n-propyl ether, ethylene glycol mono-iso-propyl ether, diethylene glycol mono-iso-propyl ether, ethylene glycol mono-n-butyl ether, diethylene glycol mono-n-butyl ether, triethylene glycol mono-n-butyl ether, ethylene glycol mono-tert-butyl ether, diethylene glycol mono-tert-butyl ether, 1-methyl-1-methoxybutanol, propylene glycol monomethyl ether, propylene glycol monoethyl ether, propylene glycol mono-tert-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, propylene glycol mono-n-butyl ether and dipropylene glycol mono-n-butyl ether. Examples of the 1,2-alkyldiol include 1,2-pentanediol and 1,2-hexanediol. Other examples include diols of a linear hydrocarbon, such as 1,3-propanediol, 1,4-butanediol, 1,5-pentanediol, 1,6-hexanediol, 1,7-heptanediol and 1,8-octanediol. An appropriate penetrant may be selected from these and used in the ink composition of the present invention.

Particularly, in the embodiment of the present invention, at least one member selected from propylene glycol monobutyl ether, dipropylene glycol monobutyl ether, diethylene glycol monobutyl ether, triethylene glycol monobutyl ether, 1,2-pentanediol and 1,2-hexanediol is preferably used as the penetrant. The penetrant content is, in terms of the total amount, preferably from 1 to 20 wt %; more preferably from 1 to 10 wt %, based on the entire weight of the ink composition. When the penetrant content is 1 wt % or more, an effect of enhancing the penetrability of the ink composition into the recording medium is obtained, and when the content is 20 wt % or less, generation of blurring on the image printed by using this ink composition can be prevented and excessive increase in the viscosity of the ink composition can be suppressed. In particular, when a 1,2-alkyldiol such as 1,2-pentanediol and 1,2-hexanediol is used in the ink composition, good drying property of the ink composition after printing can be obtained and blurring of the image can be reduced.

Also, when glycerin is incorporated into the ink composition of the present invention, clogging of an inkjet nozzle on using the ink composition for inkjet recording is less generated, and the storage stability of the ink composition itself may also be enhanced.

Furthermore, in the case of using glycol ethers in the ink composition of the present invention, an acetylene glycol-based surfactant described later is preferably used in combination with the glycol ethers.

The ink composition of the present invention preferably contains a surfactant, particularly an anionic surfactant and/or a nonionic surfactant. Specific examples of the anionic surfactant include an alkanesulfonate, an α-olefinsulfonate, an alkylbenzenesulfonate, an alkyl-naphthalenesulfonic acid, an acylmethyltaurine acid, a dialkylsulfosuccinic acid, an alkylsulfuric ester salt, a sulfated oil, a sulfated olefin, a polyoxyethylene alkyl ether sulfuric ester salt, a fatty acid salt, an alkyl sarcosine salt, an alkylphosphoric ester salt, a polyoxyethylene alkyl ether phosphoric ester salt and a monoglyceride phosphoric ester salt. Specific examples of the nonionic surfactant include a polyoxyethylene alkyl ether, a polyoxyethylene alkyl phenyl ether, a poly-oxyethylene alkyl ester, a polyoxyethylene alkylamide, a glycerin alkyl ester, a sorbitan alkyl ester, a sugar alkyl ester, a polyhydric alcohol alkyl ether, and an alkanolamine fatty acid amide.

More specifically, examples of the anionic surfactant include sodium dodecylbenzenesulfonate, sodium laurate and an ammonium salt of a polyoxyethylene alkyl ether sulfate, and examples of the nonionic surfactant include an ether-based compound such as polyoxyethylene nonyl phenyl ether, polyoxyethylene octyl phenyl ether, polyoxyethylene dodecyl phenyl ether, polyoxyethylene alkyl allyl ether, polyoxy-ethylene oleyl ether, polyoxyethylene lauryl ether, polyoxyethylene alkyl ether and polyoxyalkylene alkyl ether, and an ester-based compound such as polyoxyethylene oleic acid, polyoxyethylene oleic acid ester, polyoxyethylene distearic acid ester, sorbitan laurate, sorbitan monostearate, sorbitan monooleate, sorbitan sesquioleate, polyoxyethylene monooleate and polyoxyethylene stearate.

In particular, the ink for inkjet recording according to the embodiment of the present invention preferably contains, as the surfactant, an acetylene glycol-based surfactant and/or an acetylene alcohol-based surfactant. By virtue of such a surfactant, the aqueous solvent contained in the ink composition can readily penetrate into the recording medium and therefore, a less blurred image can be printed on various recording mediums.

Preferred specific examples of the acetylene glycol-based surfactant for use in the present invention include a compound represented by the following formula (6):

[Chem. 35]

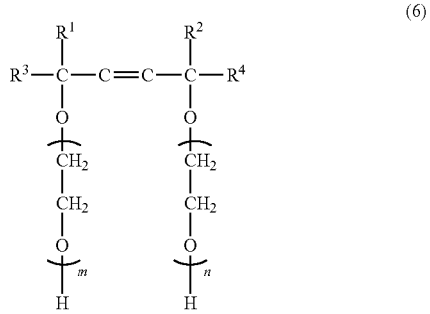

(6)

wherein m and n each is a number satisfying $0 \leqq m+n \leqq 50$, and $R^1$, $R^2$, $R^3$ and $R^4$ each is independently an alkyl group (preferably an alkyl group having a carbon number of 6, or less).

Particularly preferred examples of the compound represented by formula (6) include 2,4,7,9-tetramethyl-5-decyne-4,7-diol, 3,6-dimethyl-4-octyne-3,6-diol and 3,5-dimethyl-1-hexyn-3-ol. A commercial product available as an acetylene glycol-based surfactant on the market may also be used as the compound represented by formula (6). Specific examples thereof include Surfynol 104, 82, 465, 485, 104PG50 and TG (all are trade names, available from Air Products and Chemicals, Inc.); and Olfine STG and Olfine E1010 (both are trade names, produced by Nissin Chemical Industry Co., Ltd.). Examples of the commercial product as the acetylene alcohol-based surfactant include Surfynol 61 (trade name, available from Air Products and Chemicals, Inc.).

Such an acetylene glycol-based surfactant and/or acetylene alcohol-based surfactant is preferably used to account for 0.01 to 10 wt %, more preferably from 0.1 to 5 wt %, based on the entire weight of the ink composition.

[Resin Particle Added to Ink Composition]

As described above, in the encapsulated pigment of the present invention, when the pigment particle is encapsulated with a capsule wall material mainly comprising a polymer having a crosslinked structure derived from a crosslinking monomer, a polymer having a repeating structural unit derived from the monomer represented by formula (2), or a polymer having both of these in the structure, high mechanical strength, heat resistance and solvent resistance may be obtained, but the plasticity of the polymer tends to become insufficient, causing reduction in the fixing property of the coloring material to the recording medium or the scratch resistance. However, by using a fine polymer particle having the above-described properties in combination, the fixing property and scratch resistance can be compensated for.

The fine polymer particle for use in the ink composition of the present invention preferably has, on the surface thereof, the same species of ionic group as the ionic group on the surface of the encapsulated pigment of the present invention and has a glass transition point of 30° C. or less and a volume average particle diameter of 10 to 100 nm.

The above-described fine polymer particle has a film-forming property and when the ink composition of the present invention containing this fine polymer particle is printed on a recording medium such as plain paper or special media for inkjet recording, the solvent component (including water) in the ink composition penetrates into the recording medium, as a result, the polymer particle and the encapsulated pigment particle come near each other, and the polymer particle forms a polymer film to embrace the encapsulated pigment particle. By virtue of such a polymer film, the encapsulated pigment in the ink can be more firmly fixed on the recording medium surface, so that an image having very excellent resistance against scratches and water can be formed.

In order to impart good film-forming property to the fine polymer particle, as described above, the glass transition temperature of the polymer is preferably 30° C. or less, more preferably 15° C. or less, still more preferably 10° C. or less. The glass transition temperature of the polymer can be adjusted by appropriately selecting the kind or compositional ratio of the monomers used. In the present invention, a glass transition temperature obtained by measuring the temperature rise by means of a differential scanning calorimeter (DSC) is used as the glass transition temperature of the polymer.

This fine polymer particle does not cause aggregation even when present together with the encapsulated pigment particle of the present invention in the ink composition, and a good dispersed state is obtained.

Furthermore, when the particle diameter of the fine polymer particle is from 10 to 100 nm in terms of the volume average particle diameter, an image having good gloss and high clarity is obtained.

Specifically, the fine polymer particle preferably comprises a polymer containing at least from 1 to 10 wt % of a repeating unit derived from an ionic group-containing unsaturated vinyl monomer, more preferably a polymer containing from 1 to 10 wt % of a repeating unit derived from an ionic group-containing unsaturated vinyl monomer, having a structure crosslinked with a crosslinking monomer having two or more polymerizable double bonds, and containing from 0.2 to 4 wt % of a structure derived from this crosslinking monomer. When crosslinking monomers having two or more, preferably three or more, polymerizable double bonds are copolymerized with another polymerizable monomer at the polymerization, thereby crosslinking the polymer chains, and a fine polymer particle comprising such a crosslinked polymer is used for the ink composition, the surface of a nozzle plate of an inkjet recording device becomes more difficult to wet with the ink composition, so that the ink droplet can be prevented from flight bending and the ejection stability can be enhanced.

The fine polymer particle for use in the present invention can be produced by a known emulsion polymerization method. For example, an unsaturated vinyl monomer is emulsion-polymerized in water in the presence of a polymerization initiator and an emulsifier, whereby the fine polymer particle can be obtained. As for the unsaturated vinyl monomer, those the same as the above-described hydrophobic monomer may be used.

The polymerization initiator, emulsifier, surfactant, molecular-adjusting agent, neutralizer and the like used at the production of the fine polymer particle are used according to a known method. In particular, when the above-described anionic polymerizable surfactant is used as the emulsifier, since the anionic polymerizable surfactant is copolymerized with the monomer, the amount of the emulsifier in the liquid becomes small and in turn, bubbling in the liquid is suppressed, as a result, the ejection stability of the ink composition is more enhanced. Also, when the same anionic polymerizable surfactant as that used for the encapsulated pigment of the present invention is used, the dispersion stability and the storage stability become remarkably excellent.

In the case of using the above-described fine polymer particle in the ink composition of the present invention, the fine polymer particle may be used as a fine particle power, but a polymer emulsion prepared by dispersing the fine polymer particle in a water medium is preferably mixed with other components contained in the ink composition. The amount of the fine polymer particle contained in the ink composition is preferably on the order of 0.01 to 10 wt %, more preferably on the order of 0.01 to 5 wt %, based on the entire weight of the ink composition.

[Other Additives, etc. for Ink Composition]

The ink composition of the present invention may contain a pH adjusting agent. In the case where the pigment particle or polymer particle has an anionic group on the surface, the pH of the ink composition is preferably adjusted to 7 to 11, more preferably from 8 to 9, and a basic compound is preferably used as the pH adjusting agent. Also, in the case where the pigment particle or polymer particle has a cationic group on the surface, the pH of the ink composition is preferably adjusted to 5 to 7, more preferably from 6 to 7, and an acidic compound is preferably used as the pH adjusting agent.

Specific examples of the basic compound preferred as the pH adjusting agent include alkali metal salts such as sodium hydroxide, potassium hydroxide, lithium hydroxide, sodium carbonate, sodium hydrogencarbonate, potassium carbonate, lithium carbonate, sodium phosphate, potassium phosphate, lithium phosphate, potassium dihydrogenphosphate, dipotassium hydrogenphosphate, sodium oxalate, potassium oxalate, lithium oxalate, sodium borate, sodium tetraborate, potassium hydrogenphthalate and potassium hydrogentartrate; ammonia; and amines such as methylamine, ethylamine, diethylamine, trimethylamine, triethylamine, tris(hydroxymethyl)aminomethane hydrochloride, triethanolamine, diethanolamine, diethylethanolamine, triisopropenolamine, butyldiethanolamine, morpholine and propanolamine.

Among these, when an alkali hydroxide compound or an amine alcohol is added to the ink composition, the dispersion stability of the anionic group-containing pigment particle in the ink can be enhanced.

Also, for the purpose of preventing fungus, putrefaction or rust, one or more kind of compound selected from a benzoic acid, a dichlorophene, a hexachlorophene, a sorbic acid, a p-hydroxybenzoic acid ester, an ethylenediaminetetraacetic acid (EDTA), a sodium dehydroacetate, a 1,2-benthiazolin-3-one [product name: Proxel XL (produced by Avecia)], a 3,4-isothiazolin-3-one and a 4,4-dimethyloxazolidine, may be added to the ink composition of the present invention.

Furthermore, for the purpose of preventing nozzles of an inkjet recording head from being dried, at least one member selected from the group consisting of urea, thiourea and ethylene urea may also be added to the ink composition of the present invention.

One particularly preferred embodiment of the ink composition according to the present invention is, for example, an ink composition comprising at least:

(1) the above-described encapsulated pigment,
(2) one or more compound (penetrant) selected from the group consisting of diethylene glycol monobutyl ether, triethylene glycol monobutyl ether and a 1,2-alkyldiol having a carbon number of 4 to 10,
(4) glycerin, and
(5) water.

Another particularly preferred embodiment of the ink composition according to the present invention is, for example, an ink composition comprising at least:

(1) the above-described encapsulated pigment,
(2) one or more compound (penetrant) selected from the group consisting of diethylene glycol monobutyl ether, triethylene glycol monobutyl ether and a 1,2-alkyldiol having a carbon number of 4 to 10,
(3) an acetylene glycol-based surfactant and/or an acetylene alcohol-based surfactant,
(4) glycerin, and
(5) water.

In each of these embodiments, in the case of using diethylene glycol monobutyl ether and/or triethylene glycol monobutyl ether of (2) as the penetrant, the amount added thereof is preferably 10 wt % or less, more preferably from to 5 wt %, based on the entire weight of the ink composition. By virtue of adding diethylene glycol monobutyl ether and/or triethylene glycol monobutyl ether to the ink composition, the penetrability of the ink composition into the recording medium can be increased and this is useful for the enhancement of printing quality. Also, diethylene glycol monobutyl ether and/or triethylene glycol monobutyl ether has an effect of increasing the solubility of an acetylene glycol-based surfactant.

In each of the above-described embodiments, in the case of using a 1,2-alkyldiol having a carbon number of 4 to 10 of (2) as the penetrant, the amount added thereof is preferably 15 wt % or less based on the entire weight of the ink composition. If a 1,2-alkyldiol having a carbon number of 3 or less is used, sufficiently high penetrability of the ink composition into the recording medium cannot be obtained. Also, a 1,2-alkyldiol having a carbon number of more than 15 is difficult to dissolve in water and this is not preferred. If the amount of a 1,2-alkyldiol in the ink composition exceeds 15 wt %, the viscosity of the ink composition disadvantageously tends to be increased. As for the 1,2-alkyldiol, specifically, 1,2-pentanediol or 1,2-hexanediol is preferably used, and either one may be used alone or both may be used in combination. The 1,2-pentanediol is preferably added in an amount of 3 to 15 wt % based on the entire weight of the ink composition. By adding 1,2-pentanediol in an amount of 3 wt % or more to the ink composition, an ink composition with good penetrability is obtained. The 1,2-hexanediol is preferably added in an amount of 0.5 to 10 wt % based on the entire weight of the ink composition, and within this range, an ink composition with good penetrability is obtained.

Furthermore, in the case where the ink composition according to each of the above-described embodiments is used for an inkjet recording method, in order to less cause clogging of an inkjet nozzle (enhancement of clogging reliability), a solid wetting agent is preferably added in an amount of 3 to 20 wt % based on the entire weight of the ink composition. The addition of a solid moisture-retaining agent is not limited to the embodiments described above, but the solid wetting agent may be added to an ink composition using the encapsulated pigment of the present invention.

The solid wetting agent means a water-soluble substance which is solid at ordinary temperature (25° C.) and has a water-retaining function. Preferred examples of the solid wetting agent include saccharides, sugar alcohols, hyaluronate, trimethylolpropane and 1,2,6-hexanetriol. Examples of the sugar include a monosaccharide, a disaccharide, an oligosaccharide (including a trisaccharide and a tetrasaccharide) and a polysaccharide, and among these sugars, preferred are glucose, mannose, fructose, ribose, xylose, arabinose, galactose, aldonic acid, glucitol, sorbit, maltose, cellobiose, lactose, sucrose, trehalose and maltotriose. The term "polysaccharides" as used herein means a sugar in its broad sense and is used as the meaning of including substances widely occurring in nature, such as alginic acid, α-cyclodextrin and cellulose. Also, the derivative of such saccharides includes a reduced sugar of the above-described saccharides (for example, a sugar alcohol represented by the formula: $HOCH_2(CHOH)_n CH_2OH$ (wherein n represents an integer of 2 to 5)), an oxidized sugar (for example, an aldonic acid and a uronic acid), an amino acid and a thiosugar. In particular, sugar alcohols are preferred, and specific examples thereof include maltitol, sorbitol and xylitol. As for the hyaluronate, those commercially available as an aqueous 1% sodium hyaluronate solution (molecular weight: 350,000) may be used. Among these solid wetting agents, more preferred are trimethylolpropane, 1,2,6-hexanetriol, saccharides and sugar alcohols. One species or two or more species of these solid wetting agents may be added in the ink composition of the present invention.

When the solid wetting agent is used in the ink composition, the evaporation of water of the ink can be suppressed by the water retaining function, so that increase in the viscosity of the ink composition does not occur in the ink flow path of an inkjet printer or in the vicinity of an inkjet nozzle, and film formation due to evaporation of water of the ink composition and in turn clogging of a nozzle hardly occur. Also, the above-described solid wetting agent is chemically stable and therefore, does not decompose in the ink composition, so that the quality of the ink composition can be maintained for a long period of time. Furthermore, even when the above-described solid wetting agent is added to the ink composition, the nozzle plate is not wetted with the ink composition and stable ejection of the ink composition from an inkjet nozzle can be attained. These effects are remarkable particularly when a compound selected from trimethylolpropane, 1,2,6-hexanetriol, saccharides and sugar alcohols is used as the solid moisture-retaining agent.

The amount of the solid wetting agent added in the ink composition of the present invention is, in terms of the total amount, preferably from 3 to 20 wt %, more preferably from 3 to 10 wt %, based on the entire weight of the ink composition. In the case of using two or more kinds of solid wetting agents as a mixture, the combination thereof is preferably a combination of one or more member selected from saccharides, sugar alcohols and a hyaluronate and one or more member selected from trimethylolpropane and 1,2,6-hexanetriol. When solid wetting agents in this combination are added to the ink composition, the increase in the viscosity of the ink composition can be suppressed. When the amount of the solid wetting agent contained in the ink composition is 3 wt % or more, an effect of preventing clogging of the inkjet nozzle can be obtained, and when the amount of the solid wetting agent contained in the ink composition is 20 wt % or less, the ink composition can be stably ejected from the inkjet nozzle and therefore, an ink composition having sufficiently low viscosity can be obtained.

In the latter embodiment above, an acetylene glycol-based surfactant and/or an acetylene alcohol-based surfactant of (3) is added to the ink composition, and the total amount of these surfactants is preferably from 0.01 to 10 wt %, more preferably from 0.1 to 5 wt %, based on the entire weight of the ink composition.

The ink composition in each of the above-described embodiments ensures particularly high dispersion stability of pigment and excellent ejection stability form an inkjet head nozzle when used for an inkjet recording method and enables stable printing without clogging of nozzles for a long period of time. Furthermore, when this ink composition is printed on a recording medium such as plain paper, recycled paper and coated paper, good drying property of the ink after printing is ensured. By using this ink composition, a high-quality image with no blurring, high print density and excellent color formation can be obtained.

The present invention is described above and there are the following differences between an ink composition prepared by using the encapsulated pigment of the present invention and an ink composition prepared by using a conventionally known pigment.

In an ink composition using a pigment liquid dispersion prepared by dispersing a pigment with use of a dispersant such as surfactant and polymer dispersant and further using the above-described acetylene glycol-based surfactant and/or acetylene alcohol-based surfactant and a penetrant such as diethylene glycol monobutyl ether, the dispersant readily desorbs from the pigment surface due to strong shear force applied at the ejection through a fine inkjet nozzle, giving rise to deterioration of the dispersibility, and the ejection tends to be unstable. On the other hand, such a phenomenon does not occur at all in the ink composition obtained by the present invention, and the ink composition can be stably ejected through an inkjet nozzle for a long period of time. Furthermore, the encapsulated pigment particle obtained by the present invention has good solvent resistance and this hardly allows for desorption of the polymer of the capsule wall material from the pigment particle surface, swelling of the polymer or the like due to the penetrant, so that the stably dispersion of the pigment particle in the ink composition can be maintained for a long time.

Also, in a known ink composition using a pigment liquid dispersion obtained by dispersing a pigment with use of a dispersant such as surfactant and polymer dispersant and being enhanced in the penetrability, the viscosity of the ink composition tends to be high due to the dispersant dissolved in the pigment liquid dispersion, because in general, the dispersant is not entirely adsorbed to the pigment surface at the initial stage after dispersing the pigment in a liquid dispersion medium. Furthermore, the dispersant desorbs from the pigment with the passing of time after the dispersion of pigment and due to this desorbed dispersant, the viscosity of the ink composition tends to be high. Therefore, the pigment content in the pigment liquid dispersion cannot be increased in many cases. When an ink composition using a pigment liquid dispersion having a small pigment content is used for printing particularly on plain paper or recycled paper, a sufficiently high print density and good color formation of an image are often not obtained. On the other hand, in the ink composition using the encapsulated pigment obtained by the present invention, increase in the viscosity of the ink composition scarcely occurs in aging. Accordingly, the ink composition using the encapsulated pigment obtained by the present invention is advantageous in that low viscosity can be easily attained and a larger number of pigment particles can be contained, and even when plain paper or recycled paper is used as the printing medium, a sufficiently high print density can be obtained.

The encapsulated pigment obtained by the present invention is shaped like a true sphere and therefore, the flow property of the ink composition using this pigment readily becomes Newtonian. This is considered attributable to the fact that the ionic group on the encapsulated pigment surface is regularly and densely oriented toward the aqueous solvent side and an effective electrostatic repulsive force is generated between the encapsulated pigments. Therefore, as compared with conventional encapsulated pigments, the ink composition using the encapsulated pigment obtained by the present invention exhibits excellent ejection stability from the inkjet head in the inkjet recording method. In addition, even when the amount of the encapsulated in the ink composition is increased, by virtue of excellent dispersibility and dispersion stability (high dispersibility) of the pigment, an ink composition for inkjet recording increased in the concentration of the colorant contained can be produced and by using this ink composition, an image having a high print density can be obtained. The ink composition obtained by the present invention is particularly preferred as an ink composition for use in an inkjet recording method, but the usage thereof is not limited.

The ink composition prepared by using the micro-encapsulated pigment of the present invention preferably further comprises a compound represented by the following formula (1):

[Chem. 36]

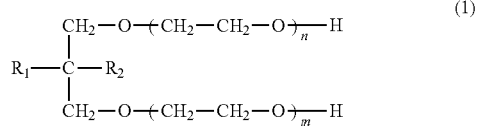

(1)

(wherein $R_1$ and $R_2$ each independently represents an alkyl group having a carbon number of 1 to 10, m and n each represents a number of repeating units, and m+n is from 0 to 10 on average).

In the compound of formula (1), $R_1$ and $R_2$ each is independently an alkyl group having a carbon number of 1 to 10, m and n each is a number of repeating units, and m+n is from 0 to 10 on average, but in order to obtain an aqueous ink composition ensuring that an ink giving less blurring and high color formation on plain paper and having fixing property on special paper in addition to sufficiently high color formation can be prepared and excellent ejection stability and a satisfactory line width at printing can be further secured in the inkjet recording, the carbon number of $R_1+R_2$ is preferably from 5 to 15, and m+n is preferably from 0 to 7.

The content of the compound represented by formula (1) in the ink composition comprising the compound is preferably from 0.1 to 20 wt %, more preferably from 0.3 to 10 wt %, based on the entire weight of the ink composition. In order to obtain good gloss and high image clarity, the content is still more preferably from 0.5 to 10 wt %.

EXAMPLES

The present invention is described in greater detail below based on Examples, but the present invention is not limited to these Examples. In Examples below, the "parts" means "parts by mass".

The anionic polymerizable surfactant, AQUALON KH-10 (produced by Dai-ichi Kogyo Seiyaku Co., Ltd.), used in Examples is a compound represented by the following formula:

[Chem. 37]

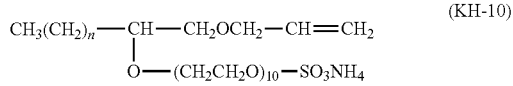

(KH-10)

n = 9, 11

[Production of Encapsulated Pigment "MCP1"]

First, 50 g of an anionic polymerizable surfactant, AQUALON KH-10 (produced by Dai-ichi Kogyo Seiyaku Co., Ltd.), was dissolved in 850 g of ion-exchanged water, and 100 g of an isoindolinone pigment (C.I. Pigment Red 122) was added thereto and mixed. The resulting mixed solution was subjected to a dispersion treatment for 5 hours by using a disperser, Eiger Motor Mill Model M250 (trade name, manufactured by Eiger Japan Co., Ltd.), under the conditions of a bead loading of 70% and a rotation number of 5,000 rpm. After the dispersion treatment, the solution was ultrafiltered by a cross-flow process in an ultra-filtration apparatus until AQUALON KH-10/pigment became 25/100 (this value was determined from the solid content concentration and the pigment concentration), thereby adjusting the solid content concentration to 15 wt %.

Subsequently, 6.7 g of dimethylaminoethylmethacrylate methyl chloride salt as a cationic water-soluble monomer was added thereto and mixed, and an ultrasonic wave was irradiated for 30 minutes. To the resulting mixed solution, 8.2 g of benzyl methacrylate, 3.2 g of isobornyl methacrylate and 3.2 g of lauryl methacrylate were added and mixed, and 25.0 g of the anionic polymerizable surfactant, AQUALON KH-10, dissolved in 100 g of ion-exchanged water was further added and mixed. Then, an ultrasonic wave was again irradiated for 30 minutes.

This mixed solution was charged into a reaction vessel equipped with a stirrer, a reflux condenser, a dropping funnel, a temperature regulator, a nitrogen inlet tube and an ultrasonic wave generator and after elevating the internal temperature of the reaction vessel to 80° C. under irradiation of an ultrasonic wave for 30 minutes, an aqueous solution prepared by dissolving 1.5 g of potassium persulfate as a polymerization initiator in 100 g of ion-exchanged water was added dropwise, and the polymerization reaction was performed at 80° C. for 6 hours while introducing nitrogen into the reaction vessel. After the completion of polymerization, the pH was adjusted to 8 with an aqueous 1 mol/liter potassium hydroxide solution, and coarse particles were then removed by filtration through a membrane filter having a pore size of 1 μm. The residue was ultrafiltered by a cross-flow process in an ultra-filtration apparatus and concentrated to have a solid content concentration of 15 wt %, thereby obtaining a liquid dispersion of the encapsulated pigment of the present invention. The volume average particle diameter of the encapsulated pigment in the liquid dispersion was measured by a laser Doppler system particle size distribution analyzer, Microtrac UPA150 (trade name), manufactured by Leads & Northlop Co. and found to be 120 nm. The resulting liquid dispersion was dried at room temperature to obtain a solid matter, and the glass transition temperature of the encapsulating polymer of the encapsulated pigment particle was determined by thermally analyzing the solid matter with use of a thermal scanning calorimeter (differential scanning calorimeter: DSC), DSC200 (trade name, manufactured by Seiko Instruments & Electronics Ltd.), and found to be 33° C.

[Production of Encapsulated Pigment "MCP2"]

First, 50 g of dimethylaminoethylmethacrylate octyl chloride salt as a cationic polymerizable surfactant was dissolved in 850 g of ion-exchanged water, and 100 g of an isoindolinone pigment (C.I. Pigment Red 122) was added thereto and mixed. The resulting mixed solution was subjected to a dispersion treatment for 5 hours by using a disperser, Eiger Motor Mill Model M250 (trade name, manufactured by Eiger Japan Co., Ltd.), under the conditions of a bead loading of 70% and a rotation number of 5,000 rpm. After the dispersion treatment, the solution was ultrafiltered by a cross-flow process in an ultra-filtration apparatus until dimethylaminoethylmethacrylate methyl chloride salt/pigment became 25/100 (this value was determined from the solid content concentration and the pigment concentration), thereby adjusting the solid content concentration to 15 wt %.

Subsequently, 94.0 g of an anionic polymerizable surfactant, AQUALON KH-10 (produced by Dai-ichi Kogyo Seiyaku Co., Ltd.), was added thereto and mixed, and an ultrasonic wave was irradiated for 30 minutes. To the resulting mixed solution, 8.2 g of benzyl methacrylate, 3.2 g of isobornyl methacrylate and 3.2 g of lauryl methacrylate were added and mixed, and 94.0 g of the anionic polymerizable surfactant, AQUALON KH-10, dissolved in 300 g of ion-exchanged water was further added and mixed. Then, an ultrasonic wave was again irradiated for 30 minutes.

This mixed solution was charged into a reaction vessel equipped with a stirrer, a reflux condenser, a dropping funnel, a temperature regulator, a nitrogen inlet tube and an ultrasonic wave generator and after elevating the internal temperature of the reaction vessel to 80° C. under irradiation of an ultrasonic wave for 30 minutes, an aqueous solution prepared by dissolving 4.6 g of potassium persulfate as a polymerization initiator in 200 g of ion-exchanged water was added dropwise, and the polymerization reaction was performed at 80° C. for 6 hours while introducing nitrogen into the reaction vessel. After the completion of polymerization, the pH was adjusted to 8 with an aqueous 1 mol/liter potassium hydroxide solution, and coarse particles were then removed by filtration through a membrane filter having a pore size of 1 μm. The residue was ultrafiltered by a cross-flow process in an ultra-filtration apparatus and concentrated to have a solid content concentration of 15 wt %, thereby obtaining a liquid dispersion of the encapsulated pigment of the present invention. The volume average particle diameter of the encapsulated pigment in the liquid dispersion was measured by a laser Doppler system particle size distribution analyzer, Microtrac UPA150 (trade name), manufactured by Leads & Northlop Co. and found to be 120 nm. The resulting liquid dispersion was dried at room temperature to obtain a solid matter, and the glass transition temperature of the encapsulating polymer of the encapsulated pigment particle was determined by thermally analyzing the solid matter with use of a thermal-scanning calorimeter (differential scanning calorimeter: DSC), DSC200 (trade name, manufactured by Seiko Instruments & Electronics Ltd.), and found to be 25° C.

[Production of Encapsulated Pigment "MCP3"]

First, 50 g of an anionic polymerizable surfactant, AQUALON KH-10 (produced by Dai-ichi Kogyo Seiyaku Co., Ltd.), was dissolved in 850 g of ion-exchanged water, and 100 g of C.I. Pigment Blue 15:4 was added thereto and mixed. The resulting mixed solution was subjected to a dispersion treatment for 5 hours by using a disperser, Eiger Motor Mill Model M250 (trade name, manufactured by Eiger Japan Co., Ltd.), under the conditions of a bead loading of 70% and a rotation number of 5,000 rpm. After the dispersion treatment, the solution was ultrafiltered by a cross-flow process in an ultra-filtration apparatus until AQUALON KH-10/pigment became 25/100 (this value was determined from the solid content concentration and the pigment concentration), thereby adjusting the solid content concentration to 15 wt %.

Subsequently, 6.7 g of dimethylaminoethylmethacrylate methyl chloride salt as a cationic water-soluble monomer was added thereto and mixed, and an ultrasonic wave was irradiated for 30 minutes. To the resulting mixed solution, 12.0 g of styrene and 18.0 g of n-butyl methacrylate were added and mixed, and 10.0 g of dimethylaminoethylmethacrylate octyl chloride salt a cationic polymerizable surfactant was further added and mixed. Then, an ultrasonic wave was again irradiated for 30 minutes.

This mixed solution was charged into a reaction vessel equipped with a stirrer, a reflux condenser, a dropping funnel, a temperature regulator, a nitrogen inlet tube and an ultrasonic wave generator and after elevating the internal temperature of the reaction vessel to 80° C. under irradiation of an ultrasonic wave for 30 minutes, an aqueous solution prepared by dissolving 1.5 g of potassium persulfate as a polymerization initiator in 100 g of ion-exchanged water was added dropwise, and the polymerization reaction was performed at 80° C. for 6 hours while introducing nitrogen into the reaction vessel. After the completion of polymerization, the pH was adjusted to 8 with an aqueous 1 mol/liter potassium hydroxide solution, and coarse particles were then removed by filtration through a membrane filter having a pore size of 1 μm. The residue was ultrafiltered by a cross-flow process in an ultra-filtration apparatus and concentrated to have a solid content concentration of 15 wt %, thereby obtaining a liquid dispersion of the encapsulated pigment of the present invention. The volume average particle diameter of the encapsulated pigment in the liquid dispersion was measured by a laser Doppler system particle size distribution analyzer, Microtrac UPA150 (trade name), manufactured by Leads & Northlop Co. and found to be 180 nm. The resulting liquid dispersion was dried at room temperature to obtain a solid matter, and the glass transition temperature of the encapsulating polymer of the encapsulated pigment particle was determined by thermally analyzing the solid matter with use of a thermal scanning calorimeter (differential scanning calorimeter: DSC), DSC200 (trade name, manufactured by Seiko Instruments & Electronics Ltd.), and found to be 46° C.

[Production of Encapsulated Pigment "MCP4"]

First, 50 g of dimethylaminoethylmethacrylate octyl chloride salt as a cationic polymerizable surfactant was dissolved in 850 g of ion-exchanged water, and 100 g of C.I. Pigment Yellow 73 was added thereto and mixed. The resulting mixed solution was subjected to a dispersion treatment for 5 hours by using a disperser, Eiger Motor Mill Model M250 (trade name, manufactured by Eiger Japan Co., Ltd.), under the conditions of a bead loading of 70% and a rotation number of 5,000 rpm. After the dispersion treatment, the solution was ultrafiltered by a cross-flow process in an ultrafiltration apparatus until dimethylaminoethylmethacrylate octyl chloride salt/pigment became 25/100 (this value was determined from the solid content concentration and the pigment concentration), thereby adjusting the solid content concentration to 15 wt %.

Subsequently, 94.0 g of an anionic polymerizable surfactant, AQUALON KH-10 (produced by Dai-ichi Kogyo Seiyaku Co., Ltd.), was added thereto and mixed, and an ultrasonic wave was irradiated for 30 minutes. To the resulting mixed solution, 12.0 g of styrene and 18.0 g of n-butyl methacrylate were added and mixed, and 25.0 g of dimethylaminoethylmethacrylate octyl chloride salt as a cationic polymerizable surfactant was further added and mixed. Then, an ultrasonic wave was again irradiated for 30 minutes.

This mixed solution was charged into a reaction vessel equipped with a stirrer, a reflux condenser, a dropping funnel, a temperature regulator, a nitrogen inlet tube and an ultrasonic wave generator and after elevating the internal temperature of the reaction vessel to 80° C. under irradiation of an ultrasonic wave for 30 minutes, an aqueous solution prepared by dissolving 3.6 g of potassium persulfate as a polymerization initiator in 200 g of ion-exchanged water was added dropwise, and the polymerization reaction was performed at 80°

C. for 6 hours while introducing nitrogen into the reaction vessel. After the completion of polymerization, the pH was adjusted to 8 with an aqueous 1 mol/liter potassium hydroxide solution, and coarse particles were then removed by filtration through a membrane filter having a pore size of 1 μm. The residue was ultrafiltered by a cross-flow process in an ultra-filtration apparatus and concentrated to have a solid content concentration of 15 wt %, thereby obtaining a liquid dispersion of the encapsulated pigment of the present invention. The volume average particle diameter of the encapsulated pigment in the liquid dispersion was measured by a laser Doppler system particle size distribution analyzer, Microtrac UPA150 (trade name), manufactured by Leads & Northlop Co. and found to be 120 nm. The resulting liquid dispersion was dried at room temperature to obtain a solid matter, and the glass transition temperature of the encapsulating polymer of the encapsulated pigment particle was determined by thermally analyzing the solid matter with use of a thermal scanning calorimeter (differential scanning calorimeter: DSC), DSC200 (trade name, manufactured by Seiko Instruments & Electronics Ltd.), and found to be 46° C.

[Production of Encapsulated Pigment "MCP5"]

First, 50 g of an anionic polymerizable surfactant, AQUALON KH-10 (produced by Dai-ichi Kogyo Seiyaku Co., Ltd.), was dissolved in 850 g of ion-exchanged water, and 100 g of an isoindolinone pigment (C.I. Pigment Red 122) was added thereto and mixed. The resulting mixed solution was subjected to a dispersion treatment for 5 hours by using a disperser, Eiger Motor Mill Model M250 (trade name, manufactured by Eiger Japan Co., Ltd.), under the conditions of a bead loading of 70% and a rotation number of 5,000 rpm. After the dispersion treatment, the solution was ultrafiltered by a cross-flow process in an ultra-filtration apparatus until AQUALON KH-10/pigment became 25/100 (this value was determined from the solid content concentration and the pigment concentration), thereby adjusting the solid content concentration to 15 wt %.

Subsequently, 9.8 g of dimethylaminoethylmethacrylate octyl chloride salt as a cationic polymerizable surfactant was added thereto and mixed, and an ultrasonic wave was irradiated for 30 minutes. To the resulting mixed solution, 8.2 g of benzyl methacrylate, 3.2 g of isobornyl methacrylate and 3.2 g of lauryl methacrylate were added and mixed, and 25.0 g of an anionic polymerizable surfactant, AQUALON KH-10, dissolved in 100 g of ion-exchanged water was further added and mixed. Then, an ultrasonic wave was again irradiated for 30 minutes.

This mixed solution was charged into a reaction vessel equipped with a stirrer, a reflux condenser, a dropping funnel, a temperature regulator, a nitrogen inlet tube and an ultrasonic wave generator and after elevating the internal temperature of the reaction vessel to 80° C. under irradiation of an ultrasonic wave for 30 minutes, an aqueous solution prepared by dissolving 1.5 g of potassium persulfate as a polymerization initiator in 100 g of ion-exchanged water was added dropwise, and the polymerization reaction was performed at 80° C. for 6 hours while introducing nitrogen into the reaction vessel. After the completion of polymerization, the pH was adjusted to 8 with an aqueous 1 mol/liter potassium hydroxide solution, and coarse particles were then removed by filtration through a membrane filter having a pore size of 1 μm. The residue was ultrafiltered by a cross-flow process in an ultra-filtration apparatus and concentrated to have a solid content concentration of 15 wt %, thereby obtaining a liquid dispersion of the encapsulated pigment of the present invention. The volume average particle diameter of the encapsulated pigment in the liquid dispersion was measured by a laser Doppler system particle size distribution analyzer, Microtrac UPA150 (trade name), manufactured by Leads & Northlop Co. and found to be 120 nm. The resulting liquid dispersion was dried at room temperature to obtain a solid matter, and the glass transition temperature of the encapsulating polymer of the encapsulated pigment particle was determined by thermally analyzing the solid matter with use of a thermal scanning calorimeter (differential scanning calorimeter: DSC), DSC200 (trade name, manufactured by Seiko Instruments & Electronics Ltd.), and found to be 33° C.

[Production of Encapsulated Pigment "MCP6"]

First, 50 g of dimethylaminoethylmethacrylate dodecyl chloride salt as a cationic polymerizable surfactant was dissolved in 850 g of ion-exchanged water, and 100 g of C.I. Pigment Yellow 73 was added thereto and mixed. The resulting mixed solution was subjected to a dispersion treatment for 5 hours by using a disperser, Eiger Motor Mill Model M250 (trade name, manufactured by Eiger Japan Co., Ltd.), under the conditions of a bead loading of 70% and a rotation number of 5,000 rpm. After the dispersion treatment, the solution was ultrafiltered by a cross-flow process in an ultrafiltration apparatus until dimethylaminoethylmethacrylate dodecyl chloride salt/pigment became 25/100 (this value was determined from the solid content concentration and the pigment concentration), thereby adjusting the solid content concentration to 15 wt %.

Subsequently, 14.0 g of 2-acrylamide-2-methylpropanesulfonic acid as an anionic water-soluble monomer was added thereto and mixed, and an ultrasonic wave was irradiated for 30 minutes. To the resulting mixed solution, 12.0 g of styrene and 18.0 g of n-butyl methacrylate were added and mixed, and 30.0 g of the anionic polymerizable surfactant, AQUALON KH-10, dissolved in 100 g of ion-exchanged water was further added and mixed. Then, an ultrasonic wave was again irradiated for 30 minutes.

This mixed solution was charged into a reaction vessel equipped with a stirrer, a reflux condenser, a dropping funnel, a temperature regulator, a nitrogen inlet tube and an ultrasonic wave generator and after elevating the internal temperature of the reaction vessel to 80° C. under irradiation of an ultrasonic wave for 30 minutes, an aqueous solution prepared by dissolving 3.6 g of potassium persulfate as a polymerization initiator in 200 g of ion-exchanged water was added dropwise, and the polymerization reaction was performed at 80° C. for 6 hours while introducing nitrogen into the reaction vessel. After the completion of polymerization, the pH was adjusted to 8 with an aqueous 1 mol/liter potassium hydroxide solution, and coarse particles were then removed by filtration through a membrane filter having a pore size of 1 μm. The residue was ultrafiltered by a cross-flow process in an ultra-filtration apparatus and concentrated to have a solid content concentration of 15 wt %, thereby obtaining a liquid dispersion of the encapsulated pigment of the present invention. The volume average particle diameter of the encapsulated pigment in the liquid dispersion was measured by a laser Doppler system particle size distribution analyzer, Microtrac UPA150 (trade name), manufactured by Leads & Northlop Co. and found to be 120 nm. The resulting liquid dispersion was dried at room temperature to obtain a solid matter, and the glass transition temperature of the encapsulating polymer of the encapsulated pigment particle was determined by thermally analyzing the solid matter with use of a thermal scanning calorimeter (differential scanning calorimeter: DSC), DSC200 (trade name, manufactured by Seiko Instruments & Electronics Ltd.), and found to be 46° C.

[Production of Encapsulated Pigment "MCP7"]

First, 50 g of an anionic polymerizable surfactant, AQUALON KH-10 (produced by Dai-ichi Kogyo Seiyaku Co., Ltd.), was dissolved in 850 g of ion-exchanged water, and 100 g of an isoindolinone pigment (C.I. Pigment Red 122) was added thereto and mixed. The resulting mixed solution was subjected to a dispersion treatment for 5 hours by using a disperser, Eiger Motor Mill Model M250 (trade name, manufactured by Eiger Japan Co., Ltd.), under the conditions of a bead loading of 70% and a rotation number of 5,000 rpm. After the dispersion treatment, the solution was ultrafiltered by a cross-flow process in an ultra-filtration apparatus until AQUALON KH-10/pigment became 25/100 (this value was determined from the solid content concentration and the pigment concentration), thereby adjusting the solid content concentration to 15 wt %.

Subsequently, 6.7 g of dimethylaminoethylmethacrylate methyl chloride salt as a cationic water-soluble monomer was added thereto and mixed, and an ultrasonic wave was irradiated for 30 minutes. To the resulting mixed solution, 30 g of benzyl methacrylate, 10 g of isobornyl methacrylate and 10 g of lauryl methacrylate were added and mixed, and 25 g of the anionic polymerizable surfactant, AQUALON KH-10, dissolved in 100 g of ion-exchanged water was further added and mixed. Then, an ultrasonic wave was again irradiated for 30 minutes.

This mixed solution was charged into a reaction vessel equipped with a stirrer, a reflux condenser, a dropping funnel, a temperature regulator, a nitrogen inlet tube and an ultrasonic wave generator and after elevating the internal temperature of the reaction vessel to 80° C. under irradiation of an ultrasonic wave for 30 minutes, an aqueous solution prepared by dissolving 2 g of potassium persulfate as a polymerization initiator in 100 g of ion-exchanged water was added dropwise, and the polymerization reaction was performed at 80° C. for 6 hours while introducing nitrogen into the reaction vessel. After the completion of polymerization, the pH was adjusted to 8 with an aqueous 1 mol/liter potassium hydroxide solution, and coarse particles were then removed by filtration through a membrane filter having a pore size of 1 µm. The residue was ultrafiltered by a cross-flow process in an ultra-filtration apparatus and concentrated to have a solid content concentration of 15 wt %, thereby obtaining a liquid dispersion of the encapsulated pigment of the present invention. The volume average particle diameter of the encapsulated pigment in the liquid dispersion was measured by a laser Doppler system particle size distribution analyzer, Microtrac UPA150 (trade name), manufactured by Leads & Northlop Co. and found to be 200 nm. The resulting liquid dispersion was dried at room temperature to obtain a solid matter, and the glass transition temperature of the encapsulating polymer of the encapsulated pigment particle was determined by thermally analyzing the solid matter with use of a thermal scanning calorimeter (differential scanning calorimeter: DSC), DSC200 (trade name, manufactured by Seiko Instruments & Electronics Ltd.), and found to be 33° C.

[Production of Encapsulated Pigment "MCP8"]

First, 50 g of an anionic polymerizable surfactant, ADEKA REARSOPE SR-10 (produced by Asahi Denka Co., Ltd.), was dissolved in 850 g of ion-exchanged water, and 100 g of an isoindolinone pigment (C.I. Pigment Red 122) was added thereto and mixed. The resulting mixed solution was subjected to a dispersion treatment for 5 hours by using a disperser, Eiger Motor Mill Model M250 (trade name, manufactured by Eiger Japan Co., Ltd.), under the conditions of a bead loading of 70% and a rotation number of 5,000 rpm. After the dispersion treatment, the solution was ultrafiltered by a cross-flow process in an ultra-filtration apparatus until ADEKA REARSOPE SR-10/pigment became 25/100 (this value was determined from the solid content concentration and the pigment concentration), thereby adjusting the solid content concentration to 15 wt %.

Subsequently, 6.2 g of dimethylaminoethylmethacrylate methyl chloride salt as a cationic water-soluble monomer was added thereto and mixed, and an ultrasonic wave was irradiated for 30 minutes. To the resulting mixed solution, 19.2 g of benzyl methacrylate, 6.4 g of isobornyl methacrylate and 6.4 g of lauryl methacrylate were added and mixed, and 25.0 g of the anionic polymerizable surfactant, ADEKA REARSOPE SR-10, dissolved in 100 g of ion-exchanged water was further added and mixed. Then, an ultrasonic wave was again irradiated for 30 minutes.

This mixed solution was charged into a reaction vessel equipped with a stirrer, a reflux condenser, a dropping funnel, a temperature regulator, a nitrogen inlet tube and an ultrasonic wave generator and after elevating the internal temperature of the reaction vessel to 80° C. under irradiation of an ultrasonic wave for 30 minutes, an aqueous solution prepared by dissolving 1.5 g of potassium persulfate as a polymerization initiator in 100 g of ion-exchanged water was added dropwise, and the polymerization reaction was performed at 80° C. for 6 hours while introducing nitrogen into the reaction vessel. After the completion of polymerization, the pH was adjusted to 8 with an aqueous 1 mol/liter potassium hydroxide solution, and coarse particles were then removed by filtration through a membrane filter having a pore size of 1 µm. The residue was ultrafiltered by a cross-flow process in an ultra-filtration apparatus and concentrated to have a solid content concentration of 15 wt %, thereby obtaining a liquid dispersion of the encapsulated pigment of the present invention. The volume average particle diameter of the encapsulated pigment in the liquid dispersion was measured by a laser Doppler system particle size distribution analyzer, Microtrac UPA150 (trade name), manufactured by Leads & Northlop Co. and found to be 160 nm. The resulting liquid dispersion was dried at room temperature to obtain a solid matter, and the glass transition temperature of the encapsulating polymer of the encapsulated pigment particle was determined by thermally analyzing the solid matter with use of a thermal scanning calorimeter (differential scanning calorimeter: DSC), DSC200 (trade name, manufactured by Seiko Instruments & Electronics Ltd.), and found to be 33° C.

[Production of Encapsulated Pigment "MCP9"]

First, 50 g of an anionic polymerizable surfactant, ELEMINOL JS-2 (produced by Sanyo Chemical Industries, Ltd.), was dissolved in 850 g of ion-exchanged water, and 100 g of an isoindolinone pigment (C.I. Pigment Red 122) was added thereto and mixed. The resulting mixed solution was subjected to a dispersion treatment for 5 hours by using a disperser, Eiger Motor Mill Model M250 (trade name, manufactured by Eiger Japan Co., Ltd.), under the conditions of a bead loading of 70% and a rotation number of 5,000 rpm. After the dispersion treatment, the solution was ultrafiltered by a cross-flow process in an ultra-filtration apparatus until ELEMINOL JS-2/pigment became 25/100 (this value was determined from the solid content concentration and the pigment concentration), thereby adjusting the solid content concentration to 15 wt %.

Subsequently, 11.5 g of dimethylaminoethylmethacrylate methyl chloride salt as a cationic water-soluble monomer was added thereto and mixed, and an ultrasonic wave was irradiated for 30 minutes. To the resulting mixed solution, 19.2 g of benzyl methacrylate, 6.4 g of isobornyl methacrylate and 6.4 g of lauryl methacrylate were added and mixed, and 25.0 g of the anionic polymerizable surfactant, ELEMINOL JS-2, dissolved in 100 g of ion-exchanged water was further added and mixed. Then, an ultrasonic wave was again irradiated for 30 minutes.

This mixed solution was charged into a reaction vessel equipped with a stirrer, a reflux condenser, a dropping funnel, a temperature regulator, a nitrogen inlet tube and an ultrasonic wave generator and after elevating the internal temperature of the reaction vessel to 80° C. under irradiation of an ultrasonic wave for 30 minutes, an aqueous solution prepared by dissolving 1.8 g of potassium persulfate as a polymerization initiator in 100 g of ion-exchanged water was added dropwise, and the polymerization reaction was performed at 80° C. for 6 hours while introducing nitrogen into the reaction vessel. After the completion of polymerization, the pH was adjusted to 8 with an aqueous 1 mol/liter potassium hydroxide solution, and coarse particles were then removed by filtration through a membrane filter having a pore size of 1 μm. The residue was ultrafiltered by a cross-flow process in an ultra-filtration apparatus and concentrated to have a solid content concentration of 15 wt %, thereby obtaining a liquid dispersion of the encapsulated pigment of the present invention. The volume average particle diameter of the encapsulated pigment in the liquid dispersion was measured by a laser Doppler system particle size distribution analyzer, Microtrac UPA150 (trade name), manufactured by Leads & Northlop Co. and found to be 160 nm. The resulting liquid dispersion was dried at room temperature to obtain a solid matter, and the glass transition temperature of the encapsulating polymer of the encapsulated pigment particle was determined by thermally analyzing the solid matter with use of a thermal scanning calorimeter (differential scanning calorimeter: DSC), DSC200 (trade name, manufactured by Seiko Instruments & Electronics Ltd.), and found to be 33° C.

[Production of Encapsulated Pigment "MCP10"]

First, 50 g of an anionic polymerizable surfactant, ADEKA REARSOPE SE-10N (produced by Asahi Denka Co., Ltd.), was dissolved in 850 g of ion-exchanged water, and 100 g of an isoindolinone pigment (C.I. Pigment Red 122) was added thereto and mixed. The resulting mixed solution was subjected to a dispersion treatment for 5 hours by using a disperser, Eiger Motor Mill Model M250 (trade name, manufactured by Eiger Japan Co., Ltd.), under the conditions of a bead loading of 70% and a rotation number of 5,000 rpm. Thereafter, the solution was ultrafiltered by a cross-flow process in an ultrafiltration apparatus until ADEKA REARSOPE SE-10N/pigment became 25/100 (this value was determined from the solid content concentration and the pigment concentration), thereby adjusting the solid content concentration to 15 wt %.

Subsequently, 6.0 g of dimethylaminoethylmethacrylate methyl chloride salt as a cationic water-soluble monomer was added thereto and mixed, and an ultrasonic wave was irradiated for 30 minutes. To the resulting mixed solution, 19.2 g of benzyl methacrylate, 6.4 g of isobornyl methacrylate and 6.4 g of lauryl methacrylate were added and mixed, and 25.0 g of the anionic polymerizable surfactant, ADEKA REARSOPE SE-10N, dissolved in 100 g of ion-exchanged water was further added and mixed. Then, an ultrasonic wave was again irradiated for 30 minutes.

This mixed solution was charged into a reaction vessel equipped with a stirrer, a reflux condenser, a dropping funnel, a temperature regulator, a nitrogen inlet tube and an ultrasonic wave generator and after elevating the internal temperature of the reaction vessel to 80° C. under irradiation of an ultrasonic wave for 30 minutes, an aqueous solution prepared by dissolving 1.0 g of potassium persulfate as a polymerization initiator in 100 g of ion-exchanged water was added dropwise, and the polymerization reaction was performed at 80° C. for 6 hours while introducing nitrogen into the reaction vessel. After the completion of polymerization, the pH was adjusted to 8 with an aqueous 1 mol/liter potassium hydroxide solution, and coarse particles were then removed by filtration through a membrane filter having a pore size of 1 μm. The residue was ultrafiltered by a cross-flow process in an ultra-filtration apparatus and concentrated to have a solid content concentration of 15 wt %, thereby obtaining a liquid dispersion of the encapsulated pigment of the present invention. The volume average particle diameter of the encapsulated pigment in the liquid dispersion was measured by a laser Doppler system particle size distribution analyzer, Microtrac UPA150 (trade name), manufactured by Leads & Northlop Co. and found to be 160 nm. The resulting liquid dispersion was dried at room temperature to obtain a solid matter, and the glass transition temperature of the encapsulating polymer of the encapsulated pigment particle was determined by thermally analyzing the solid matter with use of a thermal scanning calorimeter (differential scanning calorimeter: DSC), DSC200 (trade name, manufactured by Seiko Instruments & Electronics Ltd.), and found to be 33° C.

[Production of Encapsulated Pigment "MCP11"]

First, 50 g of an anionic polymerizable surfactant, ELEMINOL RS-30 (produced by Sanyo Chemical Industries, Ltd.), was dissolved in 850 g of ion-exchanged water, and 100 g of an isoindolinone pigment (C.I. Pigment Red 122) was added thereto and mixed. The resulting mixed solution was subjected to a dispersion treatment for 5 hours by using a disperser, Eiger Motor Mill Model M250 (trade name, manufactured by Eiger Japan Co., Ltd.), under the conditions of a bead loading of 70% and a rotation number of 5,000 rpm. After the dispersion treatment, the solution was ultrafiltered by a cross-flow process in an ultra-filtration apparatus until ELEMINOL RS-30/pigment became 25/100 (this value was determined from the solid content concentration and the pigment concentration), thereby adjusting the solid content concentration to 15 wt %.

Subsequently, 7.5 g of dimethylaminoethylmethacrylate methyl chloride salt as a cationic water-soluble monomer was added thereto and mixed, and an ultrasonic wave was irradiated for 30 minutes. To the resulting mixed solution, 19.2 g of benzyl methacrylate, 6.4 g of isobornyl methacrylate and 6.4 g of lauryl methacrylate were added and mixed, and 25.0 g of the anionic polymerizable surfactant, ELEMINOL RS-30, dissolved in 100 g of ion-exchanged water was further added and mixed. Then, an ultrasonic wave was again irradiated for 30 minutes.

This mixed solution was charged into a reaction vessel equipped with a stirrer, a reflux condenser, a dropping funnel, a temperature regulator, a nitrogen inlet tube and an ultrasonic wave generator and after elevating the internal temperature of the reaction vessel to 80° C. under irradiation of an ultrasonic wave for 30 minutes, an aqueous solution prepared by dissolving 1.5 g of potassium persulfate as a polymerization initiator in 100 g of ion-exchanged water was added dropwise, and the polymerization reaction was performed at 80° C. for 6 hours while introducing nitrogen into the reaction vessel. After the completion of polymerization, the pH was adjusted to 8 with an aqueous 1 mol/liter potassium hydroxide solution, and coarse particles were then removed by filtration through a membrane filter having a pore size of 1 μm. The residue was ultrafiltered by a cross-flow process in an ultra-filtration apparatus and concentrated to have a solid content concentration of 15 wt %, thereby obtaining a liquid dispersion of the encapsulated pigment of the present invention. The volume average particle diameter of the encapsulated pigment in the liquid dispersion was measured by a laser Doppler system particle size distribution analyzer, Microtrac UPA150 (trade name), manufactured by Leads & Northlop Co. and found to be 160 nm. The resulting liquid dispersion was dried at room temperature to obtain a solid matter, and the glass transition temperature of the encapsulating polymer of the encapsulated pigment particle was determined by thermally analyzing the solid matter with use of a thermal scanning calorimeter (differential scanning calorimeter: DSC), DSC200 (trade name, manufactured by Seiko Instruments & Electronics Ltd.), and found to be 33° C.

[Production of Encapsulated Pigment "MCP12"]

First, 50 g of an anionic polymerizable surfactant, Antox MS-60 (produced by produced by Nippon Nyukazai Co., Ltd.), was dissolved in 850 g of ion-exchanged water, and 100 g of C.I. Pigment Blue 15:4 was added thereto and mixed. The resulting mixed solution was subjected to a dispersion treatment for 5 hours by using a disperser, Eiger Motor Mill Model M250 (trade name, manufactured by Eiger Japan Co., Ltd.), under the conditions of a bead loading of 70% and a rotation number of 5,000 rpm. After the dispersion treatment, the solution was ultrafiltered by a cross-flow process in an ultra-filtration apparatus until Antox MS-60/pigment became 25/100 (this value was determined from the solid content concentration and the pigment concentration), thereby adjusting the solid content concentration to 15 wt %.

Subsequently, 4.0 g of dimethylaminoethylmethacrylate methyl chloride salt as a cationic water-soluble monomer was added thereto and mixed, and an ultrasonic wave was irradiated for 30 minutes. To the resulting mixed solution, 12.0 g of styrene and 18.0 g of n-butyl methacrylate were added and mixed, and 25.0 g of the anionic polymerizable surfactant, Antox MS-60, dissolved in 100 g of ion-exchanged water was further added and mixed. Then, an ultrasonic wave was again irradiated for 30 minutes.

This mixed solution was charged into a reaction vessel equipped with a stirrer, a reflux condenser, a dropping funnel, a temperature regulator, a nitrogen inlet tube and an ultrasonic wave generator and after elevating the internal temperature of the reaction vessel to 80° C. under irradiation of an ultrasonic wave for 30 minutes, an aqueous solution prepared by dissolving 1.5 g of potassium persulfate as a polymerization initiator in 100 g of ion-exchanged water was added dropwise, and the polymerization reaction was performed at 80° C. for 6 hours while introducing nitrogen into the reaction vessel. After the completion of polymerization, the pH was adjusted to 8 with an aqueous 1 mol/liter potassium hydroxide solution, and coarse particles were then removed by filtration through a membrane filter having a pore size of 1 µm. The residue was ultrafiltered by a cross-flow process in an ultra-filtration apparatus and concentrated to have a solid content concentration of 15 wt %, thereby obtaining a liquid dispersion of the encapsulated pigment of the present invention. The volume average particle diameter of the encapsulated pigment in the liquid dispersion was measured by a laser Doppler system particle size distribution analyzer, Microtrac UPA150 (trade name), manufactured by Leads & Northlop Co. and found to be 180 nm. The resulting liquid dispersion was dried at room temperature to obtain a solid matter, and the glass transition temperature of the encapsulating polymer of the encapsulated pigment particle was determined by thermally analyzing the solid matter with use of a thermal scanning calorimeter (differential scanning calorimeter: DSC), DSC200 (trade name, manufactured by Seiko Instruments & Electronics Ltd.), and found to be 46° C.

[Production of Encapsulated Pigment "MCP17"]

First, 50 g of an anionic polymerizable surfactant, AQUALON KH-10 (produced by Dai-ichi Kogyo Seiyaku Co., Ltd.), was dissolved in 850 g of ion-exchanged water, and 100 g of C.I. Pigment Blue 15:4 having a volume average particle diameter of 60 nm was added thereto and mixed. The resulting mixed solution was subjected to a dispersion treatment for 5 hours by using a disperser, Eiger Motor Mill Model M250 (manufactured by Eiger Japan Co., Ltd.), under the conditions of a bead loading of 70% and a rotation number of 5,000 rpm. After the dispersion treatment, the solution was ultrafiltered by a cross-flow process in an ultrafiltration apparatus to such an extent of causing no bubbling in the permeated liquid, thereby adjusting the solid content concentration to 10 wt %. The obtained pigment liquid dispersion was subjected to thermogravimetric measurement, and the adsorbed amount of the anionic polymerization surfactant, AQUALON KH-10, was determined from the weight loss value, as a result, KH-10/pigment was 25.6/100.

Subsequently, 0.3 g of dimethylaminoethylmethacrylate methyl chloride salt as a cationic water-soluble monomer was added to 50 g of the obtained pigment liquid dispersion and mixed, and an ultrasonic wave was irradiated for 30 minutes. To the resulting mixed solution, 18.0 g of benzyl methacrylate, 7.2 g of isobornyl methacrylate and 10.8 g of lauryl methacrylate were added and mixed, and 0.75 g of an anionic polymerizable surfactant, ADEKA REARSOPE SR-10, dissolved in 50 ml of ion-exchanged water was further added. Furthermore, 380 ml of ion-exchanged water was added and after mixing, the mixed solution was adjusted to a pH of 9.0 with an aqueous 1 mol/liter potassium hydroxide solution.

This mixed solution was charged into a reaction vessel equipped with a stirrer, a reflux condenser, a dropping funnel, a temperature regulator and a nitrogen inlet tube and after elevating the internal temperature of the reaction vessel to 80° C., an aqueous solution prepared by dissolving 0.75 g of potassium persulfate as a polymerization initiator in 100 g of ion-exchanged water was added dropwise, and the polymerization reaction was performed at 80° C. for 5 hours while introducing nitrogen into the reaction vessel. After the completion of polymerization, the pH was adjusted to 8 with an aqueous 1 mol/liter potassium hydroxide solution, and coarse particles were then removed by filtration through a membrane filter having a pore size of 1 µm. The residue was ultrafiltered by a cross-flow process in an ultra-filtration apparatus and concentrated to have a solid content concentration of 15 wt %, thereby obtaining a liquid dispersion of the encapsulated pigment "MCP17" of the present invention. The volume average particle diameter of the obtained liquid dispersion was measured by a laser Doppler system particle size distribution analyzer, Microtrac UPA150 (trade name), manufactured by Leads & Northlop Co. and found to be 145 nm. Also, the glass transition temperature of the encapsulating polymer of the encapsulated pigment particle was determined according to the Fox formula from the kinds and ratio of the monomer components constituting the polymer and found to be 18° C.

[Production of Encapsulated Pigment "MCP18"]

First, 50 g of an anionic polymerizable surfactant, AQUALON KH-10 (produced by Dai-ichi Kogyo Seiyaku Co., Ltd.), was dissolved in 850 g of ion-exchanged water, and g of C.I. Pigment Blue 15:4 having a volume average particle diameter of 60 nm was added thereto and mixed. The resulting mixed solution was subjected to a dispersion treatment for 5 hours by using a disperser, Eiger Motor Mill Model M250 (manufactured by Eiger Japan Co., Ltd.), under the conditions of a bead loading of 70% and a rotation number of 5,000 rpm. After the dispersion treatment, the solution was ultrafiltered by a cross-flow process in an ultrafiltration apparatus to such an extent of causing no bubbling in the permeated liquid, thereby adjusting the solid content concentration to 10 wt %. The obtained pigment liquid dispersion was subjected to thermogravimetric measurement, and the adsorbed amount of the anionic polymerization surfactant, AQUALON KH-10, was determined from the weight loss value, as a result, KH-10/pigment was 25.6/100.

Subsequently, 0.3 g of dimethylaminoethylmethacrylate methyl chloride salt as a cationic water-soluble monomer was added to 50 g of the obtained pigment liquid dispersion and mixed, and an ultrasonic wave was irradiated for 30 minutes. To the resulting mixed solution, 4.9 g of benzyl methacrylate, 2.0 g of isobornyl methacrylate and 2.9 g of lauryl methacrylate were added and mixed, and 0.75 g of an anionic polymerizable surfactant, ADEKA REARSOPE SR-10, dissolved in 50 ml of ion-exchanged water was further added. Furthermore, 350 ml of ion-exchanged water was added and after mixing, the mixed solution was adjusted to a pH of 9.0 with an aqueous 1 mol/liter potassium hydroxide solution.

This mixed solution was charged into a reaction vessel equipped with a stirrer, a reflux condenser, a dropping funnel, a temperature regulator and a nitrogen inlet tube and after elevating the internal temperature of the reaction vessel to 80° C., an aqueous solution prepared by dissolving 0.23 g of potassium persulfate as a polymerization initiator in 100 g of ion-exchanged water was added dropwise, and the polymerization reaction was performed at 80° C. for 5 hours while introducing nitrogen into the reaction vessel. After the completion of polymerization, the pH was adjusted to 8 with an aqueous 1 mol/liter potassium hydroxide solution, and coarse particles were then removed by filtration through a membrane filter having a pore size of 1 μm. The residue was ultrafiltered by a cross-flow process in an ultra-filtration apparatus and concentrated to have a solid content concentration of 15 wt %, thereby obtaining a liquid dispersion of the encapsulated pigment "MCP18" of the present invention. The volume average particle diameter of the obtained liquid dispersion was measured by a laser Doppler system particle size distribution analyzer, Microtrac UPA150 (trade name), manufactured by Leads & Northlop Co. and found to be 110 nm. Also, the glass transition temperature of the encapsulating polymer of the encapsulated pigment particle was determined according to the Fox formula from the kinds and ratio of the monomer components constituting the polymer and found to be 18° C.

[Production of Encapsulated Pigment "MCP19"]

First, 50 g of an anionic polymerizable surfactant, AQUALON KH-10 (produced by Dai-ichi Kogyo Seiyaku Co., Ltd.), was dissolved in 850 g of ion-exchanged water, and 100 g of C.I. Pigment Blue 15:4 having a volume average particle diameter of 60 nm was added thereto and mixed. The resulting mixed solution was subjected to a dispersion treatment for 5 hours by using a disperser, Eiger Motor Mill Model M250 (manufactured by Eiger Japan Co., Ltd.), under the conditions of a bead loading of 70% and a rotation number of 5,000 rpm. After the dispersion treatment, the solution was ultrafiltered by a cross-flow process in an ultrafiltration apparatus to such an extent of causing no bubbling in the permeated liquid, thereby adjusting the solid content concentration to 10 wt %. The obtained pigment liquid dispersion was subjected to thermogravimetric measurement, and the adsorbed amount of the anionic polymerization surfactant, AQUALON KH-10, was determined from the weight loss value, as a result, KH-10/pigment was 25.6/100.

Subsequently, 0.3 g of dimethylaminoethylmethacrylate methyl chloride salt as a cationic water-soluble monomer was added to 50 g of the obtained pigment liquid dispersion and mixed, and an ultrasonic wave was irradiated for 30 minutes. To the resulting mixed solution, 4.9 g of benzyl methacrylate, 2.0 g of isobornyl methacrylate and 2.9 g of lauryl methacrylate were added and mixed, and 0.45 g of an anionic polymerizable surfactant, ADEKA REARSOPE SR-10, and 0.71 g of a nonionic polymerizable surfactant ADEKA REARSOPE ER-10, dissolved in 50 ml of ion-exchanged water were further added. Furthermore, 350 ml of ion-exchanged water was added and after mixing, the mixed solution was adjusted to a pH of 9.0 with an aqueous 1 mol/liter potassium hydroxide solution.

This mixed solution was charged into a reaction vessel equipped with a stirrer, a reflux condenser, a dropping funnel, a temperature regulator and a nitrogen inlet tube and after elevating the internal temperature of the reaction vessel to 80° C., an aqueous solution prepared by dissolving 0.23 g of potassium persulfate as a polymerization initiator in 100 g of ion-exchanged water was added dropwise, and the polymerization reaction was performed at 80° C. for 5 hours while introducing nitrogen into the reaction vessel. After the completion of polymerization, the pH was adjusted to 8 with an aqueous 1 mol/liter potassium hydroxide solution, and coarse particles were then removed by filtration through a membrane filter having a pore size of 1 μm. The residue was ultrafiltered by a cross-flow process in an ultra-filtration apparatus and concentrated to have a solid content concentration of 15 wt %, thereby obtaining a liquid dispersion of the encapsulated pigment "MCP19" of the present invention. The volume average particle diameter of the obtained liquid dispersion was measured by a laser Doppler system particle size distribution analyzer, Microtrac UPA150 (trade name), manufactured by Leads & Northlop Co. and found to be 110 nm. Also, the glass transition temperature of the encapsulating polymer of the encapsulated pigment particle was determined according to the Fox formula from the kinds and ratio of the monomer components constituting the polymer and found to be 18° C.

[Production of Encapsulated Pigment "MCP20"]

First, 50 g of sodium dodecylbenzenesulfonate as an anionic surfactant was dissolved in 850 g of ion-exchanged water, and 100 g of C.I. Pigment Blue 15:4 having a volume average particle diameter of 60 nm was added thereto and mixed. The resulting mixed solution was subjected to a dispersion treatment for 5 hours by using a disperser, Eiger Motor Mill Model M250 (manufactured by Eiger Japan Co., Ltd.), under the conditions of a bead loading of 70% and a rotation number of 5,000 rpm. After the dispersion treatment, the solution was ultrafiltered by a cross-flow process in an ultrafiltration apparatus to such an extent of causing no bubbling in the permeated liquid, thereby adjusting the solid content concentration to 10 wt %. The obtained pigment liquid dispersion was subjected to thermogravimetric measurement, and the adsorbed amount of sodium dodecylbenzenesulfonate as an anionic surfactant was determined from the weight loss value, as a result, sodium dodecylbenzenesulfonate/pigment was 25/100.

Subsequently, 0.6 g of dimethylaminoethylmethacrylate methyl chloride salt as a cationic water-soluble monomer was added to 50 g of the obtained pigment liquid dispersion and mixed, and an ultrasonic wave was irradiated for 30 minutes. To the resulting mixed solution, 4.9 g of benzyl methacrylate, 2.0 g of isobornyl methacrylate and 2.9 g of lauryl methacrylate were added and mixed, and 0.75 g of sodium dodecylbenzenesulfonate dissolved in 50 ml of ion-exchanged water was further added. Furthermore, 350 ml of ion-exchanged water was added and after mixing, the mixed solution was adjusted to a pH of 9.0 with an aqueous 1 mol/liter potassium hydroxide solution.

This mixed solution was charged into a reaction vessel equipped with a stirrer, a reflux condenser, a dropping funnel, a temperature regulator and a nitrogen inlet tube and after elevating the internal temperature of the reaction vessel to 80° C., an aqueous solution prepared by dissolving 0.23 g of potassium persulfate as a polymerization initiator in 100 g of ion-exchanged water was added dropwise, and the polymerization reaction was performed at 80° C. for 5 hours while introducing nitrogen into the reaction vessel. After the completion of polymerization, the pH was adjusted to 8 with an aqueous 1 mol/liter potassium hydroxide solution, and coarse particles were then removed by filtration through a membrane filter having a pore size of 1 μm. The residue was ultrafiltered by a cross-flow process in an ultra-filtration apparatus and concentrated to have a solid content concentration of 15 wt %, thereby obtaining a liquid dispersion of the encapsulated pigment "MCP20" of the present invention. The volume average particle diameter of the obtained liquid dispersion was measured by a laser Doppler system particle size distribution analyzer, Microtrac UPA150 (trade name), manufactured by Leads & Northlop Co. and found to be 80 nm. Also, the glass transition temperature of the encapsulating polymer of the encapsulated pigment particle was determined according to the Fox formula from the kinds and ratio of the monomer components constituting the polymer and found to be 18° C.

[Production of Encapsulated Pigment "MCP21"]

First, 25 g of sodium dodecylbenzenesulfonate as an anionic surfactant and 25 g of SOLSPERSE 27000 (produced by I.C.I. Japan) as a nonionic surfactant were dissolved in 850 g of ion-exchanged water, and 100 g of C.I. Pigment Blue 15:4 having a volume average particle diameter of 60 nm was added thereto and mixed. The resulting mixed solution was subjected to a dispersion treatment for 5 hours by using a disperser, Eiger Motor Mill Model M250 (manufactured by Eiger Japan Co., Ltd.), under the conditions of a bead loading of 70% and a rotation number of 5,000 rpm. After the dispersion treatment, the solution was ultrafiltered by a cross-flow process in an ultra-filtration apparatus to such an extent of causing no bubbling in the permeated liquid, thereby adjusting the solid content concentration to 10 wt %. The sulfur content in the obtained pigment liquid dispersion was determined by a flask combustion method and from the value obtained, the adsorbed amount of sodium dodecylbenzenesulfonate as an anionic surfactant was determined, as a result, sodium dodecylbenzenesulfonate/pigment was 13/100.

Subsequently, 0.3 g of dimethylaminoethylmethacrylate methyl chloride salt as a cationic water-soluble monomer was added to 50 g of the obtained pigment liquid dispersion and mixed, and an ultrasonic wave was irradiated for 30 minutes. To the resulting mixed solution, 4.9 g of benzyl methacrylate, 2.0 g of isobornyl methacrylate and 2.9 g of lauryl methacrylate were added and mixed, and 0.4 g of sodium dodecylbenzenesulfonate dissolved in 50 ml of ion-exchanged water was further added. Furthermore, 350 ml of ion-exchanged water was added and after mixing, the mixed solution was adjusted to a pH of 9.0 with an aqueous 1 mol/liter potassium hydroxide solution.

This mixed solution was charged into a reaction vessel equipped with a stirrer, a reflux condenser, a dropping funnel, a temperature regulator and a nitrogen inlet tube and after elevating the internal temperature of the reaction vessel to 80° C., an aqueous solution prepared by dissolving 0.23 g of potassium persulfate as a polymerization initiator in 100 g of ion-exchanged water was added dropwise, and the polymerization reaction was performed at 80° C. for 5 hours while introducing nitrogen into the reaction vessel. After the completion of polymerization, the pH was adjusted to 8 with an aqueous 1 mol/liter potassium hydroxide solution, and coarse particles were then removed by filtration through a membrane filter having a pore size of 1 μm. The residue was ultrafiltered by a cross-flow process in an ultra-filtration apparatus and concentrated to have a solid content concentration of 15 wt %, thereby obtaining a liquid dispersion of the encapsulated pigment "MCP21" of the present invention. The volume average particle diameter of the obtained liquid dispersion was measured by a laser Doppler system particle size distribution analyzer, Microtrac UPA150 (trade name), manufactured by Leads & Northlop Co. and found to be 80 nm. Also, the glass transition temperature of the encapsulating polymer of the encapsulated pigment particle was determined according to the Fox formula from the kinds and ratio of the monomer components constituting the polymer and found to be 18° C.

[Production of Encapsulated Pigment "MCP22"]

First, 25 g of an anionic polymerizable surfactant, AQUALON KH-10 (produced by Dai-ichi Kogyo Seiyaku Co., Ltd.), and 25 g of a nonionic polymerizable surfactant, ADEKA REARSOPE ER-10 (produced by Asahi Denka Co., Ltd.), were dissolved in 850 g of ion-exchanged water, and 100 g of C.I. Pigment Blue 15:4 having a volume average particle diameter of 60 nm was added thereto and mixed. The resulting mixed solution was subjected to a dispersion treatment for 5 hours by using a disperser, Eiger Motor Mill Model M250 (manufactured by Eiger Japan Co., Ltd.), under the conditions of a bead loading of 70% and a rotation number of 5,000 rpm. After the dispersion treatment, the solution was ultrafiltered by a cross-flow process in an ultrafiltration apparatus to such an extent of causing no bubbling in the permeated liquid, thereby adjusting the solid content concentration to 10 wt %. The sulfur content in the obtained pigment liquid dispersion was determined by a flask combustion method and from the value obtained, the adsorbed amount of the anionic polymerizable surfactant, AQUALON KH-10, was determined, as a result, KH-10/pigment was 13/100.

Subsequently, 0.15 g of dimethylaminoethylmethacrylate methyl chloride salt as a cationic water-soluble monomer was added to 50 g of the obtained pigment liquid dispersion and mixed, and an ultrasonic wave was irradiated for 30 minutes. To the resulting mixed solution, 4.9 g of benzyl methacrylate, 2.0 g of isobornyl methacrylate and 2.9 g of lauryl methacrylate were added and mixed, and 0.45 g of an anionic polymerizable surfactant, ADEKA REARSOPE SR-10, and 0.2 g of a nonionic polymerizable surfactant, ADEKA REARSOPE ER-10, dissolved in 50 ml of ion-exchanged water were further added. Furthermore, 350 ml of ion-exchanged water was added and after mixing, the mixed solution was adjusted to a pH of 9.0 with an aqueous 1 mol/liter potassium hydroxide solution.

This mixed solution was charged into a reaction vessel equipped with a stirrer, a reflux condenser, a dropping funnel, a temperature regulator and a nitrogen inlet tube and after elevating the internal temperature of the reaction vessel to 80° C., an aqueous solution prepared by dissolving 0.23 g of potassium persulfate as a polymerization initiator in 100 g of ion-exchanged water was added dropwise, and the polymerization reaction was performed at 80° C. for 5 hours while introducing nitrogen into the reaction vessel. After the completion of polymerization, the pH was adjusted to 8 with an aqueous 1 mol/liter potassium hydroxide solution, and coarse particles were then removed by filtration through a membrane filter having a pore size of 1 μm. The residue was ultrafiltered by a cross-flow process in an ultra-filtration apparatus and concentrated to have a solid content concentration of 15 wt %, thereby obtaining a liquid dispersion of the encapsulated pigment "MCP22" of the present invention. The volume average particle diameter of the obtained liquid dispersion was measured by a laser Doppler system particle size distribution analyzer, Microtrac UPA150 (trade name), manufactured by Leads & Northlop Co. and found to be 100 nm. Also, the glass transition temperature of the encapsulating polymer of the encapsulated pigment particle was determined according to the Fox formula from the kinds and ratio of the monomer components constituting the polymer and found to be 18° C.

[Production of Encapsulated Pigment "MCP13" by Phase Inversion Emulsification Method] (Comparative Example)

First, 250 g of methyl ethyl ketone was charged into a flask and after elevating the temperature to 75° C. with stirring under nitrogen sealing, a mixed solution containing 170 g of n-butyl methacrylate, 58 g of n-butyl acrylate, 35 g of 2-hydroxyethyl methacrylate, 35 g of acrylic acid and 20 g of a polymerization initiator, Perbutyl O, was added dropwise over 2 hours. Then, the reaction was further allowed to proceed for 15 hours to obtain a vinyl-based polymer solution.

Subsequently, 15 g of the obtained polymer solution was charged into a stainless steel-made beaker together with 0.8 g of dimethylethanolamine and 15 g of a magenta pigment (C.I. Pigment Red 122), and ion-exchanged water was added to make a total amount to 75 g. Furthermore, 250 g of zirconia beads having an average particle diameter of 0.5 nm were added thereto, and kneading was performed by using a sand mill for 4 hours. After the completion of kneading, the zirconia beads were removed by filtration to obtain a product in which a dispersion comprising a polymer having a carboxyl group neutralized with a base and a pigment was dispersed in water. While stirring this product at ordinary temperature, a 1 N hydrochloric acid was added until the resin was insolubilized and fixed to the pigment. At this time, the pH was from 3 to 5. The aqueous medium containing the pigment having fixed thereto the polymer was filtered by suction and washed with water to obtain a wet cake. While stirring the wet cake with a disperser, an aqueous 10% NaOH solution was added until the pH of the dispersion became from 8.5 to 9.5. After continuing the stirring for 1 hour, ion-exchanged water was added to adjust the solid content concentration to 20%, thereby obtaining the encapsulated pigment "MCP13" of C.I. Pigment Red 122.

[Production of Encapsulated Pigment "MCP14"] (Comparative Example)

First, 50 g of an anionic polymerizable surfactant, AQUALON KH-10 (produced by Dai-ichi Kogyo Seiyaku Co., Ltd.), was dissolved in 850 g of ion-exchanged water, and 100 g of an isoindolinone pigment (C.I. Pigment Red 122) was added thereto and mixed. The resulting mixed solution was subjected to a dispersion treatment for 5 hours by using Eiger Motor Mill Model M250 (trade name, manufactured by Eiger Japan Co., Ltd.) under the conditions of a bead loading of 70% and a rotation number of 5,000 rpm. After the dispersion treatment, the unadsorbed AQUALON KH-10 was treated by ultrafiltration according to a cross-flow process until AQUALON KH-10/pigment became 25/100 (this value was determined from the solid content concentration and the pigment concentration), thereby adjusting the solid content concentration to 15 wt %.

Subsequently, 8.2 g of benzyl methacrylate, 3.2 g of isobornyl methacrylate and 3.2 g of lauryl methacrylate were added thereto and mixed. The resulting mixed solution was charged into a reaction vessel equipped with a stirrer, a reflux condenser, a dropping funnel, a temperature regulator and a nitrogen inlet tube and after elevating the internal temperature of the reaction vessel to 80° C., an aqueous solution prepared by dissolving 1.5 g of potassium persulfate as a polymerization initiator in 100 g of ion-exchanged water was added dropwise, and the polymerization reaction was performed at 80° C. for 6 hours while introducing nitrogen into the reaction vessel. After the reaction, a monomer odor was smelled and a monomer oil droplet was floating on the water surface, failing in encapsulation.

[Production of Encapsulated Pigment "MCP15"] (Comparative Example)

First, 50 g of an anionic polymerizable surfactant, AQUALON KH-10 (produced by Dai-ichi Kogyo Seiyaku Co., Ltd.), was dissolved in 850 g of ion-exchanged water, and 100 g of an isoindolinone pigment (C.I. Pigment Red 122) was added thereto and mixed. The resulting mixed solution was subjected to a dispersion treatment for 5 hours by using Eiger Motor Mill Model M250 (trade name, manufactured by Eiger Japan Co., Ltd.) under the conditions of a bead loading of 70% and a rotation number of 5,000 rpm. After the dispersion treatment, the unadsorbed AQUALON KH-10 was treated by ultrafiltration according to a cross-flow process until AQUALON KH-10/pigment became 25/100 (this value was determined from the solid content concentration and the pigment concentration), thereby adjusting the solid content concentration to 15 wt %.

Subsequently, 8.2 g of benzyl methacrylate, 3.2 g of isobornyl methacrylate and 3.2 g of lauryl methacrylate were added thereto and mixed. Furthermore, 25.0 g of the anionic polymerizable surfactant AQUALON KH-10, dissolved in 100 g of ion-exchanged water was added and mixed.

The resulting mixed solution was charged into a reaction vessel equipped with a stirrer, a reflux condenser, a dropping funnel, a temperature regulator and a nitrogen inlet tube and after elevating the internal temperature of the reaction vessel to 80° C. under irradiation of an ultrasonic wave for 30 minutes, an aqueous solution prepared by dissolving 1.5 g of potassium persulfate as a polymerization initiator in 100 g of ion-exchanged water was added dropwise, and the polymerization reaction was performed at 80° C. for 6 hours while introducing nitrogen into the reaction vessel. After the completion of reaction, the pH of the reaction mixture was adjusted to 8 with an aqueous 2 mol/liter potassium hydroxide solution, and the particle size distribution was measured by a laser Doppler system particle size distribution analyzer, Microtrac UPA150 (trade name), manufactured by Leads & Northlop Co., as a result, change in the particle diameter was not observed.

[Production of Encapsulated Pigment "MCP16"] (Comparative Example)

First, 200 g of methyl ethyl ketone was charged into a reaction vessel and after elevating the temperature to 70° C. with stirring under nitrogen sealing, a mixed solution containing 170 g of styrene, 5 g of α-methylstyrene, 65 g of butyl methacrylate, 10 g of lauryl methacrylate, 17 g of acrylic acid and 20 g of a polymerization initiator, Perbutyl O, was added dropwise over 2 hours. Then, the reaction was allowed to proceed for 10 hours, 1 g of tert-dodecylmercaptan dissolved in 20 g of methyl ethyl ketone was added, and the reaction was further allowed to proceed for 5 hours to obtain a vinyl-based polymer solution.

Subsequently, 10 g of the obtained polymer solution and 40 g of a magenta pigment (C.I. Pigment Red 122) were charged into a stainless steel-made beaker and mixed with stirring, and the resulting mixed solution was subjected to a dispersion treatment by a nanomizer (manufactured by Yoshida Kikai Kogyo). The dispersion product was again transferred to the stainless steel-made beaker, 300 g of ion-exchanged water was added thereto with stirring at ordinary temperature, and an aqueous 10% NaOH solution was further added until the pH became from 8.5 to 9.5, followed by stirring by a homogenizer. Then, the methyl ethyl ketone was removed by distillation in a rotary evaporator, and an aqueous 10% NaOH solution was added until the pH became 8.5 to 9.5, followed by stirring for 1 hour. Furthermore, ion-exchanged water was added to adjust the solid content concentration to 20%, thereby obtaining Encapsulated Pigment MCP16 of C.I. Pigment Red.

[Production of Pigment Liquid Dispersion A] (Comparative Example)

First, 50 g of SOLSPERSE 27000 (produced by Clariant) was dissolved in 850 g of ion-exchanged water, and an isoindolinone pigment (C.I. Pigment Red 122) was added thereto and mixed. The resulting mixed solution was subjected to a dispersion treatment for 5 hours by using Eiger Motor Mill Model M250 (trade name, manufactured by Eiger Japan Co., Ltd.) under the conditions of a bead loading of 70% and a rotation number of 5,000 rpm. The solid content concentration was adjusted to 15 wt %.

[Production of Polymer Emulsion A]

Into a reaction vessel equipped with a stirrer, a reflux condenser, a dropping funnel, a temperature regulator and a nitrogen inlet tube, 80 g of ion-exchanged water, 0.6 g of an anionic polymerizable surfactant, AQUALON KH-10 (produced by Dai-ichi Kogyo Seiyaku Co., Ltd.), 19.5 g of benzyl methacrylate and 10.5 g of dodecyl methacrylate were charged and stirred under irradiation of an ultrasonic wave. Furthermore, the temperature was elevated to 70° C. in nitrogen purging and while keeping the internal temperature of the reaction vessel at 70° C., an aqueous solution prepared by dissolving 0.32 g of potassium persulfate as a polymerization initiator in 10 g of ion-exchanged water was added dropwise over 10 minutes. After the completion of dropwise addition, the polymerization reaction was further performed for 5 hours to obtain a polymer emulsion. The polymer particle concentration in the obtained polymer emulsion was adjusted to 32 wt % to obtain Polymer Emulsion A, and this Polymer Emulsion A obtained was coated on a flat plate to form a liquid film having a uniform thickness and then air-dried at 30° C. to obtain a transparent resin film. The transparent film obtained was thermally analyzed by using a thermal scanning-type refractometer (differential scanning calorimeter: DSC), DSC200 (trade name, manufactured by Seiko Instruments & Electronics Ltd., as a result, the glass transition temperature of the polymer particle in Polymer Emulsion A was 0° C. Also, the volume average particle diameter of the polymer particle contained in Polymer Emulsion A as measured by a dynamic light-scattering particle size distribution analyzer, Microtrac UPA150 (trade name), manufactured by Leads & Northlop Co. was 40 nm.

[Preparation of Ink Composition (Inks 1 to 12, Inks 29 to 34, and Comparative Inks 1 and 2)]

(Ink 1)

Glycerin (15 g), 5 g of triethylene glycol monobutyl ether, 2 g of 1,2-hexanediol, 5 g of trimethylolpropane, 1 g of 2-pyrrolidone, 1 g of OLFINE E1010, 0.05 g of PROXEL XL-2 and 36.65 g of ion-exchanged water were mixed, and 1 g of potassium hydroxide in a concentration of 10 wt % was further added thereto and mixed to obtain a liquid mixture. This liquid mixture was added to 33.3 g of a liquid dispersion of MCP1, and the pigment was dispersed by using a stirring apparatus to obtain the objective Ink 1.

(Inks 1 to 12, Inks 29 to 34, and Comparative Inks 1 and 2)

Inks 2 to 12, Inks 29 to 34, and Comparative Inks 1 and 2 each was prepared according to the method employed above for the preparation of Ink 1 based on the composition shown in Tables 1 to 4 below.

TABLE 1

| Ink Composition | | Ink 1 | Ink 2 | Ink 3 | Ink 4 |
|---|---|---|---|---|---|
| Encapsulated Pigment | MCP1 | 5 | | | |
| | MCP2 | | 5 | | |
| | MCP5 | | | 5 | |
| | MCP6 | | | | 5 |
| Wetting Agent | glycerin | 15 | 15 | 15 | 15 |
| Penetrant | diethylene glycol monobutyl ether | | 5 | 5 | |
| | triethylene glycol monobutyl ether | 5 | | | 5 |
| | 1,2-hexanediol | 2 | 2 | 2 | 2 |
| Solid wetting agent | trimethylolpropane | 5 | 5 | 5 | 5 |
| Polar solvent | 2-pyrrolidone | 1 | 1 | 1 | 1 |
| Surfactant | Olfine E1010 | 1 | 1 | 1 | 1 |
| pH Adjusting agent | potassium hydroxide | 0.1 | 0.1 | 0.1 | 0.1 |
| Antiseptic | Proxel XL-2 | 0.05 | 0.05 | 0.05 | 0.05 |
| Water | ion-exchanged water | bal. | bal. | bal. | bal. |

TABLE 2

| Ink Composition | | Ink 5 | Ink 6 |
|---|---|---|---|
| Encapsulated Pigment | MCP1 | 5 | |
| | MCP2 | | 5 |
| Fine polymer particle | Polymer Emulsion A | 4 | 4 |
| Wetting Agent | glycerin | 15 | 15 |
| Penetrant | diethylene glycol monobutyl ether | | 5 |
| | triethylene glycol monobutyl ether | 5 | |
| | 1,2-hexanediol | 2 | 2 |
| Solid wetting agent | trimethylolpropane | 5 | 5 |
| Polar solvent | 2-pyrrolidone | 1 | 1 |
| Surfactant | Olfine E1010 | 1 | 1 |
| pH Adjusting agent | potassium hydroxide | 0.1 | 0.1 |
| Antiseptic | Proxel XL-2 | 0.05 | 0.05 |
| Water | ion-exchanged water | bal. | bal. |

TABLE 3-1

| Ink Composition | | Ink 7 | Ink 8 | Ink 9 | Ink 10 |
|---|---|---|---|---|---|
| Encapsulated Pigment | MCP7 | 5 | | | |
| | MCP8 | | 5 | | |
| | MCP9 | | | 5 | |
| | MCP10 | | | | 5 |
| | MCP11 | | | | |
| | MCP12 | | | | |
| | MCP17 | | | | |
| | MCP18 | | | | |
| Wetting Agent | glycerin | 15 | 15 | 15 | 15 |
| Penetrant | diethylene glycol monobutyl ether | | 5 | 5 | |
| | triethylene glycol monobutyl ether | 5 | | | 5 |
| | 1,2-hexanediol | 2 | 2 | 2 | 2 |

TABLE 3-1-continued

Ink Composition

| | | | | | |
|---|---|---|---|---|---|
| Solid wetting agent | trimethylolpropane | 5 | 5 | 5 | 5 |
| Polar solvent | 2-pyrrolidone | 1 | 1 | 1 | 1 |
| Surfactant | Olfine E1010 | 1 | 1 | 1 | 1 |
| pH Adjusting agent | potassium hydroxide | 0.1 | 0.1 | 0.1 | 0.1 |
| Antiseptic | Proxel XL-2 | 0.05 | 0.05 | 0.05 | 0.05 |
| Water | ion-exchanged water | bal. | bal. | bal. | bal. |

| | | Ink 11 | Ink 12 | Ink 29 | Ink 30 |
|---|---|---|---|---|---|
| Encapsulated Pigment | MCP7 | 5 | | | |
| | MCP8 | | | | |
| | MCP9 | | | | |
| | MCP10 | | | | |
| | MCP11 | 5 | | | |
| | MCP12 | | 5 | | |
| | MCP17 | | | 5 | |
| | MCP18 | | | | 5 |
| Wetting Agent | glycerin | 15 | 15 | 15 | 15 |
| Penetrant | diethylene glycol monobutyl ether | 5 | | | |
| | triethylene glycol monobutyl ether | | 5 | 5 | 5 |
| | 1,2-hexanediol | 2 | 2 | 2 | 2 |
| Solid wetting agent | trimethylolpropane | 5 | 5 | 5 | 5 |
| Polar solvent | 2-pyrrolidone | 1 | 1 | 1 | 1 |
| Surfactant | Olfine E1010 | 1 | 1 | 1 | 1 |
| pH Adjusting agent | potassium hydroxide | 0.1 | 0.1 | 0.1 | 0.1 |
| Antiseptic | Proxel XL-2 | 0.05 | 0.05 | 0.05 | 0.05 |
| Water | ion-exchanged water | bal. | bal. | bal. | bal. |

TABLE 3-2

Ink Composition

| | | Ink 31 | Ink 32 | Ink 33 | Ink 34 |
|---|---|---|---|---|---|
| Encapsulated Pigment | MCP19 | 5 | | | |
| | MCP20 | | 5 | | |
| | MCP21 | | | 5 | |
| | MCP22 | | | | 5 |
| Wetting Agent | glycerin | 15 | 15 | 15 | 15 |
| | triethylene glycol monobutyl ether | 5 | 5 | 5 | 5 |
| | 1,2-hexanediol | 2 | 2 | 2 | 2 |
| Solid wetting agent | trimethylolpropane | 5 | 5 | 5 | 5 |
| Polar solvent | 2-pyrrolidone | 1 | 1 | 1 | 1 |
| Surfactant | Olfine E1010 | 1 | 1 | 1 | 1 |
| pH Adjusting agent | potassium hydroxide | 0.1 | 0.1 | 0.1 | 0.1 |
| Antiseptic | Proxel XL-2 | 0.05 | 0.05 | 0.05 | 0.05 |
| Water | ion-exchanged water | bal. | bal. | bal. | bal. |

TABLE 4

Ink Composition

| | | Comparative Ink 7 | Comparative Ink 8 |
|---|---|---|---|
| Encapsulated Pigment MCP13 | | 5 | |
| Pigment Liquid Dispersion A | | | 5 |
| Wetting Agent | glycerin | 15 | 15 |
| Penetrant | diethylene glycol monobutyl ether | | 5 |
| | triethylene glycol monobutyl ether | 5 | |
| | 1,2-hexanediol | 2 | 2 |
| Solid wetting agent | trimethylolpropane | 5 | 5 |
| Polar solvent | 2-pyrrolidone | 1 | 1 |
| Surfactant | Olfine E1010 | 1 | 1 |
| pH Adjusting agent | potassium hydroxide | 0.1 | 0.1 |
| Antiseptic | Proxel XL-2 | 0.05 | 0.05 |
| Water | ion-exchanged water | bal. | bal. |

1) The numerals shown in Tables indicate the content (wt %) of each component in the ink composition.

2) However, with respect to the encapsulated pigment, fine polymer particle and pigment, these are a value shown in terms of the solid content concentration.

[Evaluation of Ink Composition]

The color formation, gloss, image clarity, scratch resistance, water resistance, ejection stability and print density (OD value on plain paper) of each of Inks 1 to 12, Inks 29 to 34, and Comparative Inks 1 and 2 were evaluated by the following method.

(Evaluation 1: Color Formation)

Inks 1 to 12, Inks 29 to 34, and Comparative Inks 1 and 2 prepared above each was filled in an ink cartridge, the ink cartridge was loaded on Inkjet Printer PX-600C (trade name, manufactured by Seiko Epson Corp.), solid printing was performed on respective photographic paper sheets, KOTAKU (trade name, produced by Seiko Epson Corp.) and Xerox P (trade name, produced by Xerox Corp.), and the C* value on the solid-printed portion was measured. The measurement of the C* value was performed by using a spectrophotometer (GRETAG SPM-50, manufactured by Gretag Macbeth). The color formation of each ink composition was evaluated according to the following ratings A to D.

[Evaluation Criteria]

A: C* is 80 or more.
B: C* is from 70 to less than 80.
C: C* is from 50 to less than 70.
D: C* is less than 50.

(Evaluation 2: Gloss)

Inks 1 to 12, Inks 29 to 34, and Comparative Inks 1 and 2 prepared above each was filled in an ink cartridge, the ink cartridge was loaded on Inkjet Printer EM-930C (trade name, manufactured by Seiko Epson Corp.), and a solid image (100% duty) was printed on a photographic paper sheet, KOTAKU (trade name, produced by Seiko Epson Corp.), at 1440×720 dpi.

By using an automatic goniophotometer, GP-200 (manufactured by Murakami Color Research Laboratory Co., Ltd.), as the measuring apparatus, the specular gloss on the recording surface at an incident angle 45° was measured under the conditions of 12 V, 50 W, an incident beam aperture diameter of 1 mm, a reflected light aperture diameter of 1.5 mm, an ND10 filter, an indent angle of 45°, a flapping angle of 0° and a standard mirror plate of 42.5. The results obtained are evaluated according to the following criteria.

[Evaluation Criteria]

AAA: The gloss value is more than 25.
AA: The gloss value is from 21 to 25.
A: The gloss value is from 16 to 20.
B: The gloss value is from 11 to 15.
C: The gloss value is from 5 to 10.
D: The gloss value is from 1 to 4.

(Evaluation 3: Image Clarity)

Using the printed matter (solid image) obtained in Evaluation 2, the image clarity on the printing surface (solid image) at an incident angle of 45° was measured by a touch panel-type image clarity measuring apparatus, ICM-1T, manufactured by Suga Test Instruments Co., Ltd. The results obtained are evaluated according to the following criteria.

[Evaluation Criteria]

AA: The image clarity is 31 or more
A: The image clarity is from 26 to 30.
B: The image clarity is from 21 to 25.
C: The image clarity is from 11 to 20.
D: The image clarity is from 1 to 10.

[Evaluation 4: Scratch Resistance]

Inks 1 to 12, Inks 29 to 34, and Comparative Inks 1 and 2 prepared above each was filled in an ink cartridge, the ink cartridge was loaded on Inkjet Printer PX-600C (product name, manufactured by Seiko Epson Corp.), solid printing at 100% duty was performed in the region of 10 mm×10 mm on SUPERFINE SPECIAL GLOSS FILM (trade name, produced by Seiko Epson Corp.), and the printed matter was left standing at a temperature of 25° C. for 1 hour. Thereafter, the printed region was rubbed with an aqueous yellow fluorescent marker pen, ZEBRA PEN 2 (trademark, produced by ZEBRA) under a load of 500 g on the pen tip at a speed of 10 mm/sec, and whether staining was generated in the printed region was observed. The results obtained were evaluated according to the following criteria.

[Evaluation Criteria]

AAA: Absolutely no staining is generated even by rubbing three times.
A: Absolutely no staining is generated even by rubbing twice.
B: Staining is not generated in the printed region by rubbing once, but staining is generated by second rubbing.
C: Staining is generated by rubbing once.

(Evaluation 5: Water Resistance)

Inks 1 to 12, Inks 29 to 34, and Comparative Inks 1 and 2 prepared above each was filled in an ink cartridge, the ink cartridge was loaded on Inkjet Printer PX-600C (trade name, manufactured by Seiko Epson Corp.), a letter was printed on plain paper, Xerox P (trade name, produced by Xerox Corp.), 1 ml of ion-exchanged water was dropped on the printed portion, and the state after 20 minutes was observed with an eye. The results obtained were evaluated according to the following criteria.

[Evaluation Criteria]

A: No change over the entire sheet including the printed portion.
B: The coloring material slightly bleeds out from the printed portion, but the letter can be recognized.
C: The coloring material bleeds out from the printed portion to make the contour of the printed letter unclear, and the letter can be hardly recognized.

(Evaluation 6: Ejection Stability)

Inks 1 to 12, Inks 29 to 34, and Comparative Inks 1 and 2 prepared above each was filled in an ink cartridge, the ink cartridge was loaded on Inkjet Printer PX-600C (manufactured by Seiko Epson Corp.), 1-mm ruled lines were printed on a superfine special gloss paper sheet produced by Seiko Epson Corp., and the state of printing such as dot missing and slippage in the ink landing position was observed with an eye and evaluated according to the following criteria.

[Evaluation Criteria]

A: Even when the number of sheets printed is 10,000 or more, neither dot missing nor slippage in the ink landing position occurs.
B: When the number of sheets printed is from 1,000 to less than 10,000, dot missing or slippage in the ink landing position occurs.
C: When the number of sheets printed is from 100 to less than 1,000, dot missing or slippage in the ink landing position occurs.
D: When the number of sheets printed is less than 100, dot missing or slippage in the ink landing position occurs.

Evaluation 6: Print Density (OD Value on Plain Paper)

Inks 1 to 12, Inks 29 to 34, and Comparative Inks 1 and 2 prepared above each was filled in an ink cartridge, the ink cartridge was loaded on Inkjet Printer PX-600C (manufactured by Seiko Epson Corp.), solid printing was performed on plain paper, Xerox P (produced by Xerox Corp.), the density in this solid-printed portion was measured by a spectrophotometer (GRETAG SPM-50, manufactured by Gretag Macbeth), and the results obtained were evaluated according to the following criteria.

AA: The OD value is 1.15 or more.
A: The OD value is 1.15 or more.
B: The OD value is from 1.10 to less than 1.15.
C: The OD value is less than 1.10.

The evaluation results on these evaluation items of each of Inks 1 to 12, Inks 29 to 34, and Comparative Inks 1 and 2 are shown in Tables 5-1 to 5-3.

TABLE 5

| | Evaluation Results | | | | | | |
|---|---|---|---|---|---|---|---|
| | Evaluation 1 Color Formation | Evaluation 2 Gloss | Evaluation 3 Image Clarity | Evaluation 4 Scratch Resistance | Evaluation 5 Water Resistance | Evaluation 6 Ejection Stability | Evaluation 7 OD Value (plain paper) |
| Ink 1 | A | A | A | B | A | A | A |
| Ink 2 | A | A | A | A | A | A | A |
| Ink 3 | A | A | A | B | A | A | A |
| Ink 4 | A | B | B | C | A | A | A |
| Ink 5 | A | A | AA | AA | A | A | AA |
| Ink 6 | A | A | AA | AA | A | A | AA |
| Ink 7 | A | A | A | B | A | A | A |
| Ink 8 | A | A | A | B | A | A | A |
| Ink 9 | A | A | A | B | A | A | A |
| Ink 10 | A | A | A | B | A | A | A |
| Ink 11 | A | A | A | B | A | A | A |
| Ink 12 | A | B | B | C | A | A | A |
| Ink 29 | A | A | AA | AA | A | A | A |
| Ink 30 | A | A | AA | AA | A | A | A |
| Ink 31 | A | AA | AA | AA | A | A | AA |
| Ink 32 | B | B | B | AA | B | B | B |

TABLE 5-continued

| | Evaluation 1 Color Formation | Evaluation 2 Gloss | Evaluation 3 Image Clarity | Evaluation 4 Scratch Resistance | Evaluation 5 Water Resistance | Evaluation 6 Ejection Stability | Evaluation 7 OD Value (plain paper) |
|---|---|---|---|---|---|---|---|
| Ink 33 | B | B | B | AA | B | B | B |
| Ink 34 | A | AA | AA | AA | A | A | AA |
| Comparative Ink 1 | B | D | D | C | B | C | B |
| Comparative Ink 2 | C | D | D | B | B | C | C |

In Table 5, the results when the encapsulated product (encapsulated pigment) of the present invention was used as an ink for inkjet recording are shown. It is seen that the ink compositions according to Inks 2, 29, 30, 31 and 34 have excellent ejection stability and the image printed on the inkjet special media is assured of high gloss and high image clarity and excellent in the scratch resistance and water resistance, and further that the image printed on plain paper has a high print density.

Also, it is seen that in the case of the ink compositions according to Inks 1, 3, 7, 8, 9, 10, 11, 4, 12, 32 and 33, good results are obtained as compared with the ink compositions according to Comparative Inks 1 and 2.

In addition, it is seen that the ink compositions according to Inks 5 and 6 containing a polymer emulsion have high image clarity and excellent scratch resistance and the image printed on plain paper is assured of high print density. Particularly, the scratch resistance is excellent.

[Preparation of Ink Composition (Inks 17 to 26 and Comparative Inks 3 to 8)]

Inks 17 to 26 and Comparative Inks 3 to 8 each was prepared according to the method employed above for the preparation of Inks 1 to 12, Inks 29 to 34, and Comparative Inks 1 and 2, based on the composition shown in Tables 6 to below.

TABLE 6

| | Ink Composition | Ink 17 | Ink 18 | Ink 19 | Ink 20 | Ink 21 |
|---|---|---|---|---|---|---|
| Encapsulated Pigment | MCP2 | 5 | | | | |
| | MCP7 | | 5 | | | |
| | MCP17 | | | 5 | | |
| | MCP18 | | | | 5 | |
| | MCP19 | | | | | 5 |
| Wetting Agent | glycerin | 15 | 15 | 15 | 15 | 15 |
| Penetrant | diethylene glycol monobutyl ether | | 5 | 5 | | 5 |
| | triethylene glycol monobutyl ether | 5 | | | 5 | |
| | 1,2-hexanediol | 2 | 2 | 2 | 2 | 2 |
| DMH-20 | | 1 | 1 | 1 | 1 | 1 |
| Solid wetting agent | trimethylolpropane | 5 | 5 | 5 | 5 | 5 |
| Polar solvent | 2-pyrrolidone | 1 | 1 | 1 | 1 | 1 |
| Surfactant | Olfine E1010 | 1 | 1 | 1 | 1 | 1 |
| pH Adjusting agent | potassium hydroxide | 0.1 | 0.1 | 0.1 | 0.1 | 0.1 |
| Antiseptic | Proxel XL-2 | 0.05 | 0.05 | 0.05 | 0.05 | 0.05 |
| Water | ion-exchanged water | bal. | bal. | bal. | bal. | bal. |

TABLE 7

| | Ink Composition | Ink 22 | Ink 23 | Ink 24 | Ink 25 | Ink 26 |
|---|---|---|---|---|---|---|
| Encapsulated Pigment | MCP2 | 5 | | | | |
| | MCP7 | | 5 | | | |
| | MCP17 | | | 5 | | |
| | MCP18 | | | | 5 | |
| | MCP19 | | | | | 5 |
| Wetting Agent | glycerin | 15 | 15 | 15 | 15 | 15 |
| Penetrant | diethylene glycol monobutyl ether | | 5 | 5 | | 5 |
| | triethylene glycol monobutyl ether | 5 | | | 5 | |
| | 1,2-hexanediol | 2 | 2 | 2 | 2 | 2 |
| Butyl ethyl propanediol | | 1 | 1 | 1 | 1 | 1 |
| Solid wetting agent | trimethylolpropane | 5 | 5 | 5 | 5 | 5 |
| Polar solvent | 2-pyrrolidone | 1 | 1 | 1 | 1 | 1 |
| Surfactant | Olfine E1010 | 1 | 1 | 1 | 1 | 1 |
| pH Adjusting agent | potassium hydroxide | 0.1 | 0.1 | 0.1 | 0.1 | 0.1 |
| Antiseptic | Proxel XL-2 | 0.05 | 0.05 | 0.05 | 0.05 | 0.05 |
| Water | ion-exchanged water | bal. | bal. | bal. | bal. | bal. |

TABLE 8

| | Ink Composition | Comparative Ink 3 | Comparative Ink 4 | Comparative Ink 5 |
|---|---|---|---|---|
| Encapsulated Pigment | MCP13 | 5 | | |
| | MCP16 | | 5 | |
| Pigment Liquid Dispersion A | | | | 5 |
| Wetting Agent | glycerin | 15 | 15 | 15 |
| Penetrant | diethylene glycol monobutyl ether | | 5 | 5 |
| | triethylene glycol monobutyl ether | 5 | | |
| | 1,2-hexanediol | 2 | 2 | 2 |
| DMH-20 | | 1 | 1 | 1 |
| Butyl ethyl propanediol | | | | |
| Solid wetting agent | trimethylolpropane | 5 | 5 | 5 |
| Polar solvent | 2-pyrrolidone | 1 | 1 | 1 |
| Surfactant | Olfine E1010 | 1 | 1 | 1 |
| pH Adjusting agent | potassium hydroxide | 0.1 | 0.1 | 0.1 |
| Antiseptic | Proxel XL-2 | 0.05 | 0.05 | 0.05 |
| Water | ion-exchanged water | bal. | bal. | bal. |

| | | Comparative Ink 6 | Comparative Ink 7 | Comparative Ink 8 |
|---|---|---|---|---|
| Encapsulated Pigment | MCP13 | 5 | | |
| | MCP16 | | 5 | |
| Pigment Liquid Dispersion A | | | | 5 |
| Wetting Agent | glycerin | 15 | 15 | 15 |
| Penetrant | diethylene glycol monobutyl ether | | 5 | 5 |
| | triethylene glycol monobutyl ether | 5 | | |
| | 1,2-hexanediol | 2 | 2 | 2 |
| DMH-20 | | | | |
| Butyl ethyl propanediol | | 1 | 1 | 1 |
| Solid wetting agent | trimethylolpropane | 5 | 5 | 5 |
| Polar solvent | 2-pyrrolidone | 1 | 1 | 1 |
| Surfactant | Olfine E1010 | 1 | 1 | 1 |
| pH Adjusting agent | potassium hydroxide | 0.1 | 0.1 | 0.1 |
| Antiseptic | Proxel XL-2 | 0.05 | 0.05 | 0.05 |
| Water | ion-exchanged water | bal. | bal. | bal. |

1) The numerals shown in Tables indicate the content (wt %) of each component in the ink composition.
2) However, with respect to the encapsulated pigment and pigment, these are a value shown in terms of the solid content concentration.

In Tables 6 to 8, DMH-20 is a compound of formula (1) and has the following structure produced by Nippon Nyukazai Co., Ltd.

[Chem. 38]

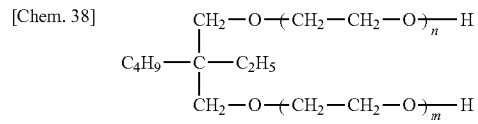

(wherein m+n=2).

Also, in Tables 6 to 8, butyl ethyl propane diol is a compound of formula (1) and has the following structure produced by Kyowa Hakko Chemical Co., Ltd.

[Chem. 39]

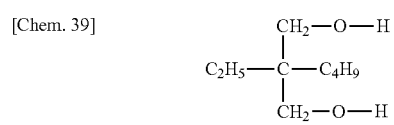

[Evaluation of Ink Composition]

The evaluations of gloss and image clarity of Inks 17 to 26 and Comparative Inks 3 to 8 were performed by the above-described evaluation methods of (Evaluation 2: Gloss) and (Evaluation 3: Image Clarity).

The evaluation results are shown in Table 9.

[Table 9]

TABLE 9

| Evaluation Results | | | | | |
|---|---|---|---|---|---|
| Example | Ink 17 | Ink 18 | Ink 19 | Ink 20 | Ink 21 |
| Evaluation 2: gloss | AA | AA | AA | AA | AA |
| Evaluation 3: image clarity | AA | AA | AA | AA | AA |
| Example | Ink 22 | Ink 23 | Ink 24 | Ink 25 | Ink 26 |
| Evaluation 2: gloss | AAA | AAA | AAA | AAA | AAA |
| Evaluation 3: image clarity | AA | AA | AA | AA | AA |

| Comparative Example | Comparative Ink 3 | Comparative Ink 4 | Comparative Ink 5 |
|---|---|---|---|
| Evaluation 2: gloss | D | B | C |
| Evaluation 3: image clarity | D | C | D |

| Comparative Example | Comparative Ink 6 | Comparative Ink 7 | Comparative Ink 8 |
|---|---|---|---|
| Evaluation 2: gloss | C | B | C |
| Evaluation 3: image clarity | C | B | C |

It is seen from the results in Table 9 that the ink compositions using the encapsulated pigment obtained by the present invention and the compound of formula (1) (Inks 17 to 26) ensure excellent gloss and high image clarity.

DESCRIPTION OF NUMERICAL REFERENCES

Figure 1:
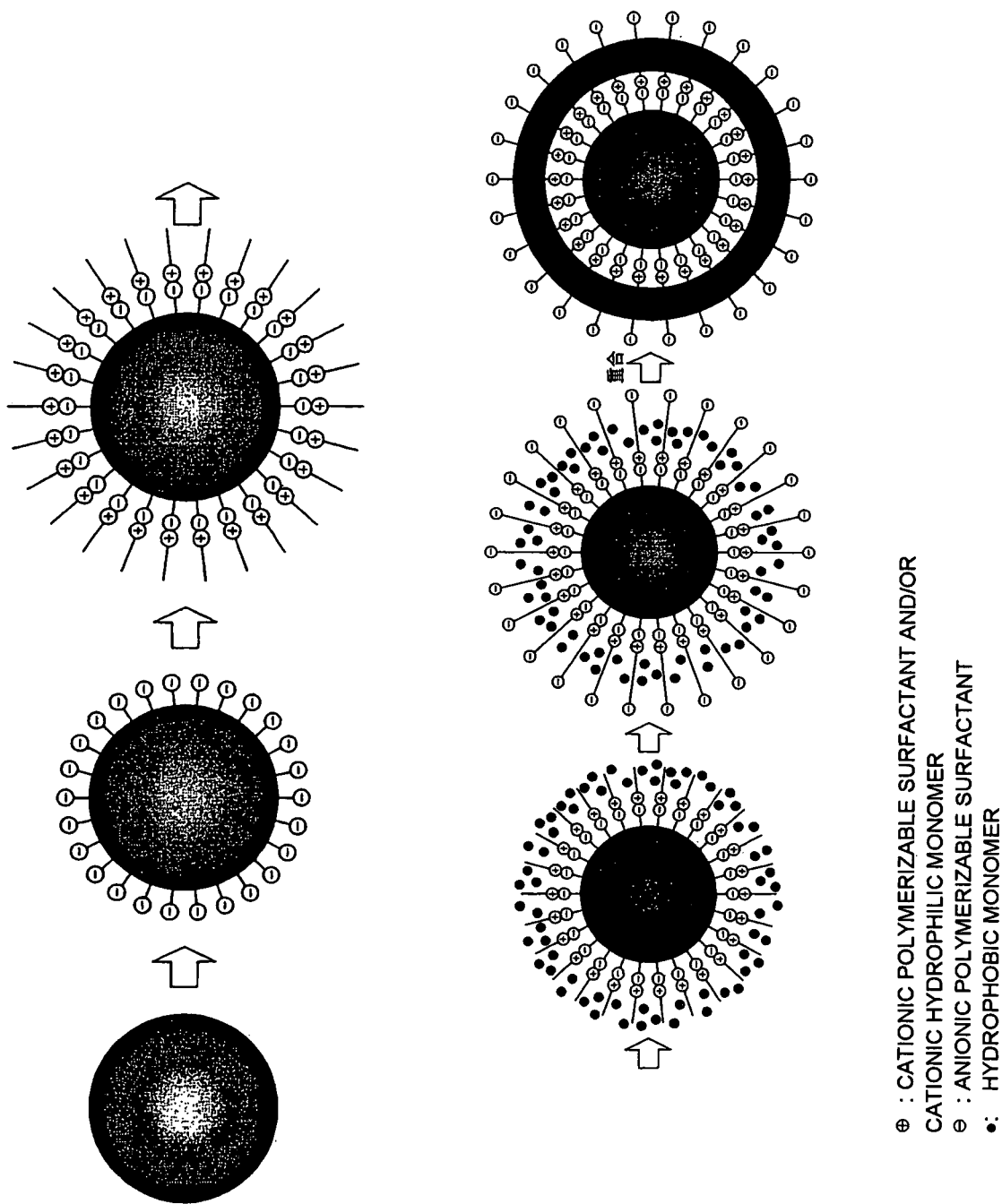
FIG. 1 A view showing an outline of the encapsulated coloring material of the present invention and the production method thereof.
Figure 2:
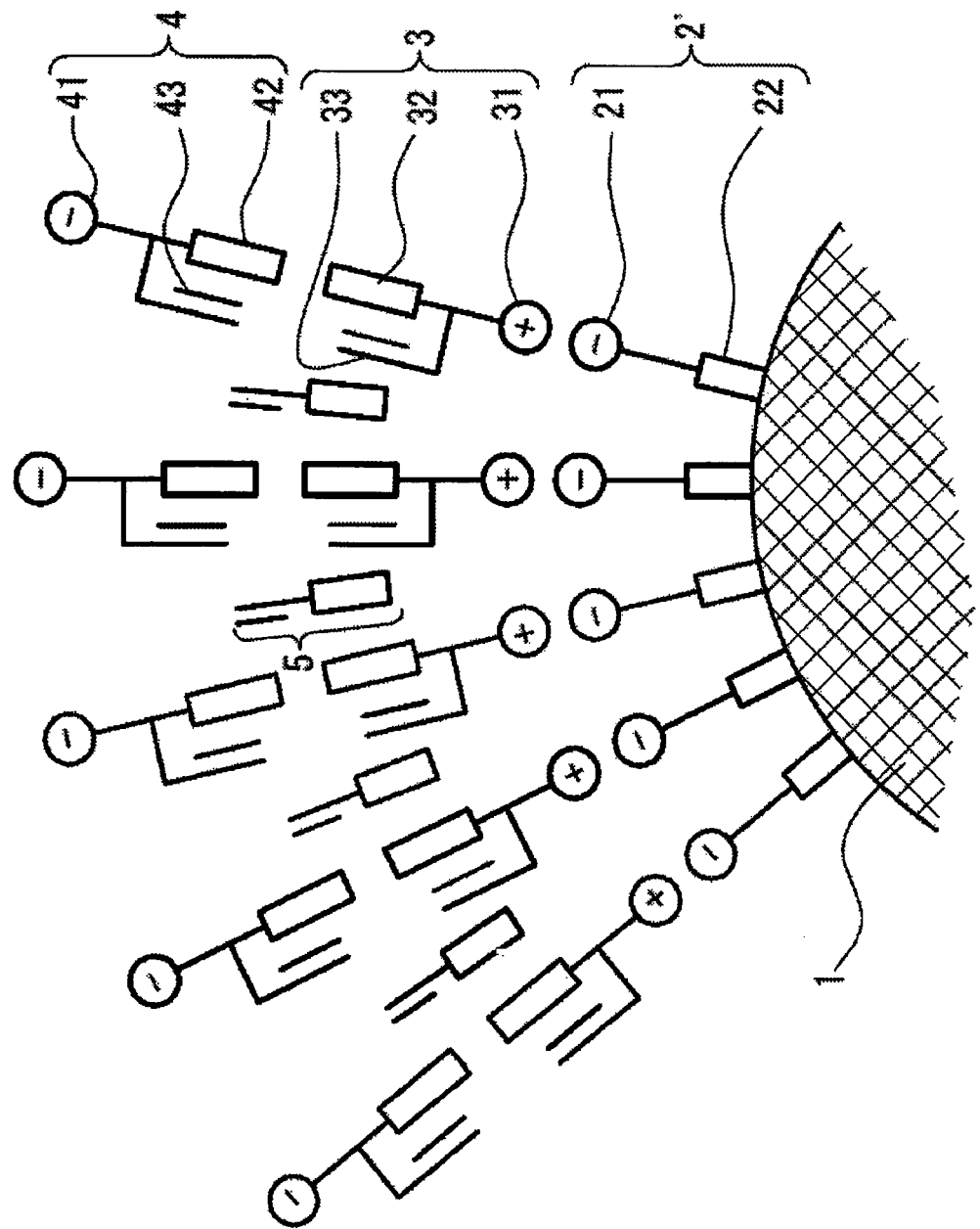
FIG. 2 A schematic view showing a state where a negatively charged anionic surfactant adsorbed to the surface of a core substance, a positively charged cationic polymerizable surfactant (although not shown, a cationic monomer containing at least a positively charged cationic group and a polymerizable group may be used in place of this cationic polymerizable surfactant), a negatively charged anionic polymerizable surfactant, and a hydrophobic monomer are present together.
Figure 3:
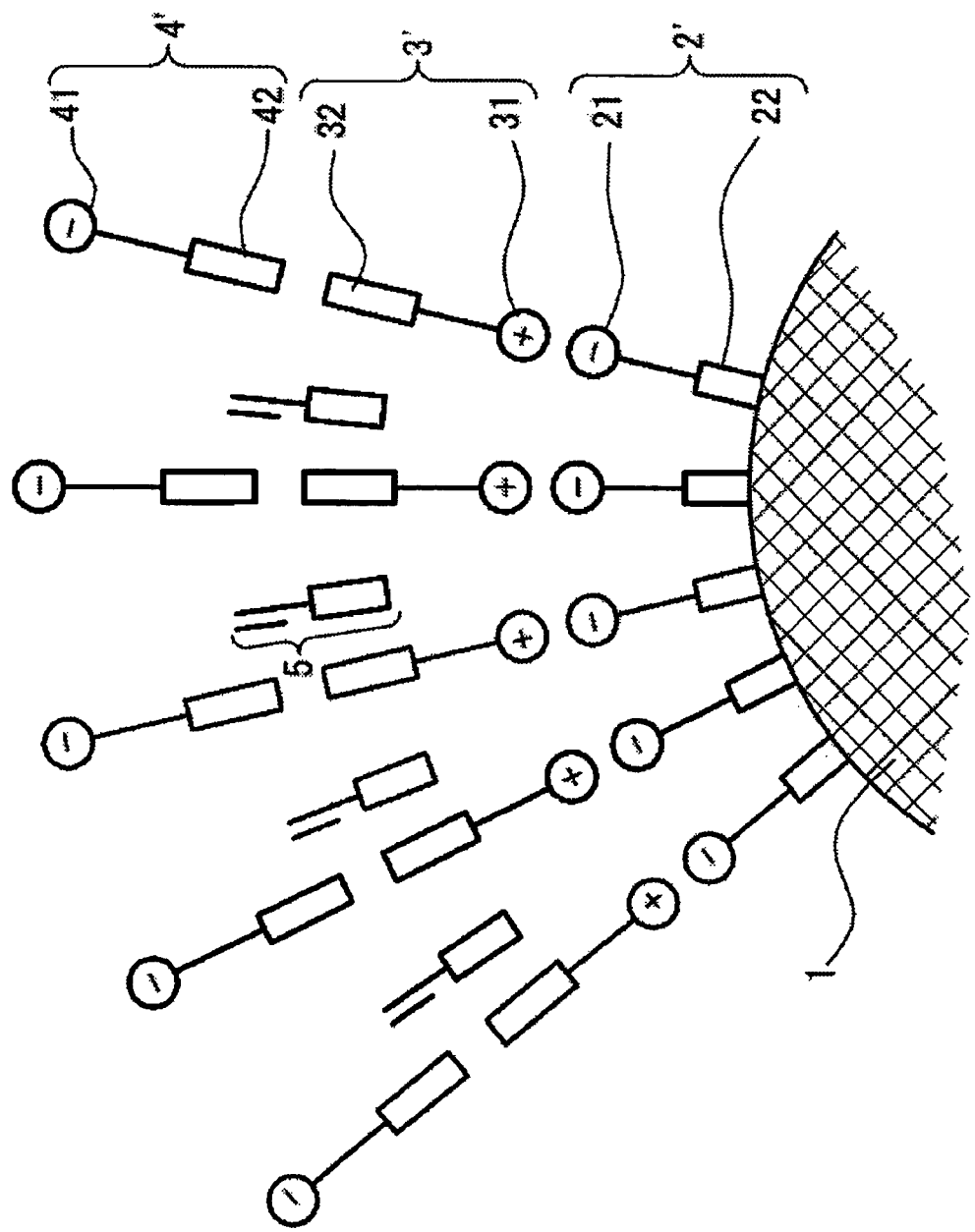
FIG. 3 A schematic view showing a state where a negatively charged anionic surfactant adsorbed to the surface of a core substance, a positively charged cationic surfactant, a negatively charged anionic surfactant, and a hydrophobic monomer are present together.
Figure 4:
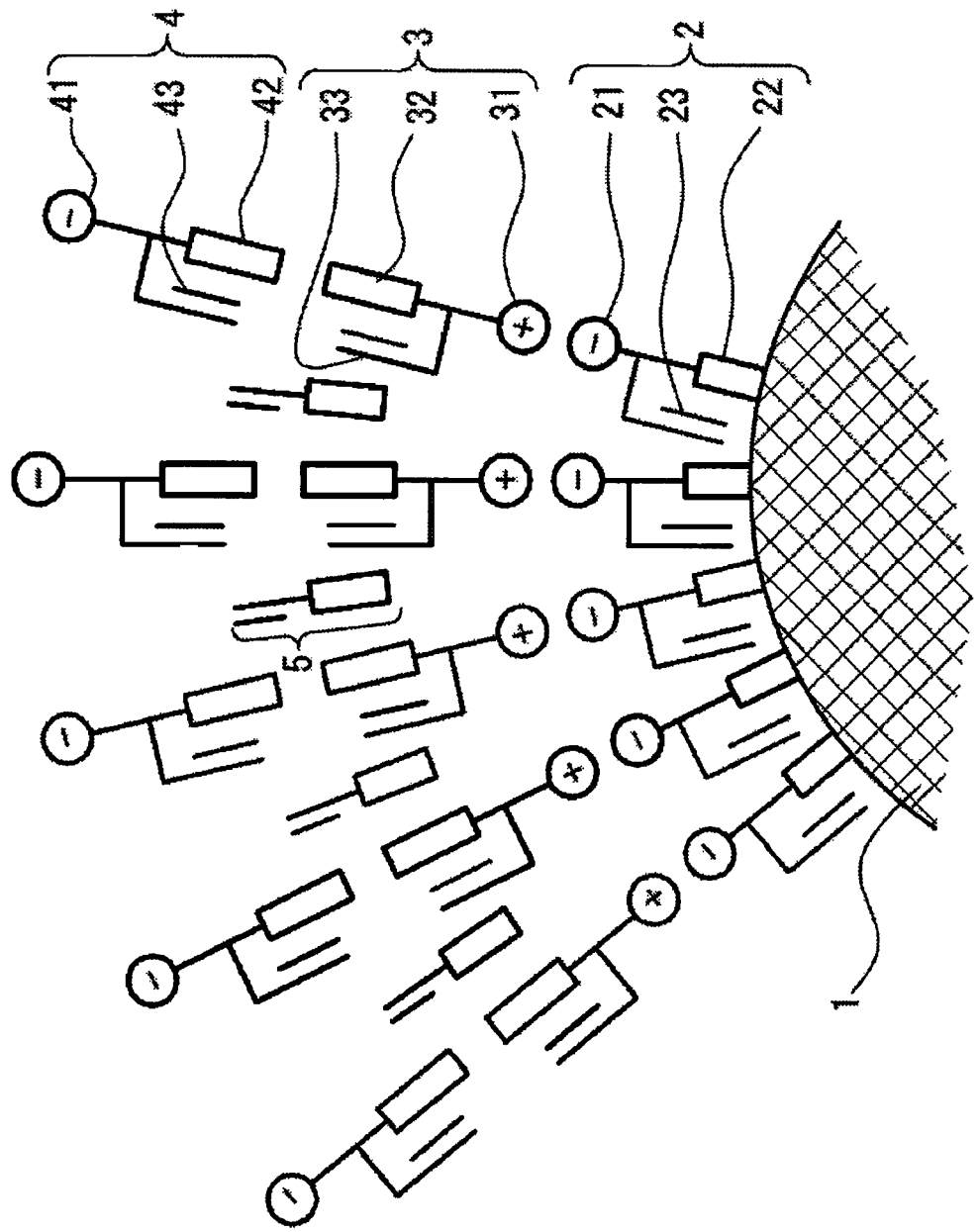
FIG. 4 A view showing a state where a negatively charged anionic polymerizable surfactant adsorbed to the surface of a core substance, a positively charged cationic polymerizable surfactant (although not shown, a cationic monomer containing at least a positively charged cationic group and a polymerizable group may be used in place of this cationic polymerizable surfactant), a negatively charged anionic polymerizable surfactant, and a hydrophobic monomer are present together.
Figure 5:
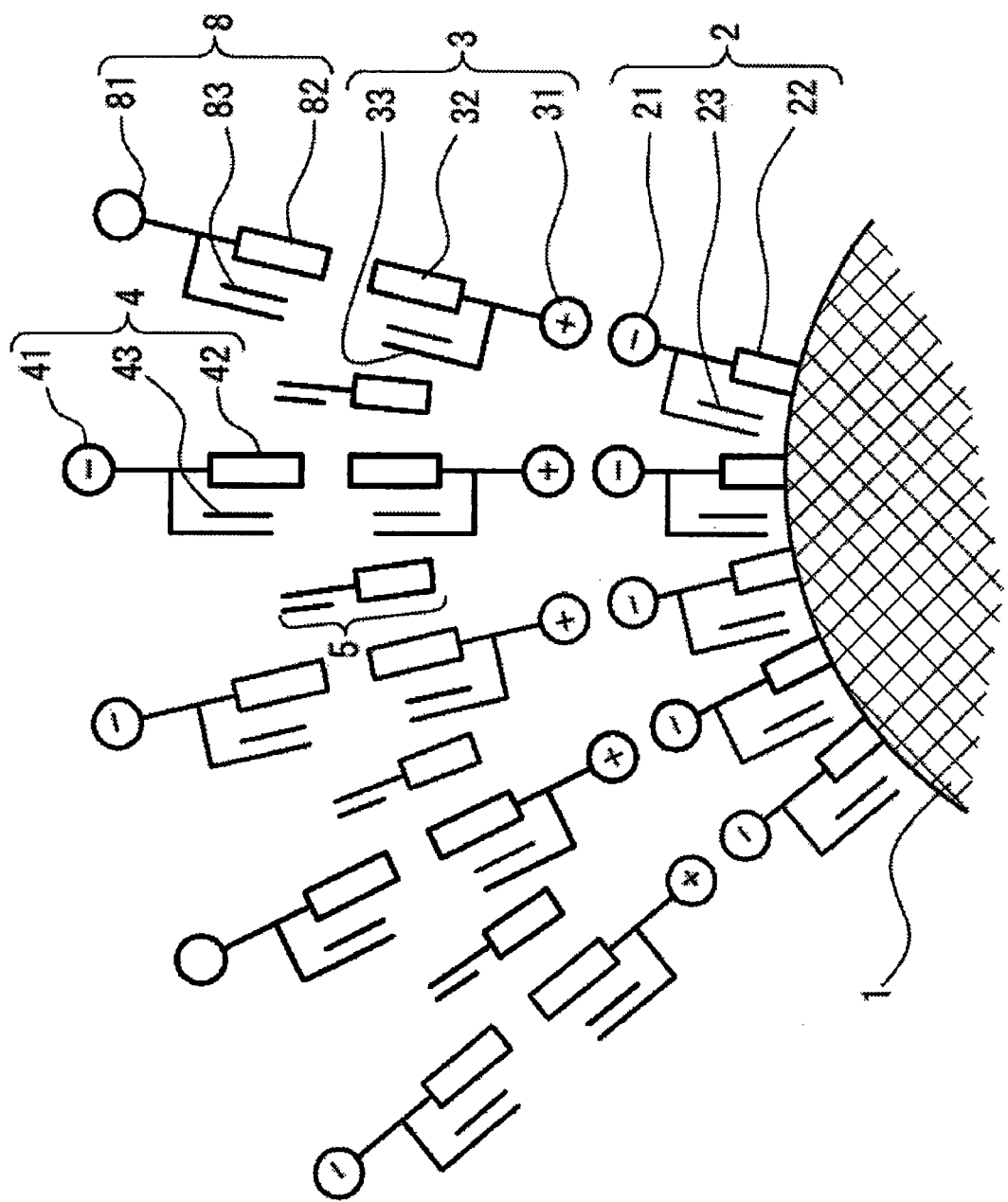
FIG. 5 A view showing a state where a negatively charged anionic polymerizable surfactant adsorbed to the surface of a core substance, a positively charged cationic polymerizable surfactant (although not shown, a cationic monomer containing at least a positively charged cationic group and a polymerizable group may be used in place of this cationic polymerizable surfactant), a negatively charged anionic polymerizable surfactant, a nonionic polymerizable surfactant, and a hydrophobic monomer are present together.
Figure 6:
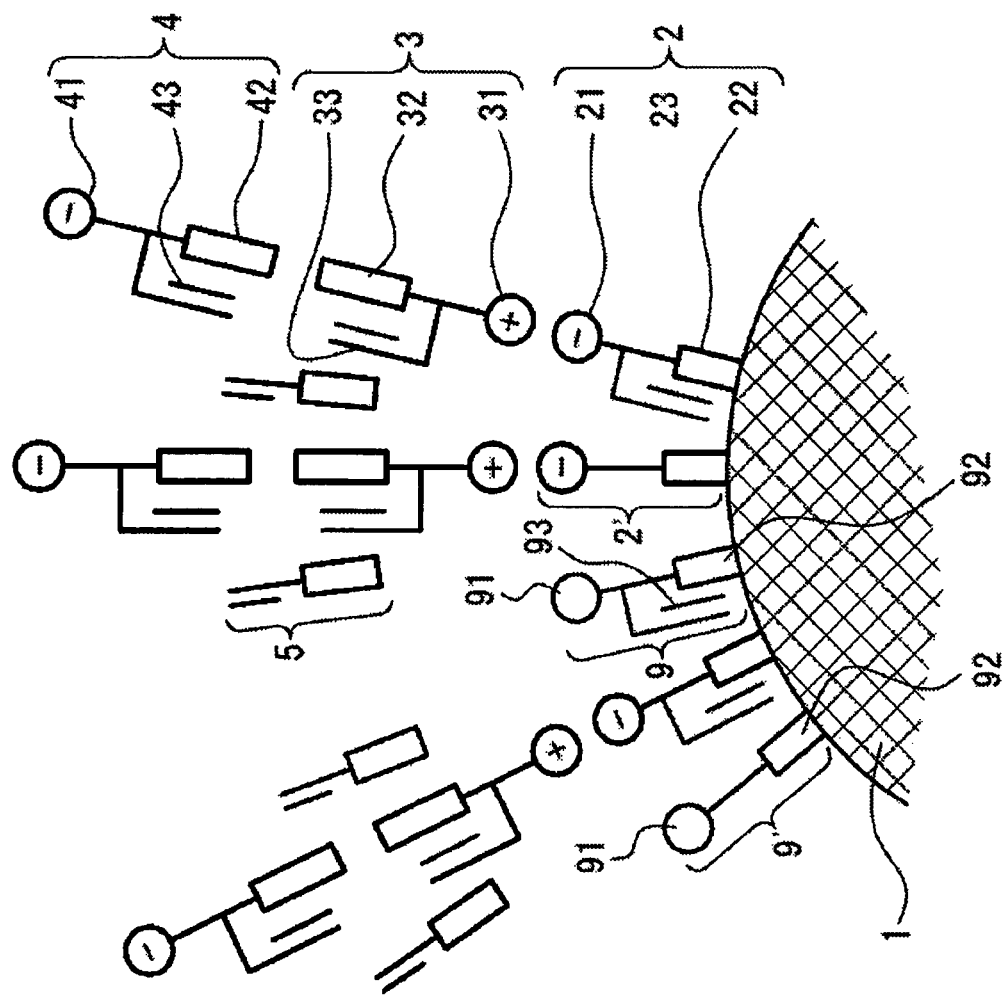
FIG. 6 A view showing a state where a negatively charged anionic surfactant and/or anionic polymerizable surfactant, and a nonionic surfactant and/or nonionic polymerizable surfactant both are adsorbing to the surface of a core substance, and a positively charged cationic polymerizable surfactant (although not shown, a cationic monomer containing at least a positively charged cationic group and a polymerizable group may be used in place of this cationic polymerizable surfactant), a negatively charged anionic polymerizable surfactant, and a hydrophobic monomer are present together.
Figure 7:
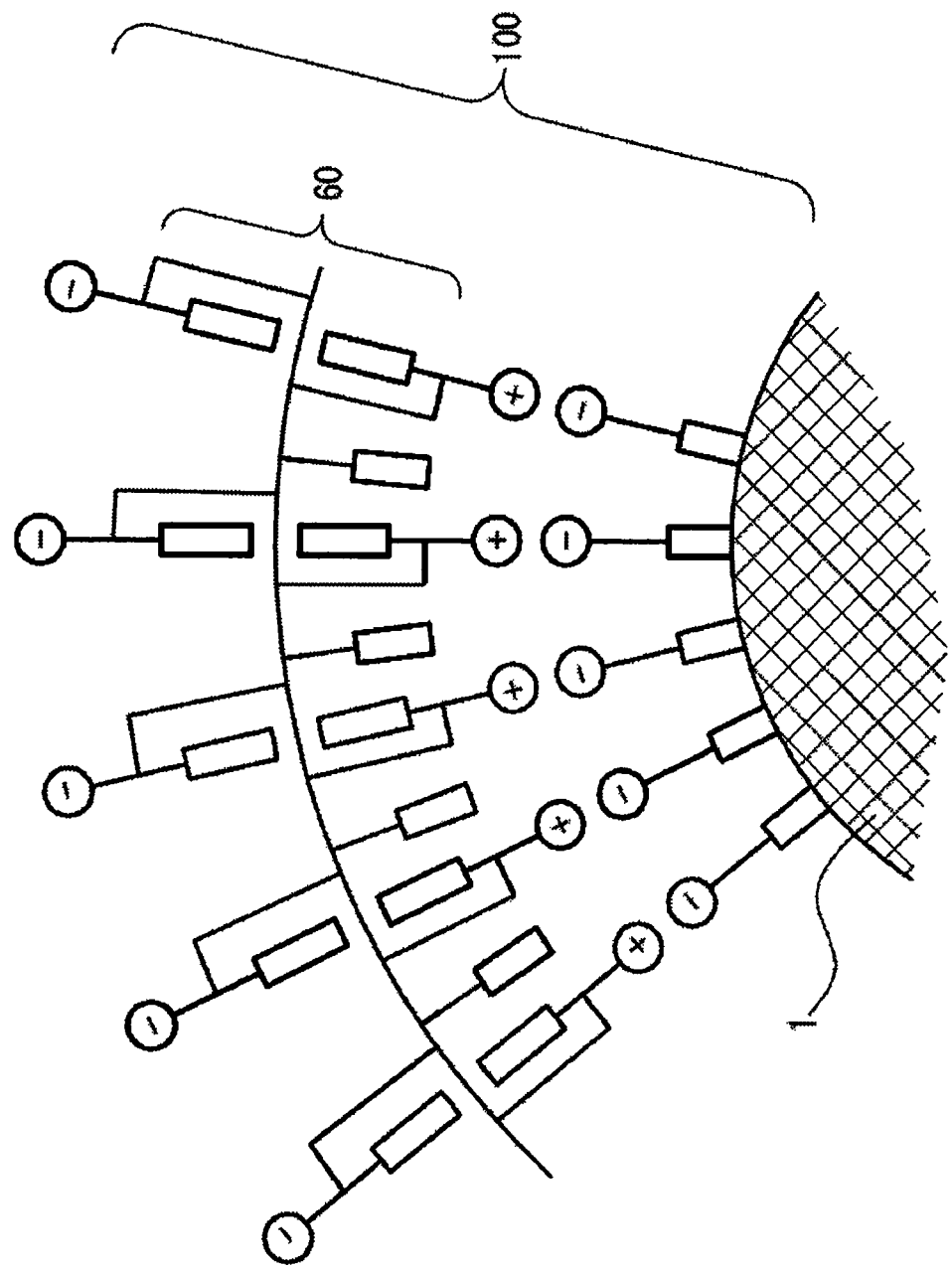
FIG. 7 A schematic view showing a state where the state shown in FIG. 2 is encapsulated.
Figure 8:
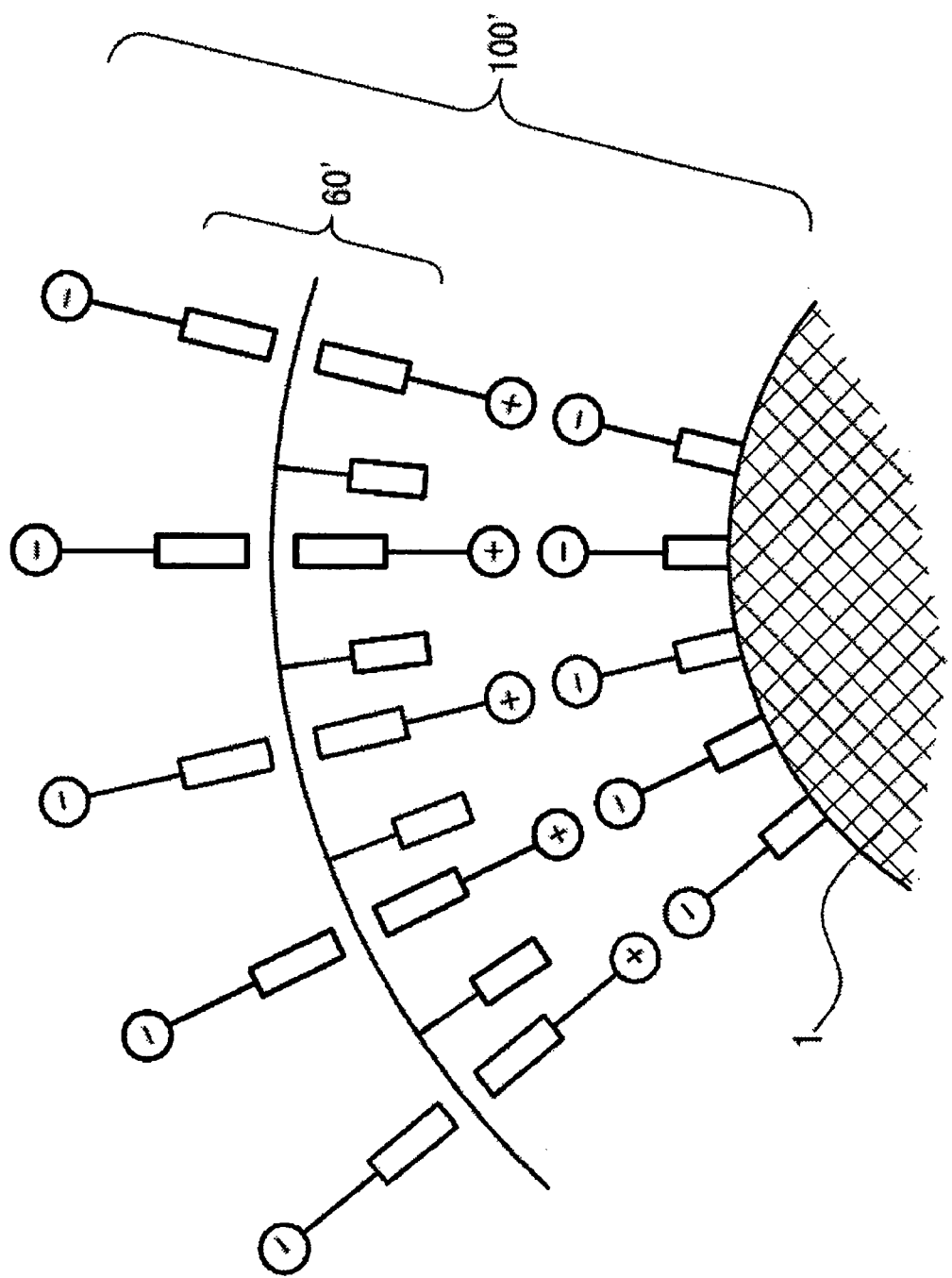
FIG. 8 A schematic view showing a state where the state shown in FIG. 3 is encapsulated.
Figure 9:
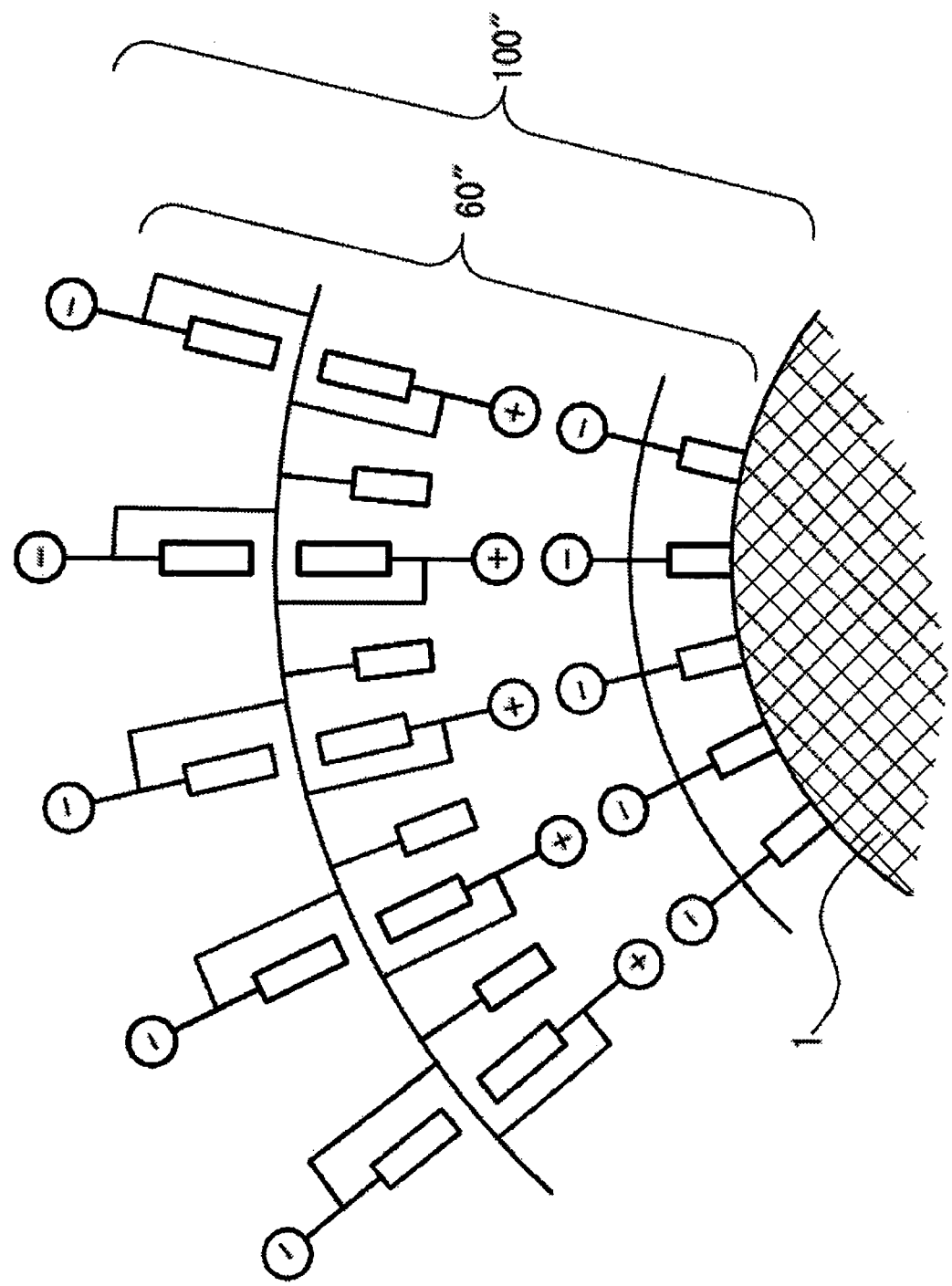
FIG. 9 A schematic view showing a state where the state shown in FIG. 4 is encapsulated.
Figure 10:
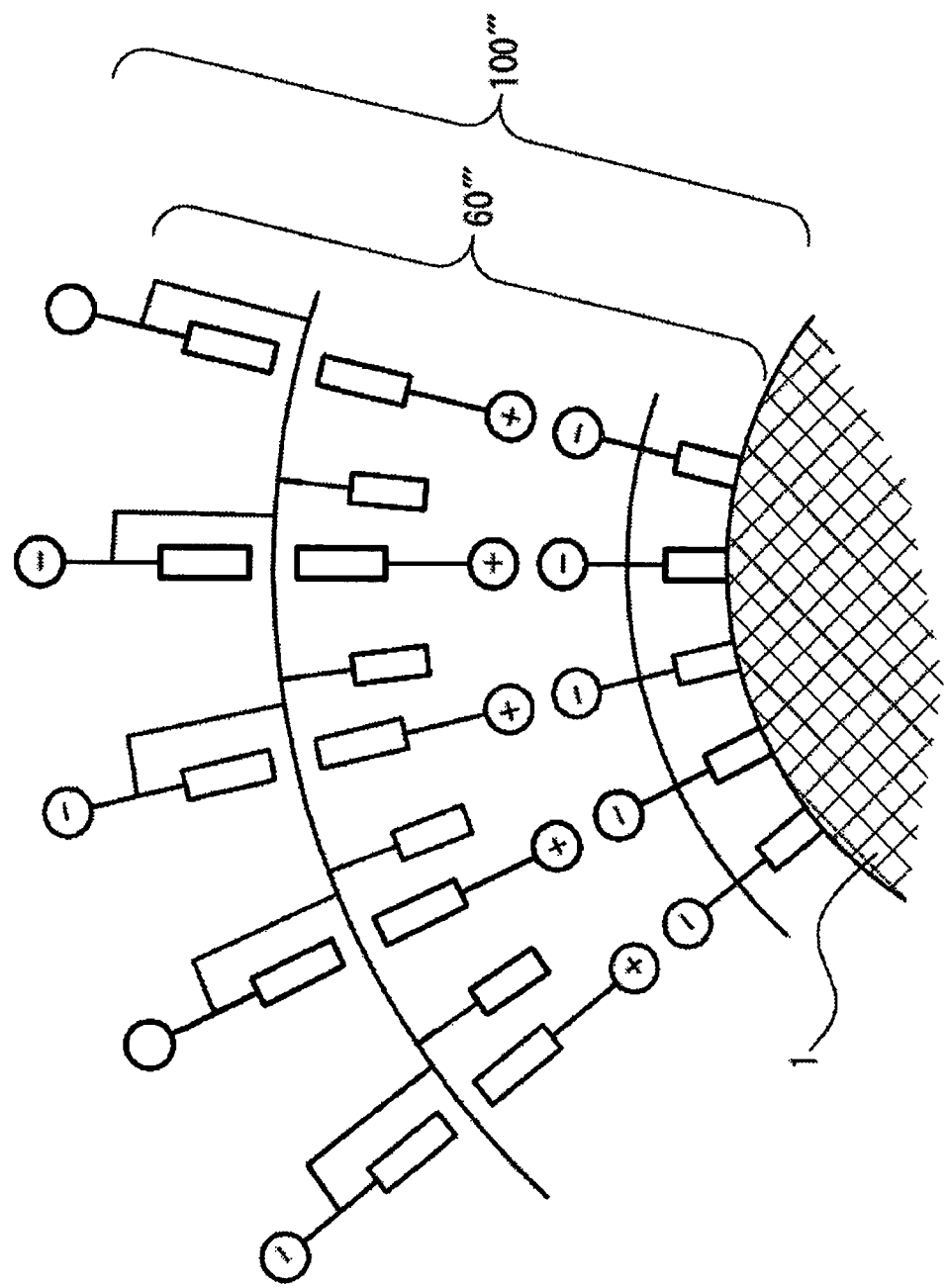
FIG. 10 A schematic view showing a state where the state shown in FIG. 5 is encapsulated.
Figure 11:
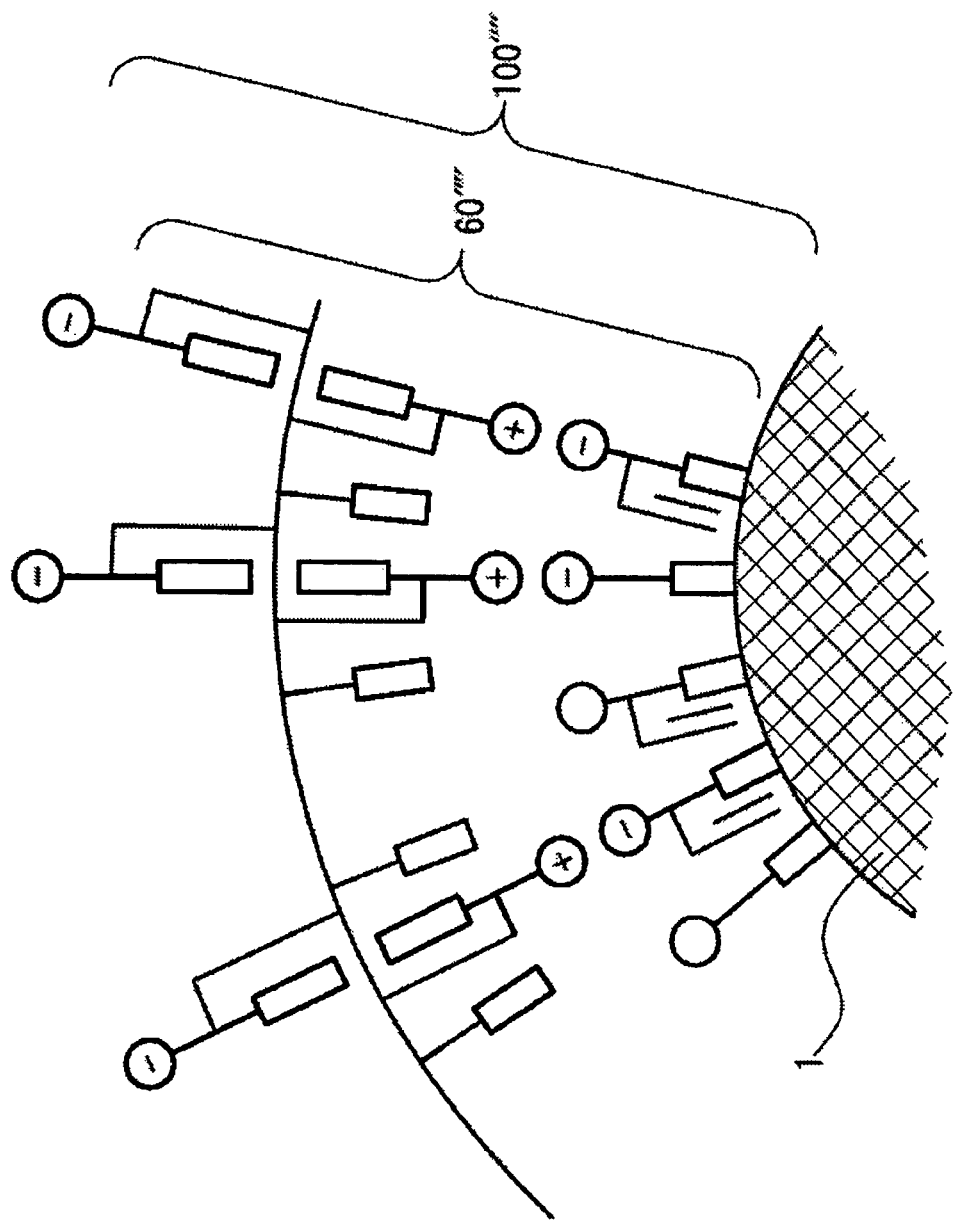
FIG. 11 A schematic view showing a state where the state shown in FIG. 6 is encapsulated.

1: Core substance, 2': anionic surfactant a, 3': cationic surfactant, 4': anionic surfactant c, 2: anionic polymerizable surfactant A, 3: cationic polymerizable surfactant B (or may be a cationic monomer containing at least a positively charged cationic group and a polymerizable group), 4: anionic polymerizable surfactant C, 5: a hydrophobic monomer, 8: nonionic polymerizable surfactant D, 9': nonionic surfactant e, 9: nonionic polymerizable surfactant E, 21 and 41: anionic group, 31: cationic group, 22, 32, 42, 82 and 92: hydrophobic group, 23, 33, 43, 83 and 93: polymerizable group, 81 and 91: nonionic group, 60, 60', 60'', 60''' and 60'''': polymer layer, and 100, 100', 100'', 100''' and 100'''': encapsulated product.

The invention claimed is:

1. An encapsulated product comprising a core substance encapsulated with a wall material comprising a polymer, wherein said polymer contacts the core substance through an ionic surfactant a containing an ionic group and a hydrophobic group and wherein said polymer comprises at least (1) a repeating structural unit derived from an ionic polymerizable surfactant B having an electric charge opposite the electric charge of said ionic surfactant and/or from an ionic monomer having an electric charge opposite the electric charge of said ionic surfactant a, the ionic polymerizable surfactant B containing the ionic group, a hydrophobic group and a polymerizable group, and (2) a repeating structural unit derived from an ionic polymerizable surfactant C having an electric charge the same as or opposite the electric charge of said ionic surfactant a and containing an ionic group, a hydrophobic group and a polymerizable group.

2. An encapsulated product comprising a core substance encapsulated with a wall material comprising a polymer, wherein said polymer contacts the core substance through an ionic surfactant a containing an ionic group and a hydrophobic group, the polymer being formed from an ionic surfactant b having an electric charge opposite the electric charge of said ionic surfactant a, a hydrophobic monomer and an ionic surfactant c having an electric charge the same as or opposite the electric charge of said ionic surfactant a.

3. The encapsulated product as claimed in claim 1, wherein said polymer further comprises a repeating structural unit derived from a hydrophobic monomer and is present between (1) and (2).

4. The encapsulated product as claimed in claim 1, wherein said polymer comprises, together with said repeating structural unit derived from an ionic polymerizable surfactant C, a repeating structural unit derived from an ionic monomer having the same electric charge as the electric charge of said ionic polymerizable surfactant C.

5. The encapsulated product as claimed in claim 1 or 2, wherein said ionic surfactant a is an ionic polymerizable surfactant A containing a polymerizable group.

6. The encapsulated product as claimed in claim 1 or 2, wherein said polymer further comprises a repeating structure derived from a nonionic polymerizable surfactant D containing a nonionic group, a hydrophobic group and a polymerizable group.

7. The encapsulated product as claimed in claim 1 or 2, wherein said polymer contacts the core substance through an ionic surfactant a and a nonionic surfactant e containing a nonionic group and a hydrophobic group.

8. The encapsulated product as claimed in claim 7, wherein said nonionic surfactant e is a nonionic polymerizable surfactant E further containing a polymerizable group.

9. The encapsulated product as claimed in claim 1, wherein the ionic group of said ionic surfactant a faces the ionic group of said ionic polymerizable surfactant B, the hydrophobic group of said ionic polymerizable surfactant B faces the hydrophobic group of said ionic polymerizable surfactant C, and the ionic group of said ionic polymerizable surfactant C is present in the outermost layer of the encapsulated product.

10. The encapsulated product as claimed in claim 6, wherein the nonionic group of said nonionic polymerizable surfactant D is further present in the outermost layer of the encapsulated product.

11. The encapsulated product as claimed in claim 1 or 2, wherein said core substance is a coloring material particle.

12. The encapsulated product as claimed in claim 11, wherein said coloring material particle is a pigment.

13. A method for producing an encapsulated product, comprising at least (a) a step of adsorbing an ionic surfactant a containing an ionic group and a hydrophobic group and/or an ionic polymerizable surfactant A containing an ionic group, a hydrophobic group and a polymerizable group to the surface of a core substance, (b) a step of mixing and adsorbing an ionic polymerizable surfactant B and/or ionic monomer having an electric charge opposite the electric charge of said ionic surfactant a and/or said ionic polymerizable surfactant A, (d) a step of adding and mixing an ionic polymerizable surfactant C having an electric charge the same as or opposite the electric charge of said ionic surfactant a and/or said ionic polymerizable surfactant A, and (e) a step of performing polymerization by adding a polymerization initiator thereto.

14. The method for producing an encapsulated product as claimed in claim 13, comprising at least (a) a step of adsorbing an ionic surfactant a containing an ionic group and a hydrophobic group and/or an ionic polymerizable surfactant A containing an ionic group, a hydrophobic group and a polymerizable group to the surface of a core substance, (b) a step of mixing and adsorbing an ionic polymerizable surfactant B and/or ionic monomer having an electric charge opposite the electric charge of said ionic surfactant a and/or said ionic polymerizable surfactant A, (c) a step of adding and mixing a hydrophobic monomer, (d) a step of adding and mixing an ionic polymerizable surfactant C having an electric charge the same as or opposite the electric charge of said ionic surfactant a and/or said ionic polymerizable surfactant A, and (e) a step of performing polymerization by adding a polymerization initiator thereto.

15. The method for producing an encapsulated product as claimed in claim 13, comprising at least (a) a step of adsorbing an ionic surfactant a containing an ionic group and a hydrophobic group and/or an ionic polymerizable surfactant A containing an ionic group, a hydrophobic group and a polymerizable group to the surface of a core substance, (b) a step of mixing and adsorbing an ionic polymerizable surfactant B and/or ionic monomer having an electric charge opposite the electric charge of said ionic surfactant a and/or said ionic polymerizable surfactant A, (d) a step of adding and mixing an ionic polymerizable surfactant C having an electric charge the same as or opposite the electric charge of said ionic surfactant a and/or said ionic polymerizable surfactant A, (c) a step of adding and mixing a hydrophobic monomer, and (e) a step of performing polymerization by adding a polymerization initiator thereto.

16. A method for producing an encapsulated product, comprising at least (a) a step of adsorbing an ionic surfactant a containing an ionic group and a hydrophobic group to the surface of a core substance, (b) a step of mixing and adsorbing an ionic surfactant b having an electric charge opposite the electric charge of said ionic surfactant a, (c) a step of adding and mixing a hydrophobic monomer, (d) a step of adding and mixing an ionic surfactant c having an electric charge the same as or opposite the electric charge of said ionic surfactant a, and (e) a step of performing polymerization by adding a polymerization initiator thereto.

17. A method for producing an encapsulated product, comprising at least (a) a step of adsorbing an ionic surfactant a containing an ionic group and a hydrophobic group to the surface of a core substance, (b) a step of mixing and adsorbing an ionic surfactant b having an electric charge opposite the electric charge of said ionic surfactant a, (d) a step of adding and mixing an ionic surfactant c having an electric charge the same as or opposite the electric charge of said ionic surfactant a, (c) a step of adding and mixing a hydrophobic monomer, and (e) a step of performing polymerization by adding a polymerization initiator thereto.

18. The method for producing an encapsulated product as claimed in claim 13, 16 or 17, wherein said step (b) comprises a step of performing a treatment of irradiating an ultrasonic wave after the mixing.

19. An ink composition comprising an encapsulated product product comprising a core substance encapsulated with a wall material mainly comprising a polymer, wherein said polymer contacts the core substance through an ionic surfactant a containing an ionic group and a hydrophobic group and the polymer comprises at least (1) a repeating structural unit derived from an ionic polymerizable surfactant B and/or ionic monomer having an electric charge opposite the electric charge of said ionic surfactant a, the ionic polymerizable surfactant B containing the ionic group, a hydrophobic group and a polymerizable group, and (2) a repeating structural unit derived from an ionic polymerizable surfactant C having an electric charge the same as or opposite the electric charge of said ionic surfactant a and containing an ionic group, a hydrophobic group and a polymerizable group or an encapsulated product obtained by the production method claimed in claim 13, 16 or 17.

20. The ink composition as claimed in claim 19, which comprises a 1,2-alkyldiol.

21. The ink composition as claimed in claim 19, which comprises an acetylene glycol-based and/or acetylene alcohol-based surfactant.

22. The ink composition as claimed in claim 19, which comprises an alkyl ether of a polyhydric alcohol.

23. The ink composition as claimed in claim 19, which comprises a compound represented by the following formula (1):

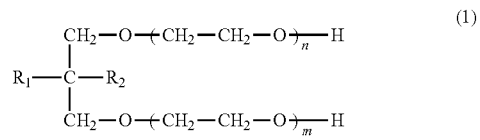

wherein $R_1$ and $R_2$ each independently represents an alkyl group having a carbon number of 1 to 10, m and n each represents a number of repeating units, and m+n is from 0 to 10 on average.

24. An ink composition comprising an encapsulated product comprising a core substance encapsulated with a wall material mainly comprising a polymer, wherein said polymer comprises a repeating structural unit comprising a hydrophobic monomer, wherein the polymer is present between an ionic surfactant b having an electric charge opposite the electric charge of said ionic surfactant a and an ionic surfactant c having an electric charge the same as or opposite the electric charge of said ionic surfactant a, and the ionic surfactant b contacts the core substance through an ionic surfactant a containing an ionic group and a hydrophobic group, or an encapsulated product obtained by the production method claimed in claim 13, 16 or 17.

25. The ink composition as claimed in claim 24, which comprises a 1,2-alkyldiol.

26. The ink composition as claimed in claim 24, which comprises an acetylene glycol-based and/or acetylene alcohol-based surfactant.

27. The ink composition as claimed in claim 24, which comprises an alkyl ether of a polyhydric alcohol.

28. The ink composition as claimed in claim 24, which comprises a compound represented by the following formula (1):

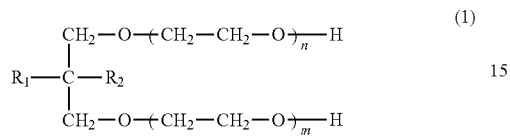

(1)

wherein $R_1$ and $R_2$ each independently represents an alkyl group having a carbon number of 1 to 10, m and n each represents a number of repeating units, and m+n is from 0 to 10 on average.

29. The encapsulated product as claimed in claim 2, wherein the ionic group of said ionic surfactant a faces the ionic group of said ionic surfactant b, the hydrophobic group of said ionic surfactant b faces the hydrophobic group of said ionic surfactant c, and the ionic group of said ionic surfactant c is present in the outermost layer of the encapsulated product.

* * * * *